US012574631B2

(12) United States Patent (10) Patent No.: US 12,574,631 B2
Kaneko (45) Date of Patent: Mar. 10, 2026

(54) IMAGING SUPPORT APPARATUS, IMAGING SYSTEM, IMAGING SUPPORT METHOD, AND PROGRAM

(71) Applicant: FUJIFILM CORPORATION, Tokyo (JP)

(72) Inventor: Yasuhiko Kaneko, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 172 days.

(21) Appl. No.: 18/512,019

(22) Filed: Nov. 17, 2023

(65) Prior Publication Data

US 2024/0089593 A1 Mar. 14, 2024

Related U.S. Application Data

(63) Continuation of application No. PCT/JP2022/019581, filed on May 6, 2022.

(30) Foreign Application Priority Data

May 24, 2021 (JP) ................................. 2021-086814

(51) Int. Cl.
*H04N 23/60* (2023.01)
*G03B 17/54* (2021.01)
*H04N 23/56* (2023.01)
(52) U.S. Cl.
CPC ............. *H04N 23/64* (2023.01); *G03B 17/54* (2013.01); *H04N 23/56* (2023.01)

(58) Field of Classification Search
CPC ...... H04N 23/56; H04N 23/64; H04N 23/667; G03B 16/06; G03B 16/07; G03B 16/10; G03B 17/54
See application file for complete search history.

(56) References Cited

U.S. PATENT DOCUMENTS

2004/0246368 A1* 12/2004 Chang .................... H04N 23/56
396/431
2007/0127015 A1* 6/2007 Palmateer .............. G01B 11/25
356/237.1
(Continued)

FOREIGN PATENT DOCUMENTS

JP 2004-364067 A 12/2004
JP 2009-518625 A 5/2009
(Continued)

OTHER PUBLICATIONS

International Search Report issued in International Application No. PCT/JP2022/019581 on Jul. 19, 2022.
(Continued)

*Primary Examiner* — Daniel M Pasiewicz
(74) *Attorney, Agent, or Firm* — SOLARIS Intellectual Property Group, PLLC

(57) ABSTRACT

There is provided an imaging support apparatus including a processor and a memory connected to or built into the processor, in which the processor is configured to control, in a state in which projection light, which represents at least a position of an imaging target region in a subject, is projected onto the subject by a projection apparatus, and in a case where the imaging target region is imaged by an imaging apparatus, the projection apparatus to transition to a state in which the projection light is suppressed.

22 Claims, 38 Drawing Sheets

(56)                  References Cited

U.S. PATENT DOCUMENTS

| | | |
|---|---|---|
| 2017/0026560 A1 | 1/2017 | Whitehouse et al. |
| 2019/0075231 A1 * | 3/2019 | Uemura |
| 2021/0092288 A1 * | 3/2021 | Horita .................... H04N 23/64 |
| 2023/0072448 A1 | 3/2023 | Horita |

FOREIGN PATENT DOCUMENTS

| | | |
|---|---|---|
| JP | 2009-182536 A | 8/2009 |
| JP | 2011-247810 A | 12/2011 |
| JP | 2014-049963 A | 3/2014 |
| JP | 2016-070710 A | 5/2016 |
| JP | 2018-515958 A | 6/2018 |
| JP | 2018-189564 A | 11/2018 |
| JP | 2019-045724 A | 3/2019 |
| WO | 2020/008973 A1 | 1/2020 |

OTHER PUBLICATIONS

Written Opinion of the ISA issued in International Application No. PCT/JP2022/019581 on Jul. 19, 2022.

International Preliminary Report on Patentability issued in International Application No. PCT/JP2022/019581 on Dec. 6, 2022.

English language translation of the following: Office action dated Oct. 28, 2025 from the JPO in a Japanese patent application No. 2023-523387 corresponding to the instant patent application.

* cited by examiner

Figure 3:
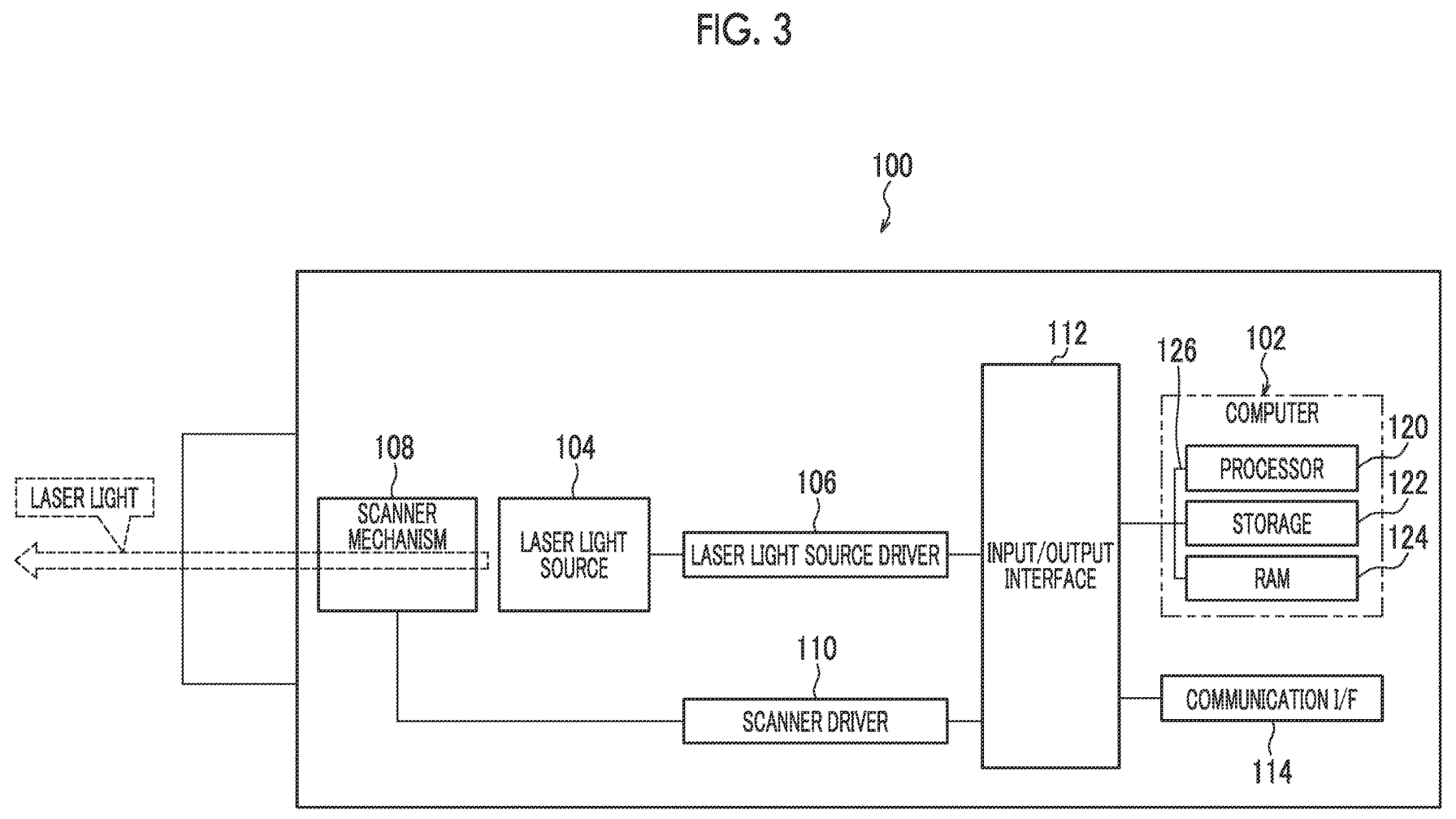

102 COMPUTER

126 PROCESSOR 120

STORAGE 122

RAM 124

COMMUNICATION I/F 114

112 INPUT/OUTPUT INTERFACE

106 LASER LIGHT SOURCE DRIVER

110 SCANNER DRIVER

104 LASER LIGHT SOURCE

108 SCANNER MECHANISM

LASER LIGHT

IMAGING SUPPORT APPARATUS, IMAGING SYSTEM, IMAGING SUPPORT METHOD, AND PROGRAM

This application is a continuation application of International Application No. PCT/JP2022/019581, filed May 6, 2022, the disclosure of which is incorporated herein by reference in its entirety. Further, this application claims priority from Japanese Patent Application No. 2021-086814, filed May 24, 2021, the disclosure of which is incorporated herein by reference in its entirety.

BACKGROUND OF THE INVENTION

1. Field of the Invention

The present disclosed technology relates to an imaging support apparatus, an imaging system, an imaging support method, and a program.

2. Description of the Related Art

JP2018-189564A discloses an image inspection apparatus including: an illumination unit that has a plurality of light emitting elements that generate illumination light of a plurality of lighting colors different from each other and that irradiates an object with the illumination light of each lighting color; an imaging unit that receives reflected light from the object to generate a spectral image of the object; a control unit that controls the illumination unit and the imaging unit; a generation unit that combines a plurality of spectral images acquired by the imaging unit to generate an inspection image; an inspection unit that inspects the object by using the inspection image, in which the control unit extinguishes the plurality of light emitting elements and causes the imaging unit to receive the reflected light, which is generated due to disturbance light, from the object to acquire a disturbance light image of the object, and the generation unit includes a subtraction unit that subtracts the disturbance light image from each of the plurality of spectral images and a composition unit that combines the plurality of spectral images where subtraction is performed with the disturbance light image to generate the inspection image.

JP2019-45724A discloses a moving apparatus that includes a light emitting unit, the moving apparatus includes: a movement control unit that controls movement of the moving apparatus; a light emitting unit that indicates a status of the movement of the moving apparatus; an acquisition unit that acquires an exposure setting of an imaging unit connected to the moving apparatus; and a light emitting control unit that controls light emission of the light emitting unit based on the exposure setting.

JP2018-515958A discloses an apparatus for performing dual-mode imaging under different illumination conditions, the apparatus includes: a sensor that is configured to image a target; and a dual mode illumination light source that is configured to illuminate the target while the sensor images the target, in which the dual mode illumination light source is configured to illuminate the target with first wavelength light under a first illumination condition, and the dual mode illumination light source is configured to illuminate the target with second wavelength light under a second illumination condition.

SUMMARY OF THE INVENTION

One embodiment according to the present disclosed technology provides, for example, an imaging support apparatus, an imaging system, an imaging support method, and a program that can suppress the influence of projection light on an image obtained by imaging an imaging target region with an imaging apparatus as compared with a case where an imaging target region is imaged by an imaging apparatus in a state in which projection light, which represents at least a position of the imaging target region in a subject, is projected onto the subject.

An imaging support apparatus according to a first aspect of the present disclosed technology comprises: a processor; and a memory connected to or built into the processor, in which the processor is configured to control, in a state in which projection light, which represents at least a position of an imaging target region in a subject, is projected onto the subject by a projection apparatus, and in a case where the imaging target region is imaged by an imaging apparatus, the projection apparatus to transition to a state in which the projection light is suppressed.

A second aspect according to the present disclosed technology is the imaging support apparatus according to the first aspect, in which a case where the imaging target region is imaged by the imaging apparatus is a case where the processor receives an imaging instruction provided to the imaging apparatus.

A third aspect according to the present disclosed technology is the imaging support apparatus according to the second aspect, in which the imaging instruction includes an imaging preparation instruction based on a fact that a release button of the imaging apparatus is half-pressed.

A fourth aspect according to the present disclosed technology is the imaging support apparatus according to any one of the first to third aspects, in which the state in which the projection light is suppressed is a state in which the projection light is stopped.

A fifth aspect according to the present disclosed technology is the imaging support apparatus according to any one of the first to fourth aspects, in which the processor is configured to control the projection apparatus to project the projection light onto the subject.

A sixth aspect according to the present disclosed technology is the imaging support apparatus according to any one of the first to fifth aspects, in which the projection light includes projection light representing a position of an edge portion of the imaging target region.

A seventh aspect according to the present disclosed technology is the imaging support apparatus according to any one of the first to sixth aspects, in which the projection light includes projection light representing a position of a center of the imaging target region.

An eighth aspect according to the present disclosed technology is the imaging support apparatus according to any one of the first to seventh aspects, in which the projection light includes projection light representing a range of the imaging target region.

A ninth aspect according to the present disclosed technology is the imaging support apparatus according to any one of the first to eighth aspects, in which the projection light includes projection light displayed in a grid shape.

A tenth aspect according to the present disclosed technology is the imaging support apparatus according to any one of the first to eighth aspects, in which the projection light includes projection light displayed in a rectangular shape.

An eleventh aspect according to the present disclosed technology is the imaging support apparatus according to any one of the first to tenth aspects, in which the projection light includes projection light representing an imaging order.

A twelfth aspect according to the present disclosed technology is the imaging support apparatus according to any one of the first to eleventh aspects, in which the processor is configured to control the projection apparatus to move the projection light along the subject.

A thirteenth aspect according to the present disclosed technology is the imaging support apparatus according to the twelfth aspect, in which a portion of a first imaging target region, as the imaging target region, corresponding to the projection light before movement and a portion of a second imaging target region, as the imaging target region, corresponding to the projection light after the movement may overlap with each other.

A fourteenth aspect according to the present disclosed technology is the imaging support apparatus according to any one of the first to thirteenth aspects, in which the projection light includes projection light representing a dimension.

A fifteenth aspect according to the present disclosed technology is the imaging support apparatus according to any one of the first to fourteenth aspects, in which the projection light includes projection light representing information related to the subject.

A sixteenth aspect according to the present disclosed technology is the imaging support apparatus according to any one of the first to fifteenth aspects, in which the processor is configured to perform control of projecting the projection light onto the subject in accordance with a default plan.

A seventeenth aspect according to the present disclosed technology is the imaging support apparatus according to the sixteenth aspect, in which the plan includes at least one of a projection position, a projection range, or a projection order for projecting the projection light onto the subject.

An eighteenth aspect according to the present disclosed technology is the imaging support apparatus according to any one of the first to seventeenth aspects, in which the projection light includes projection light representing a damaged location of the subject.

A nineteenth aspect according to the present disclosed technology is the imaging support apparatus according to any one of the first to eighteenth aspects, in which the processor is configured to output relative information representing a relative relationship between an imaging range that is imaged by the imaging apparatus and the imaging target region.

A twentieth aspect according to the present disclosed technology is the imaging support apparatus according to any one of the first to nineteenth aspects, in which the processor is configured to control the imaging apparatus to image the subject in a case where a default imaging condition is established.

A twenty-first aspect according to the present disclosed technology is the imaging support apparatus according to any one of the first to twentieth aspects, in which the processor is configured to further control the projection apparatus to maintain the projection light in a case where imaging target region is imaged by the imaging apparatus.

An imaging system according to a twenty-second aspect of the present disclosed technology comprises: the imaging support apparatus according to any one of first to twenty-first aspects; the projection apparatus; and the imaging apparatus.

An imaging support method according to a twenty-third aspect of the present disclosed technology comprises: causing a projection apparatus to project projection light, which represents at least a position of an imaging target region in a subject, onto the subject; and causing the projection apparatus to suppress the projection light in a case where the imaging target region is imaged by an imaging apparatus.

A program according to a twenty-fourth aspect of the present disclosed technology causing a computer to execute a process comprises: controlling, in a state in which projection light, which represents at least a position of an imaging target region in a subject, is projected onto the subject by a projection apparatus, and in a case where the imaging target region is imaged by an imaging apparatus, the projection apparatus to transition to a state in which the projection light is suppressed.

BRIEF DESCRIPTION OF THE DRAWINGS

FIG. 2 is a block diagram showing an example of a configuration of an imaging support apparatus according to the embodiment.

FIG. 3 is a block diagram showing an example of a configuration of a projection apparatus according to the embodiment.

FIG. 6 is a block diagram showing an example of a functional configuration of a processor included in the projection apparatus according to the embodiment.

FIG. 9 is a block diagram showing an example of an operation of the imaging system in a case where a visual inspection image according to the embodiment is acquired.

FIG. 10 is a block diagram showing an example of an operation of the imaging system in a case where the imaging apparatus according to the embodiment shifts to an imaging preparation state.

FIG. 12 is a block diagram showing an example of an operation of the imaging system in a case where an analysis image according to the embodiment is acquired.

DESCRIPTION OF THE PREFERRED EMBODIMENTS

Hereinafter, an imaging support apparatus, an imaging system, an imaging support method, and a program according to the present disclosed technology will be described with reference to the accompanying drawings.

The terms used in the following description will be described first.

CPU refers to an abbreviation of "Central Processing Unit". GPU refers to an abbreviation of "Graphics Processing Unit". NVM refers to an abbreviation of "Non-Volatile Memory". RAM refers to an abbreviation of "Random Access Memory". IC refers to an abbreviation of "Integrated Circuit". ASIC refers to an abbreviation of "Application Specific Integrated Circuit". PLD refers to an abbreviation of "Programmable Logic Device". FPGA refers to an abbreviation of "Field-Programmable Gate Array". SoC refers to an abbreviation of "System-on-a-chip". SSD refers to an abbreviation of "Solid State Drive". HDD refers to an abbreviation of "Hard Disk Drive". EEPROM refers to an abbreviation of "Electrically Erasable and Programmable Read Only Memory". DRAM refers to an abbreviation of "Dynamic Random Access Memory". SRAM refers to an abbreviation of "Static Random Access Memory". I/F refers to an abbreviation of "Interface". USB refers to an abbreviation of "Universal Serial Bus". CMOS refers to an abbreviation of "Complementary Metal Oxide Semiconductor". CCD refers to an abbreviation of "Charge Coupled Device". LAN refers to an abbreviation of "Local Area Network". WAN refers to an abbreviation of "Wide Area Network". EL refers to an abbreviation of "Electro Luminescence". DLP refers to an abbreviation of "Digital Light Processing". MEMS refers to an abbreviation of "Micro Electro Mechanical Systems".

In the description of the present specification, the "coincidence" indicates a coincidence in the sense of including an error generally allowed in the technical field, to which the present disclosed technology belongs, in addition to the perfect coincidence, and an error that does not go against the gist of the present disclosed technology.

Figure 1:
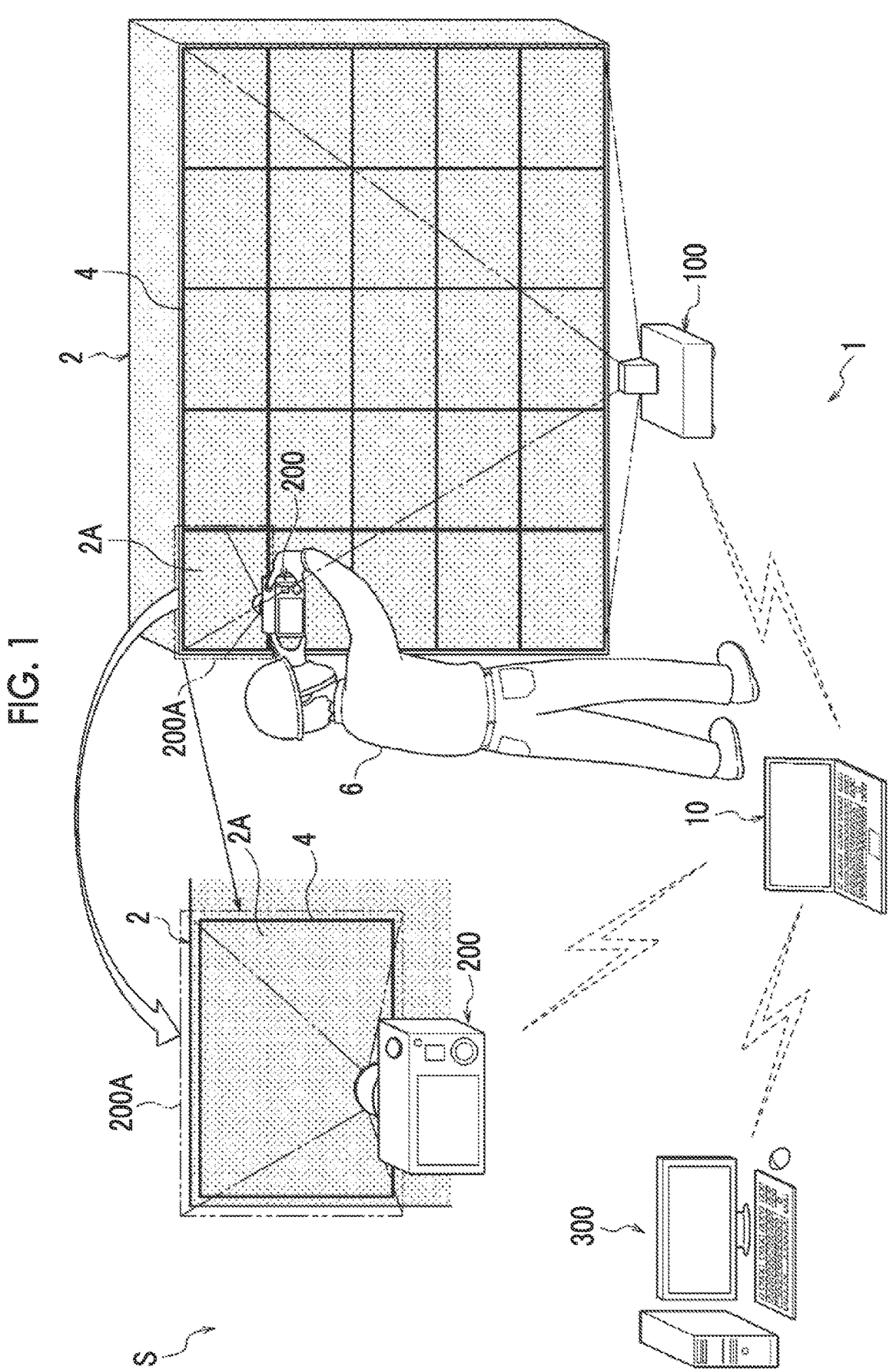
FIG. 1 is a perspective view showing an example of a configuration of an inspection system according to an embodiment of the present disclosed technology.

As an example shown in FIG. 1, an inspection system S includes an imaging support apparatus 10, a projection apparatus 100, an imaging apparatus 200, and an image analysis apparatus 300, and inspects an inspection target 2. As an example, the inspection target 2 is a pier. As an example, the pier is made of reinforced concrete. Here, although a pier is exemplified as an example of the inspection target 2, the inspection target 2 may be a road facility other than a pier. Examples of the road facility include a road surface, a tunnel, a guard rail, a traffic light, and/or a windshield. The inspection target 2 may be social infrastructure (for example, an airport facility, a port facility, a water storage facility, a gas facility, a medical facility, a firefighting facility, an educational facility, and/or the like) other than road facilities or may be private property. Further, the inspection target 2 may be land (for example, state-owned land, private land, and/or the like).

The pier exemplified as the inspection target 2 may be a pier other than the pier made of reinforced concrete. Further, in the present embodiment, the inspection refers to, for example, an inspection of a state of the inspection target 2. For example, the inspection system S inspects the presence or absence of damage of the inspection target 2, the degree of damage, and/or the like. The inspection target 2 is an example of a "subject" according to the present disclosed technology.

The imaging support apparatus 10, the projection apparatus 100, and the imaging apparatus 200 constitute an imaging system 1. The imaging system 1 is a system that provides image data, which is obtained by imaging the inspection target 2 with the imaging apparatus 200, to the image analysis apparatus 300. The image analysis apparatus 300 executes image analysis processing with respect to the image data and outputs an inspection result related to the presence or absence of damage of the inspection target 2, the degree of damage, and/or the like. As an example, the image analysis processing is processing of analyzing an image using artificial intelligence or the like.

The imaging support apparatus 10 is, for example, a laptop personal computer. Here, although a laptop personal computer is exemplified as the imaging support apparatus 10, this is only an example, and a desktop personal computer may be used. Further, it is not limited to a personal computer, a server may be used. The server may be a mainframe used on-premises together with the projection apparatus 100 and/or the imaging apparatus 200 or may be an external server implemented by cloud computing. Further, the server may be an external server implemented by network computing such as fog computing, edge computing, or grid computing. The imaging support apparatus 10 is connected to the projection apparatus 100, the imaging apparatus 200, and the image analysis apparatus 300 in a communicable manner.

For example, the projection apparatus 100 is a laser light source type projector. Here, although a laser light source type projector is exemplified as the projection apparatus 100, this is only an example, and a liquid crystal panel type projector or a DLP type projector may be used. The projection apparatus 100 is installed at a position where projection light 4 can be projected onto the entire inspection target 2.

The imaging apparatus 200 is, for example, a lens-interchangeable digital camera. Here, although a lens-interchangeable digital camera is exemplified as the imaging apparatus 200, this is only an example, and a digital camera built into various electronic apparatuses such as smart devices or wearable terminals may be used. Further, the imaging apparatus 200 may be a glasses type eyepiece terminal or may be a head-mounted display terminal that is worn on a head.

Figure 2:
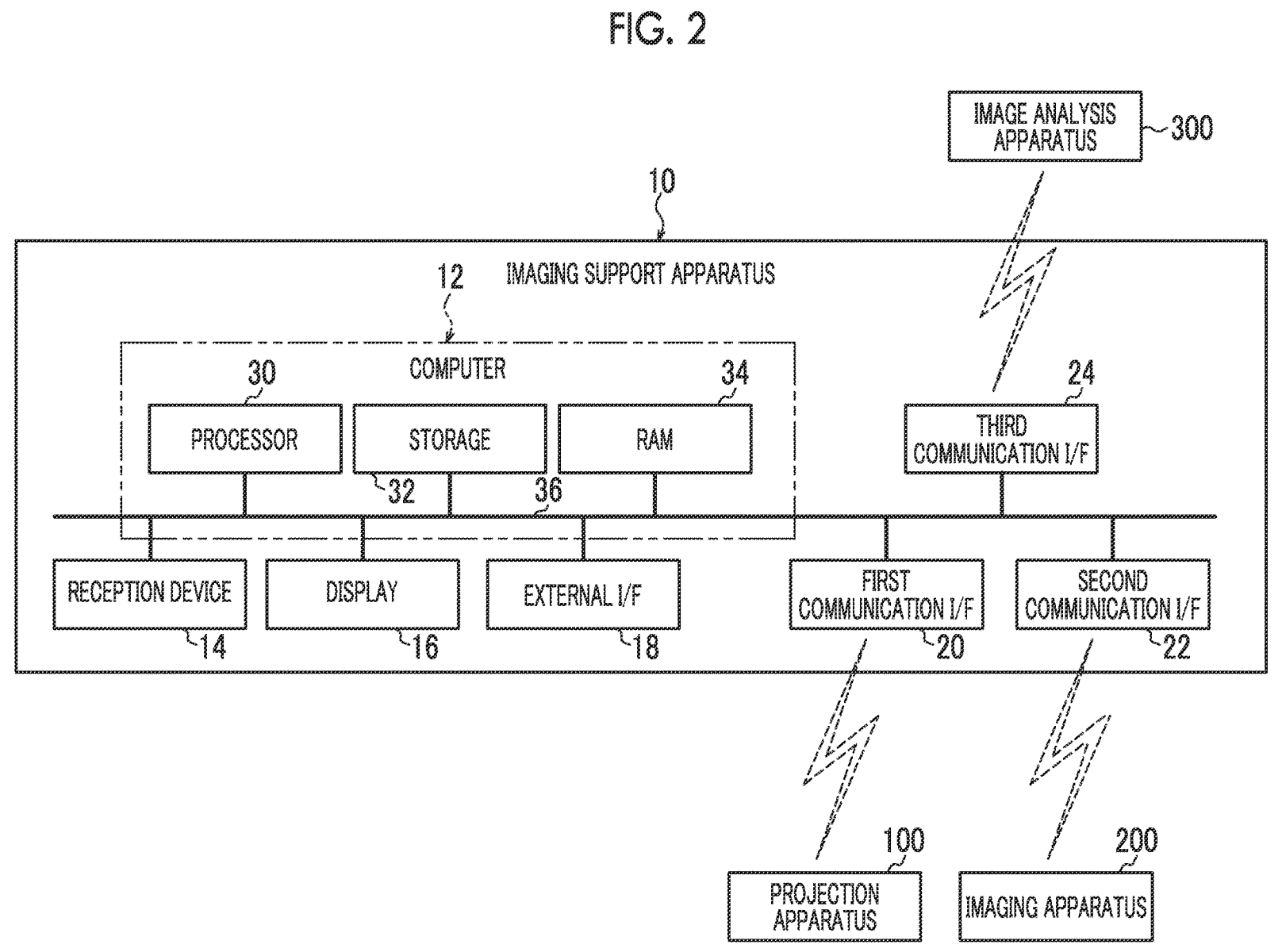

As an example shown in FIG. 2, the imaging support apparatus 10 includes a computer 12, a reception device 14, a display 16, an external I/F 18, a first communication I/F 20, a second communication I/F 22, and a third communication I/F 24.

The computer 12 is an example of a "computer" according to the present disclosed technology. The computer 12 includes a processor 30, a storage 32, and a RAM 34. The processor 30 is an example of a "processor" according to the present disclosed technology, and the RAM 34 is an example of a "memory" according to the present disclosed technology.

The processor 30, the storage 32, the RAM 34, the external I/F 18, the first communication I/F 20, the second communication I/F 22, and the third communication I/F 24 are connected to a bus 36. In the example shown in FIG. 2, one bus is shown as the bus 36 for convenience of illustration, but a plurality of buses may be used. The bus 36 may be a serial bus or may be a parallel bus including a data bus, an address bus, a control bus, and the like.

The processor 30 includes, for example, a CPU, and controls the entire imaging support apparatus 10. Here, although an example in which the processor 30 includes a CPU is exemplified, this is only an example. For example, the processor 30 may include a CPU and a GPU. In this case, for example, the GPU operates under the control of the CPU and executes image processing.

The storage 32 is a non-volatile storage device that stores various programs, various parameters, and the like. Examples of the storage 32 include an HDD and an SSD. The HDD and the SSD are only examples, and a flash memory, a magnetoresistive memory, and/or a ferroelectric memory may be used instead of the HDD and/or the SSD or together with the HDD and/or the SSD.

The RAM 34 is memory in which information is temporarily stored and is used as a work memory by the processor 30. Examples of the RAM 34 include a DRAM and/or an SRAM.

The reception device 14 includes a keyboard, a mouse, a touch panel, or the like, and receives an instruction from a user such as an imaging person 6. The display 16 displays various types of information (for example, an image and a character) under the control of the processor 30. Examples of the display 16 include an EL display (for example, an organic EL display or an inorganic EL display). It should be noted that the display is not limited to the EL display, and another type of display, such as a liquid crystal display, may be applied.

The external I/F 18 controls exchange of various types of information between the imaging support apparatus 10 and an apparatus (for example, a smart device, a personal computer, a server, a USB memory, a memory card, a printer, and/or the like) present outside of the imaging support apparatus 10. Examples of the external I/F 18 include a USB interface. The various apparatuses (not shown) such as a smart device, a personal computer, a server, a USB memory, a memory card, and/or a printer is directly or indirectly connected to the USB interface.

The first communication I/F 20 is connected to the projection apparatus 100 in a communicable manner. Here, the first communication I/F 20 is connected to the projection apparatus 100 in a wirelessly communicable manner with a default wireless communication standard. Examples of the default wireless communication standard include Bluetooth (registered trademark). Other wireless communication standards (for example, Wi-Fi, 5G, or the like) may be used. Here, although wireless communication is exemplified, the present disclosed technology is not limited to this, and wired communication may be applied instead of wireless communication. The first communication I/F 20 controls exchange of information with the projection apparatus 100. For example, the first communication I/F 20 transmits information in response to a request from the processor 30 to the projection apparatus 100. Further, the first communication I/F 20 receives the information transmitted from the projection apparatus 100 and outputs the received information to the processor 30 via the bus 36.

The second communication I/F 22 is connected to the imaging apparatus 200 in a communicable manner. Here, the second communication I/F 22 is connected to the imaging apparatus 200 in a wirelessly communicable manner with the default wireless communication standard. Further, here, although wireless communication is exemplified, the present disclosed technology is not limited to this, and wired communication may be applied instead of wireless communication. The second communication I/F 22 controls exchange of information with the imaging apparatus 200. For example, the second communication I/F 22 transmits the information in response to a request from the processor 30 to the imaging apparatus 200. Further, the second communication I/F 22 receives the information transmitted from the imaging apparatus 200 and outputs the received information to the processor 30 via the bus 36.

The third communication I/F 24 is connected to the image analysis apparatus 300 in a communicable manner. Here, the third communication I/F 24 is connected to the image analysis apparatus 300 in a wirelessly communicable manner with the default wireless communication standard. Further, here, although wireless communication is exemplified, the present disclosed technology is not limited to this, and wired communication may be applied instead of wireless communication. The third communication I/F 24 controls exchange of information with the image analysis apparatus 300. For example, the third communication I/F 24 transmits the information in response to a request from the processor 30 to the image analysis apparatus 300. Further, the third communication I/F 24 receives the information transmitted from the image analysis apparatus 300 and outputs the received information to the processor 30 via the bus 36.

As an example shown in FIG. 3, the projection apparatus 100 includes a computer 102, a laser light source 104, a laser light source driver 106, a scanner mechanism 108, a scanner driver 110, an input/output interface 112, and a communication I/F 114.

The computer 102, the communication I/F 114, the laser light source driver 106, and the scanner driver 110 are connected to the input/output interface 112.

The computer 102 includes a processor 120, a storage 122, and a RAM 124. The processor 120, the storage 122, and the RAM 124 are connected to each other via a bus 126, and the bus 126 is connected to the input/output interface 112. In the example shown in FIG. 3, one bus is shown as the bus 126 for convenience of illustration, but a plurality of buses may be used. The bus 126 may be a serial bus or may be a parallel bus including a data bus, an address bus, a control bus, and the like.

For example, the processor 120 includes a CPU and controls the entire projection apparatus 100.

The storage 122 is a non-temporary storage medium that stores various parameters and various programs. For example, the storage 122 is an EEPROM. However, this is only an example, and an HDD and/or SSD or the like may be applied as the storage 122 instead of or together with the EEPROM. Further, the RAM 124 temporarily stores various types of information and is used as a work memory.

The processor 120 reads out a necessary program from the storage 122 and executes the read program in the RAM 124. The processor 120 controls the entire projection apparatus 100 in accordance with the program executed on the RAM 124. In the example shown in FIG. 3, the communication I/F 114, the laser light source driver 106, and the scanner driver 110 are controlled by the processor 120.

The laser light source 104 is, for example, a laser diode and outputs laser light. Although the laser light is, for example, laser light in a red wavelength range, laser light in a wavelength range of a color other than red may be used. The laser light source driver 106 is connected to the laser light source 104. The laser light source driver 106 controls the laser light source 104 in accordance with an instruction from the processor 120.

The scanner mechanism 108 is, for example, a galvanometer mirror scanner or a MEMS mirror scanner, and includes a scanner mirror (not shown) and a scanner actuator (not shown). The scanner mirror reflects the laser light. The laser light reflected by the scanner mirror is emitted to a front side of the projection apparatus 100 through a laser light output window 116. The scanner actuator changes an angle of the scanner mirror. Scanning is performed with the laser light by changing the angle of the scanner mirror. By scanning with the laser light, the projection light 4 (see FIG. 1) representing information including a character and/or a figure is projected onto an object (for example, the inspection target 2 shown in FIG. 1). The projection light 4 will be described in detail later. The scanner driver 110 controls the scanner actuator in accordance with an instruction from the processor 120.

The communication I/F 114 controls transmission and reception of information with respect to the imaging support apparatus 10 by the projection apparatus 100. As an example shown in FIG. 3, the communication I/F 114 is connected to the imaging support apparatus 10 (see FIG. 2) in a communicable manner. Here, the communication I/F 114 is connected to the first communication I/F 20 of the imaging support apparatus 10 in a wirelessly communicable manner with the default wireless communication standard. Here, although wireless communication is exemplified, the present disclosed technology is not limited to this, and wired communication may be applied instead of wireless communication. The communication I/F 114 controls exchange of information between the processor 30 of the imaging support apparatus 10 and the processor 120 of the projection apparatus 100. For example, the communication I/F 114 transmits the information in response to a request from the processor 120 to the imaging support apparatus 10. Further, the communication I/F 114 receives the information transmitted from the processor 30 of the imaging support apparatus 10 via the first communication I/F 20 and outputs the received information to the processor 120 via the bus 126.

Figure 4:
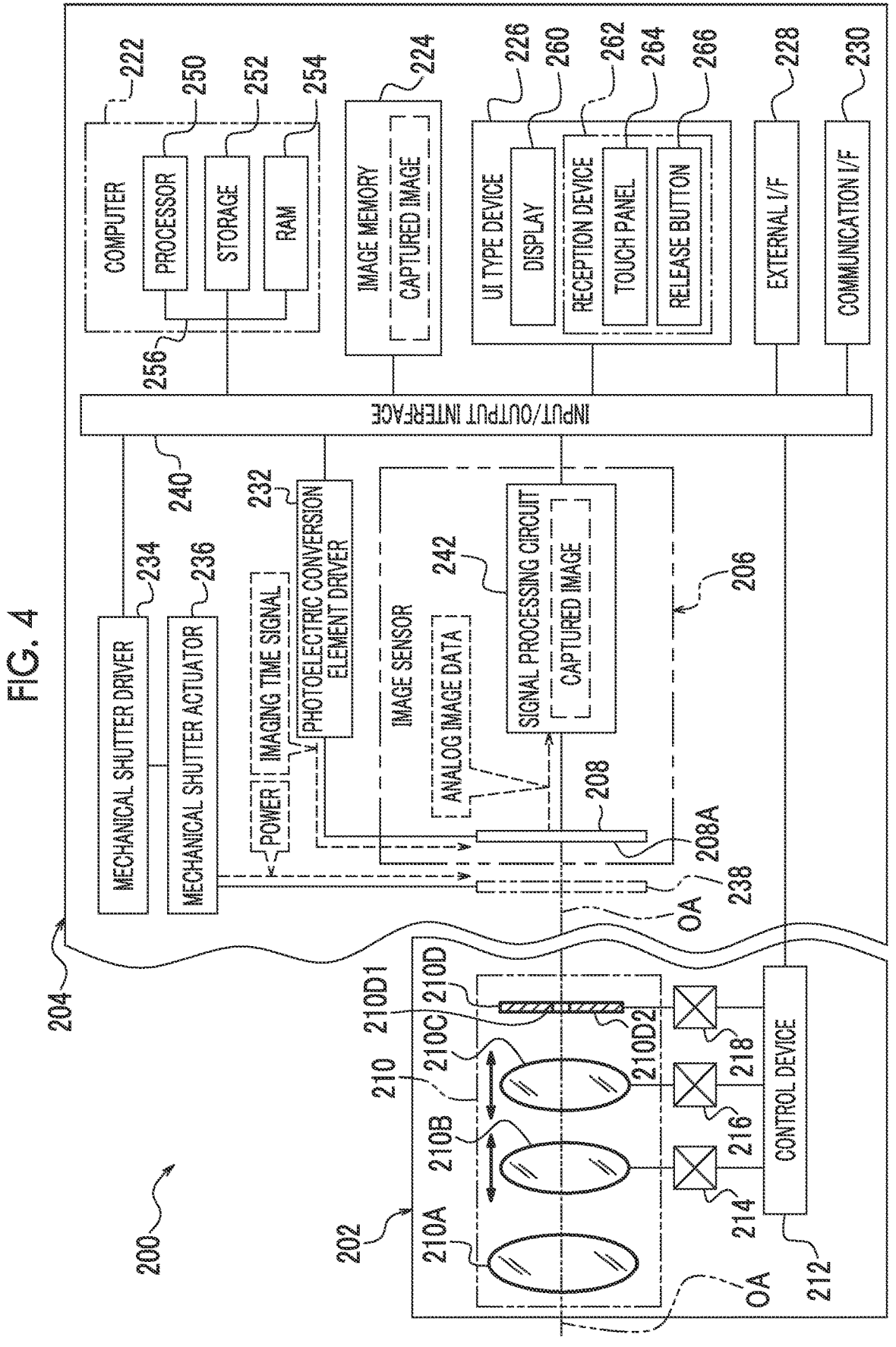
FIG. 4 is a block diagram showing an example of a configuration of an imaging apparatus according to the embodiment.

As an example shown in FIG. 4, the imaging apparatus 200 includes an interchangeable lens 202 and an imaging apparatus main body 204. The interchangeable lens 202 is attached to the imaging apparatus main body 204 in an interchangeable manner.

The imaging apparatus main body 204 includes an image sensor 206. The image sensor 206 is a CMOS image sensor, for example. The image sensor 206 images a subject (for example, the inspection target 2 shown in FIG. 1). In a case where the interchangeable lens 202 is attached to the imaging apparatus main body 204, subject light indicating the subject is transmitted through the interchangeable lens 202 and imaged on the image sensor 206, and then image data indicating an image of the subject is generated by the image sensor 206.

Here, although a CMOS image sensor is exemplified as the image sensor 206, the present disclosed technology is not limited to this, and other image sensors may be used.

The image sensor 206 includes a photoelectric conversion element 208. The photoelectric conversion element 208 includes a light-receiving surface 208A. The photoelectric conversion elements 208 are disposed in the imaging apparatus main body 204 such that the center of the light-receiving surface 208A and an optical axis OA of the interchangeable lens 202 coincide with each other. The photoelectric conversion elements 208 have a plurality of photosensitive pixels (not shown) arranged in a matrix shape, and the light-receiving surface 208A is formed by the plurality of photosensitive pixels. The photosensitive pixel is a physical pixel having a photodiode (not shown), which photoelectrically converts the received light and outputs an electric signal according to the light receiving amount.

The interchangeable lens 202 includes an imaging lens 210. The imaging lens 210 has an objective lens 210A, a focus lens 210B, a zoom lens 210C, and a stop 210D. The objective lens 210A, the focus lens 210B, the zoom lens 210C, and the stop 210D are disposed in the order of the objective lens 210A, the focus lens 210B, the zoom lens 210C, and the stop 210D along the optical axis OA from the subject side (object side) to the imaging apparatus main body 204 side (image side).

The interchangeable lens 202 includes a control device 212, a first actuator 214, a second actuator 216, and a third actuator 218. The control device 212 controls the entire interchangeable lens 202 according to the instruction from the imaging apparatus main body 204. The control device 212 is a device having a computer including, for example, a CPU, an NVM, a RAM, and the like. Although a computer is exemplified here, this is only an example, and a device including an ASIC, FPGA, and/or PLD may be applied. Further, as the control device 212, for example, a device implemented by a combination of a hardware configuration and a software configuration may be used.

The first actuator 214 includes a slide mechanism for focus (not shown) and a motor for focus (not shown). The focus lens 210B is attached to the slide mechanism for focus to be slidable along the optical axis OA. Further, the motor for focus is connected to the slide mechanism for focus, and the slide mechanism for focus operates by receiving the power of the motor for focus to move the focus lens 210B along the optical axis OA.

The second actuator 216 includes a slide mechanism for zoom (not shown) and a motor for zoom (not shown). The zoom lens 210C is attached to the slide mechanism for zoom to be slidable along the optical axis OA. Further, the motor for zoom is connected to the slide mechanism for zoom, and the slide mechanism for zoom operates by receiving the power of the motor for zoom to move the zoom lens 210C along the optical axis OA.

Here, although an example of the embodiment in which the slide mechanism for focus and the slide mechanism for zoom are provided separately has been described, this is only an example, and it may be an integrated type slide mechanism capable of realizing both focusing and zooming. Further, in this case, the power, which is generated by one motor, may be transmitted to the slide mechanism without using a motor for focus and a motor for zoom.

The third actuator 218 includes a power transmission mechanism (not shown) and a motor for stop (not shown). The stop 210D has an opening 210D1 and is a stop in which the size of the opening 210D1 is variable. The opening 210D1 is formed by a plurality of leaf blades 210D2. The plurality of leaf blades 210D2 are connected to the power transmission mechanism. Further, the motor for stop is connected to the power transmission mechanism, and the power transmission mechanism transmits the power of the motor for stop to the plurality of leaf blades 210D2. The plurality of leaf blades 210D2 receives the power that is transmitted from the power transmission mechanism and changes the size of the opening 210D1 by being operated. The stop 210D adjusts the exposure by changing the size of the opening 210D1.

The motor for focus, the motor for zoom, and the motor for stop are connected to the control device 212, and the control device 212 controls each drive of the motor for focus, the motor for zoom, and the motor for stop. In the present embodiment, a stepping motor is adopted as an example of the motor for focus, the motor for zoom, and the motor for stop. Therefore, the motor for focus, the motor for zoom, and the motor for stop operate in synchronization with a pulse signal in response to a command from the control device 212. Further, although an example in which the motor for focus, the motor for zoom, and the motor for stop are provided in the interchangeable lens 202 has been described here, this is only an example, and at least one of the motor for focus, the motor for zoom, or the motor for stop may be provided in the imaging apparatus main body 204. The constituent and/or operation method of the interchangeable lens 202 can be changed as needed.

The interchangeable lens 202 includes a first sensor (not shown). The first sensor detects a position of the focus lens 210B on the optical axis OA. An example of the first sensor includes a potential meter. A detection result, which is obtained by the first sensor, is acquired by the control device 212 and is output to the imaging apparatus main body 204. The imaging apparatus main body 204 adjusts the position of the focus lens 210B on the optical axis OA based on the detection result obtained by the first sensor.

The interchangeable lens 202 includes a second sensor (not shown). The second sensor detects a position of the zoom lens 210C on the optical axis OA. An example of the second sensor includes a potential meter. A detection result, which is obtained by the second sensor, is acquired by the control device 212 and is output to the imaging apparatus main body 204. The imaging apparatus main body 204 adjusts the position of the zoom lens 210C on the optical axis OA based on the detection result obtained by the second sensor.

The interchangeable lens 202 includes a third sensor (not shown). The third sensor detects the size of the opening 210D1. An example of the third sensor includes a potential meter. A detection result, which is obtained by the third sensor, is acquired by the control device 212 and is output to the imaging apparatus main body 204. The imaging apparatus main body 204 adjusts the size of the opening 210D1 based on the detection result obtained by the third sensor.

In the imaging apparatus 200, an MF mode and an AF mode are selectively set according to the instructions provided to the imaging apparatus main body 204. The MF mode is an operation mode for manually focusing. In the MF mode, for example, by operating the focus ring (not shown) or the like by the user, the focus lens 210B is moved along the optical axis OA with the movement amount according to the operation amount of the focus ring or the like, thereby the focus is adjusted.

In the AF mode, the imaging apparatus main body 204 calculates a focusing position according to a subject distance and adjusts the focus by moving the focus lens 210B toward the calculated focusing position. Here, the focusing position refers to a position of the focus lens 210B on the optical axis OA in a state of being in focus. In the following, for convenience of explanation, the control of aligning the focus lens 210B with the focusing position is also referred to as "AF control".

The imaging apparatus main body 204 includes the image sensor 206, a computer 222, an image memory 224, a UI type device 226, an external I/F 228, a communication I/F 230, a photoelectric conversion element driver 232, a mechanical shutter driver 234, a mechanical shutter actuator 236, a mechanical shutter 238, and an input/output interface 240. Further, the image sensor 206 includes the photoelectric conversion elements 208 and a signal processing circuit 242.

The computer 222, the image memory 224, the UI type device 226, the external I/F 228, the communication I/F 230, the photoelectric conversion element driver 232, the mechanical shutter driver 234, and the signal processing circuit 242 are connected to the input/output interface 240. Further, the control device 212 of the interchangeable lens 202 is also connected to the input/output interface 240.

The computer 222 includes a processor 250, a storage 252, and a RAM 254. The processor 250, the storage 252, and the RAM 254 are connected to each other via a bus 256, and the bus 256 is connected to the input/output interface 240. In the example shown in FIG. 4, one bus is shown as the bus 256 for convenience of illustration, but a plurality of buses may be used. The bus 256 may be a serial bus or may be a parallel bus including a data bus, an address bus, a control bus, and the like.

The processor 250 includes, for example, a CPU and a GPU and controls the entire imaging apparatus 200. The GPU operates under the control of the CPU and performs image processing.

The storage 252 is a non-temporary storage medium that stores various parameters and various programs. For example, the storage 252 is an EEPROM. However, this is only an example, and an HDD and/or SSD or the like may be applied as the storage 252 instead of or together with the EEPROM. Further, the RAM 254 temporarily stores various types of information and is used as a work memory.

The processor 250 reads out a necessary program from the storage 252 and executes the read program in the RAM 254. The processor 250 controls the entire imaging apparatus 200 according to the program executed on the RAM 254. In the example shown in FIG. 4, the image memory 224, the UI type device 226, the external I/F 228, the communication I/F 230, the photoelectric conversion element driver 232, the mechanical shutter driver 234, and the control device 212 are controlled by the processor 250.

The photoelectric conversion element driver 232 is connected to the photoelectric conversion elements 208. The photoelectric conversion element driver 232 supplies an imaging time signal, which defines a time at which the imaging is performed by the photoelectric conversion elements 208, to the photoelectric conversion elements 208 according to an instruction from the processor 250. The photoelectric conversion elements 208 perform reset, exposure, and output of an electric signal according to the imaging time signal supplied from the photoelectric conversion element driver 232. Examples of the imaging time signal include a vertical synchronization signal and a horizontal synchronization signal.

In a case where the interchangeable lens 202 is attached to the imaging apparatus main body 204, the subject light incident on the imaging lens 210 is imaged on the light-receiving surface 208A by the imaging lens 210. Under the control of the photoelectric conversion element driver 232, the photoelectric conversion elements 208 photoelectrically convert the subject light, which is received from the light-receiving surface 208A, and output the electric signal corresponding to the amount of light of the subject light to the signal processing circuit 242 as analog image data indicating the subject light. Specifically, the signal processing circuit 242 reads out the analog image data from the photoelectric conversion elements 208 in units of one frame and for each horizontal line by using an exposure sequential reading out method.

The signal processing circuit 242 generates digital image data by digitizing the analog image data. In the following, for convenience of explanation, in a case where it is not necessary to distinguish between digital image data to be internally processed in the imaging apparatus main body 204 and an image indicated by the digital image data (that is, an image that is visualized based on the digital image data and displayed on the display 260 or the like), it is referred to as a "captured image".

The mechanical shutter 238 is a focal plane shutter and is disposed between the stop 210D and the light-receiving surface 208A. The mechanical shutter 238 includes a front curtain (not shown) and a rear curtain (not shown). Each of the front curtain and the rear curtain includes a plurality of leaf blades. The front curtain is disposed closer to the subject side than the rear curtain.

The mechanical shutter actuator 236 is an actuator having a link mechanism (not shown), a solenoid for a front curtain (not shown), and a solenoid for a rear curtain (not shown). The solenoid for a front curtain is a drive source for the front curtain and is mechanically connected to the front curtain via the link mechanism. The solenoid for a rear curtain is a drive source for the rear curtain and is mechanically connected to the rear curtain via the link mechanism. The mechanical shutter driver 234 controls the mechanical shutter actuator 236 according to the instruction from the processor 250.

The solenoid for a front curtain generates power under the control of the mechanical shutter driver 234 and selectively performs winding up and pulling down the front curtain by applying the generated power to the front curtain. The solenoid for a rear curtain generates power under the control of the mechanical shutter driver 234 and selectively performs winding up and pulling down the rear curtain by applying the generated power to the rear curtain. In the imaging apparatus 200, the exposure amount with respect to the photoelectric conversion elements 208 is controlled by controlling the opening and closing of the front curtain and the opening and closing of the rear curtain by the processor 250.

In the imaging apparatus 200, the imaging for a live view image and the imaging for a recorded image for recording the still image and/or the moving image are performed by using the exposure sequential reading out method (rolling shutter method). The image sensor 206 has an electronic shutter function, and the imaging for a live view image is implemented by achieving an electronic shutter function without operating the mechanical shutter 238 in a fully open state.

On the other hand, imaging accompanied by the main exposure, that is, the imaging for the still image (hereinafter, also referred to as "main imaging") is realized by activating the electronic shutter function and operating the mechanical shutter 238 such that the mechanical shutter 238 transitions from the front curtain closed state to the rear curtain closed state.

The image memory 224 stores the captured image generated by the signal processing circuit 242. That is, the signal processing circuit 242 stores the captured image in the image memory 224.

The UI type device 226 includes a display 260, and the processor 250 displays various types of information on the display 260. Further, the UI type device 226 includes a reception device 262. The reception device 262 includes a touch panel 264, a release button 266, and the like.

The release button 266 functions as an imaging preparation instruction unit and an imaging instruction unit, and is capable of detecting a two-step pressing operation of an imaging preparation instruction state and an imaging instruction state. The imaging preparation instruction state refers to a state in which the release button 266 is pressed, for example, from a standby position to an intermediate position (half pressed position), and the imaging instruction state refers to a state in which the release button 266 is pressed to a final pressed position (fully pressed position) beyond the intermediate position. In the following, the "state of being pressed from the standby position to the half pressed position" is referred to as a "half pressed state", and the "state of being pressed from the standby position to the fully pressed position" is referred to as a "fully pressed state".

In a case where the imaging preparation instruction is provided to the imaging apparatus 200 by pressing the release button 266 to the half pressed position, the control of adjusting the exposure and the control of adjusting the focus are executed. Further, in a case where the imaging instruction is provided to the imaging apparatus 200 by pressing the release button 266 to the fully pressed position, the main imaging is executed. Depending on the configuration of the imaging apparatus 200, the imaging preparation instruction state may be a state in which the user's finger is in contact with the release button 266, and the imaging instruction state may be a state in which the operating user's finger is moved from the state of being in contact with the release button 266 to the state of being away from the release button 266.

The external I/F 228 controls the exchange of various types of information between the imaging apparatus 200 and an apparatus present outside the imaging apparatus 200 (hereinafter, also referred to as an "external apparatus"). Examples of the external I/F 228 include a USB interface.

The communication I/F 230 controls transmission and reception of information with respect to the imaging support apparatus 10 by the imaging apparatus 200. As an example shown in FIG. 4, the communication I/F 230 is connected to the imaging support apparatus 10 (see FIG. 2) in a communicable manner. Here, the communication I/F 230 is connected to the second communication I/F 22 of the imaging support apparatus 10 in a wirelessly communicable manner with the default wireless communication standard. Here, although wireless communication is exemplified, the present disclosed technology is not limited to this, and wired communication may be applied instead of wireless communication. The communication I/F 230 controls exchange of information between the processor 30 of the imaging support apparatus 10 and the processor 250 of the imaging apparatus 200. For example, the communication I/F 230 transmits the information in response to a request from the processor 250 to the imaging support apparatus 10. Further, the communication I/F 230 receives the information transmitted from the processor 30 of the imaging support apparatus 10 via the second communication I/F 22 and outputs the received information to the processor 250 via the bus 256.

Figure 5:
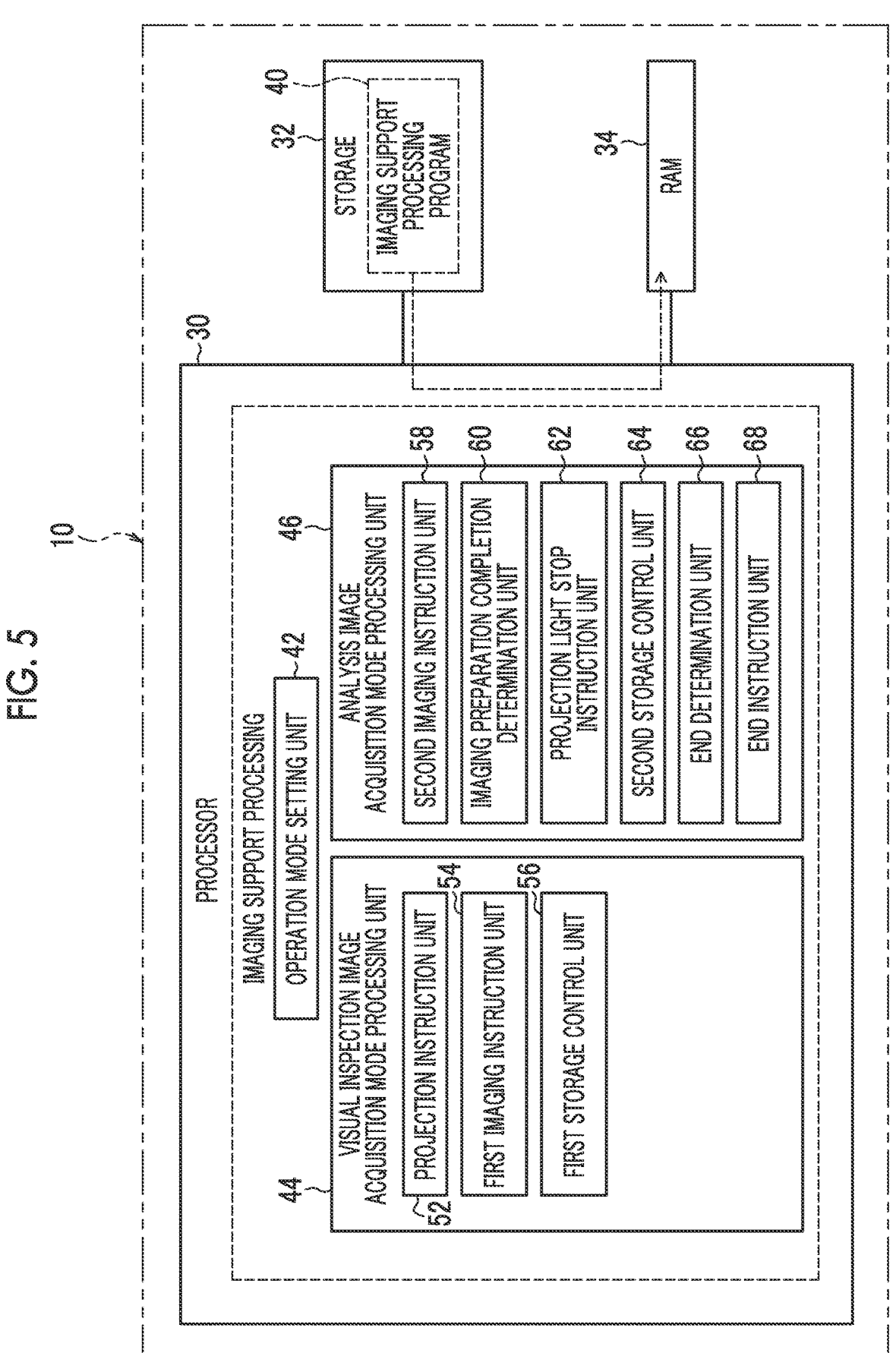
FIG. 5 is a block diagram showing an example of a functional configuration of a processor included in the imaging support apparatus according to the embodiment.

As an example shown in FIG. 5, the storage 32 of the imaging support apparatus 10 stores an imaging support processing program 40. The imaging support processing program 40 is an example of a "program" according to the present disclosed technology.

The processor 30 reads out the imaging support processing program 40 from the storage 32 and executes the read imaging support processing program 40 on the RAM 34. The processor 30 performs the imaging support processing according to the imaging support processing program 40 executed on the RAM 34. The processor 30 operates as an operation mode setting unit 42, a visual inspection image acquisition mode processing unit 44, and an analysis image acquisition mode processing unit 46 by executing the imaging support processing program 40.

The imaging support apparatus 10 has a visual inspection image acquisition mode and an analysis image acquisition mode, as an operation mode. The operation mode setting unit 42 sets the visual inspection image acquisition mode or the analysis image acquisition mode as the operation mode of the imaging support apparatus 10. As an example, the operation mode of the imaging support apparatus 10 is alternately switched between the visual inspection image acquisition mode and the analysis image acquisition mode by the operation mode setting unit 42. The visual inspection image acquisition mode is an example of a "first mode" according to the present disclosed technology, and the analysis image acquisition mode is an example of a "second mode" according to the present disclosed technology.

In a case where the operation mode of the imaging support apparatus 10 is set to the visual inspection image acquisition mode by the operation mode setting unit 42, the processor 30 operates as the visual inspection image acquisition mode processing unit 44. The visual inspection image acquisition mode processing unit 44 includes a projection instruction unit 52, a first imaging instruction unit 54, and a first storage control unit 56.

In a case where the operation mode of the imaging support apparatus 10 is set to the analysis image acquisition mode by the operation mode setting unit 42, the processor 30 operates as the analysis image acquisition mode processing unit 46. The analysis image acquisition mode processing unit 46 operates as a second imaging instruction unit 58, an imaging preparation completion determination unit 60, a projection light stop instruction unit 62, a second storage control unit 64, an end determination unit 66, and an end instruction unit 68.

Figure 6:
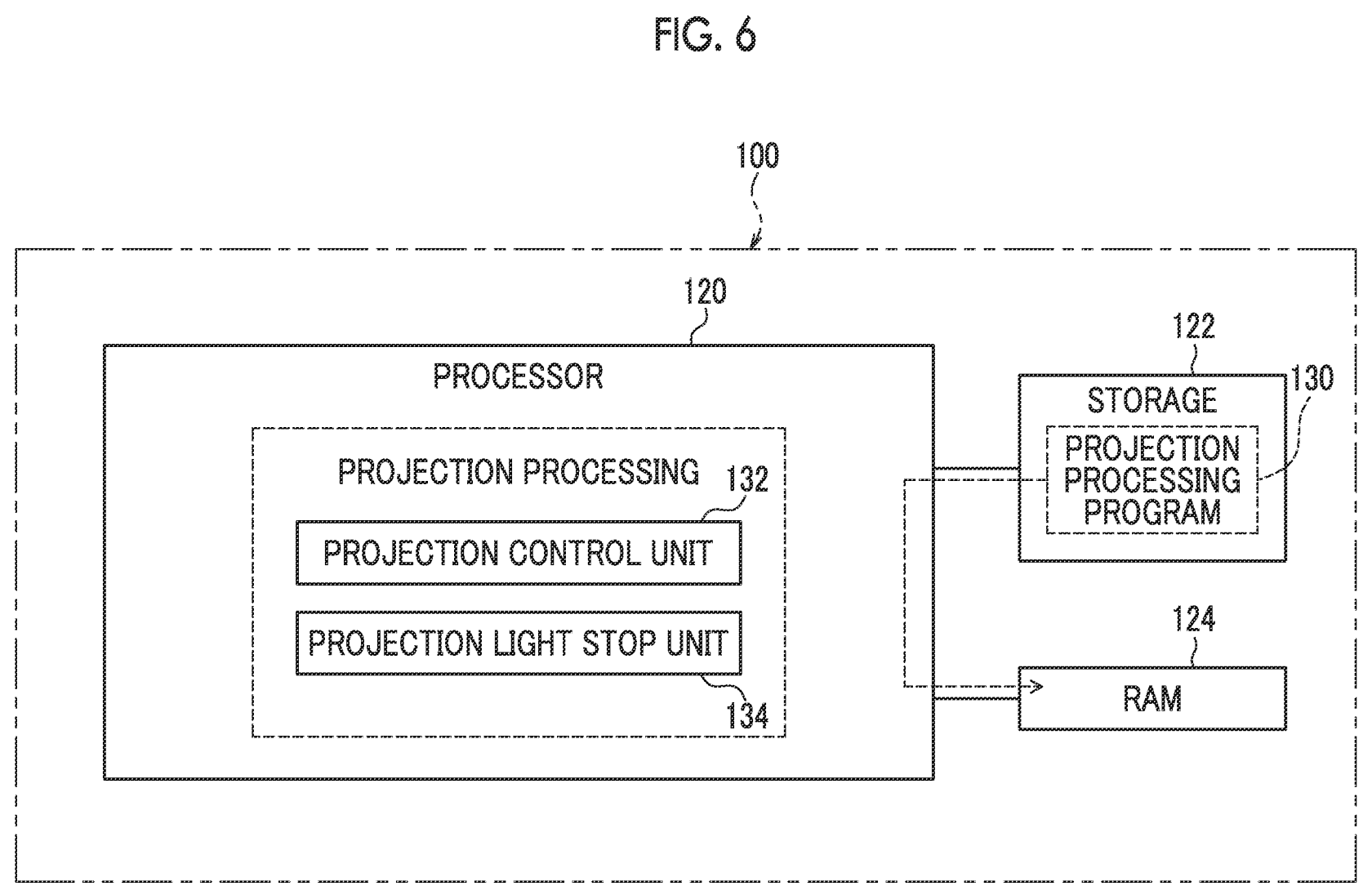

As an example shown in FIG. 6, the storage 122 of the projection apparatus 100 stores a projection processing program 130.

The processor 120 reads out the projection processing program 130 from the storage 122 and executes the read projection processing program 130 on the RAM 124. The processor 120 performs the projection processing in accordance with the projection processing program 130 executed on the RAM 124. The processor 120 operates as a projection control unit 132 and a projection light stop unit 134 by executing the projection processing program 130.

Figure 7:
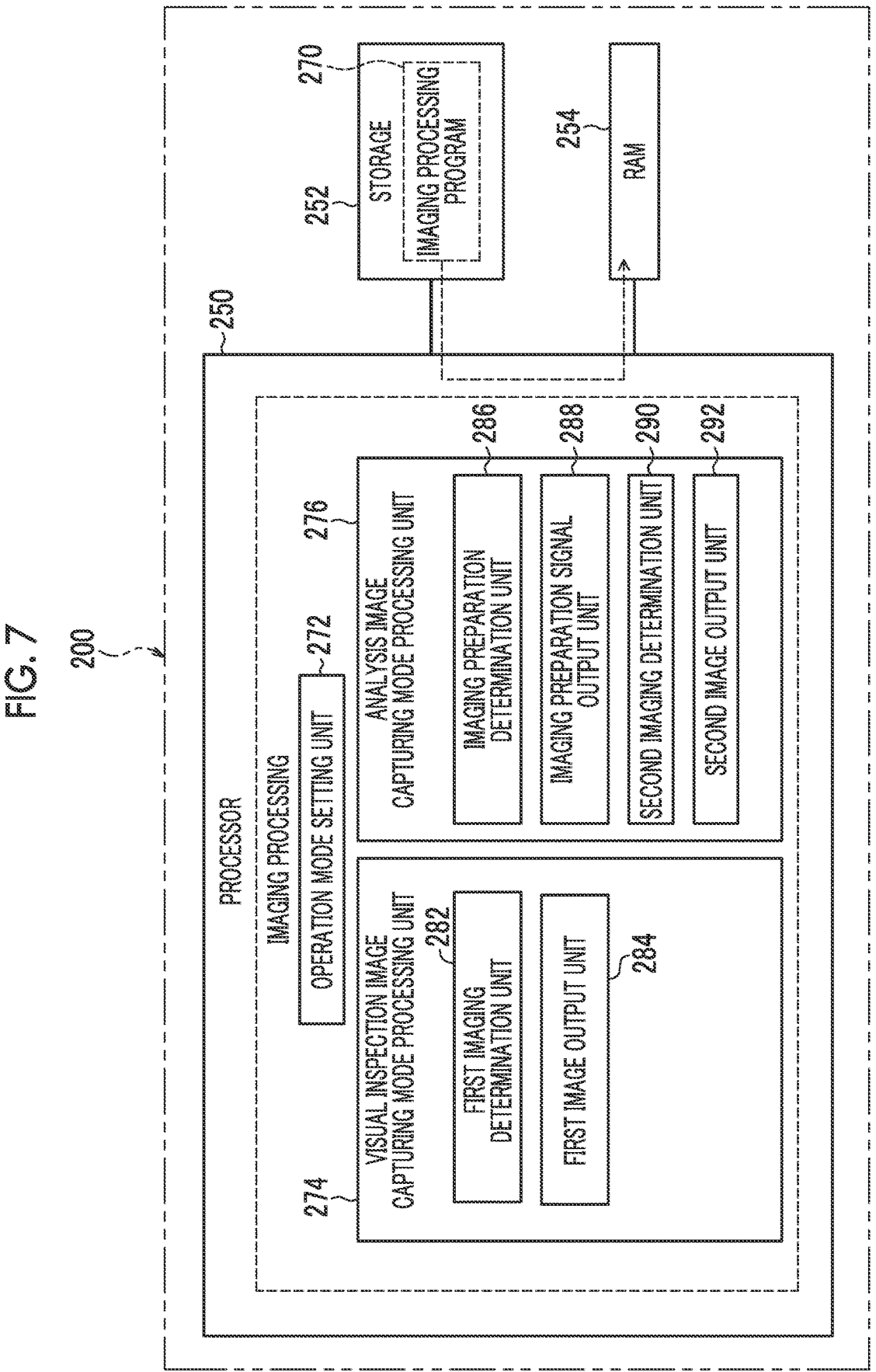
FIG. 7 is a block diagram showing an example of a functional configuration of a processor included in the imaging apparatus according to the embodiment.

As an example shown in FIG. 7, an imaging processing program 270 is stored in the storage 252 of the imaging apparatus 200.

The processor 250 reads out the imaging processing program 270 from the storage 252 and executes the read imaging processing program 270 on the RAM 254. The processor 250 performs the imaging processing in accordance with the imaging processing program 270 executed on the RAM 254. The processor 250 operates as an operation mode setting unit 272, a visual inspection image capturing mode processing unit 274, and an analysis image capturing mode processing unit 276 by executing the imaging processing program 270.

The imaging apparatus 200 has a visual inspection image capturing mode and an analysis image capturing mode as an operation mode. The operation mode setting unit 272 sets the visual inspection image capturing mode or the analysis image capturing mode as the operation mode of the imaging apparatus 200. As an example, the operation mode of the imaging apparatus 200 is alternately switched between the visual inspection image capturing mode and the analysis image capturing mode by the operation mode setting unit 272.

In a case where the operation mode of the imaging apparatus 200 is set to the visual inspection image capturing mode by the operation mode setting unit 272, the processor 250 operates as the visual inspection image capturing mode processing unit 274. The visual inspection image capturing mode processing unit 274 includes a first imaging determination unit 282 and a first image output unit 284.

In a case where the operation mode of the imaging apparatus 200 is set to the analysis image capturing mode by the operation mode setting unit 272, the processor 250 operates as the analysis image capturing mode processing unit 276. The analysis image capturing mode processing unit 276 operates as an imaging preparation determination unit 286, an imaging preparation signal output unit 288, a second imaging determination unit 290, and a second image output unit 292.

In the imaging support apparatus, the imaging support processing is started by providing a start instruction to start the imaging support processing with respect to the imaging support apparatus 10. Further, each of the projection processing in the projection apparatus 100 and the imaging processing in the imaging apparatus 200 is started in accordance with the start of the imaging support processing.

Hereinafter, visual inspection image acquisition processing will be described, which is executed by the visual inspection image acquisition mode processing unit 44 in a case where the operation mode of the imaging support apparatus 10 is set to the visual inspection image acquisition mode by the operation mode setting unit 42.

Figure 8:
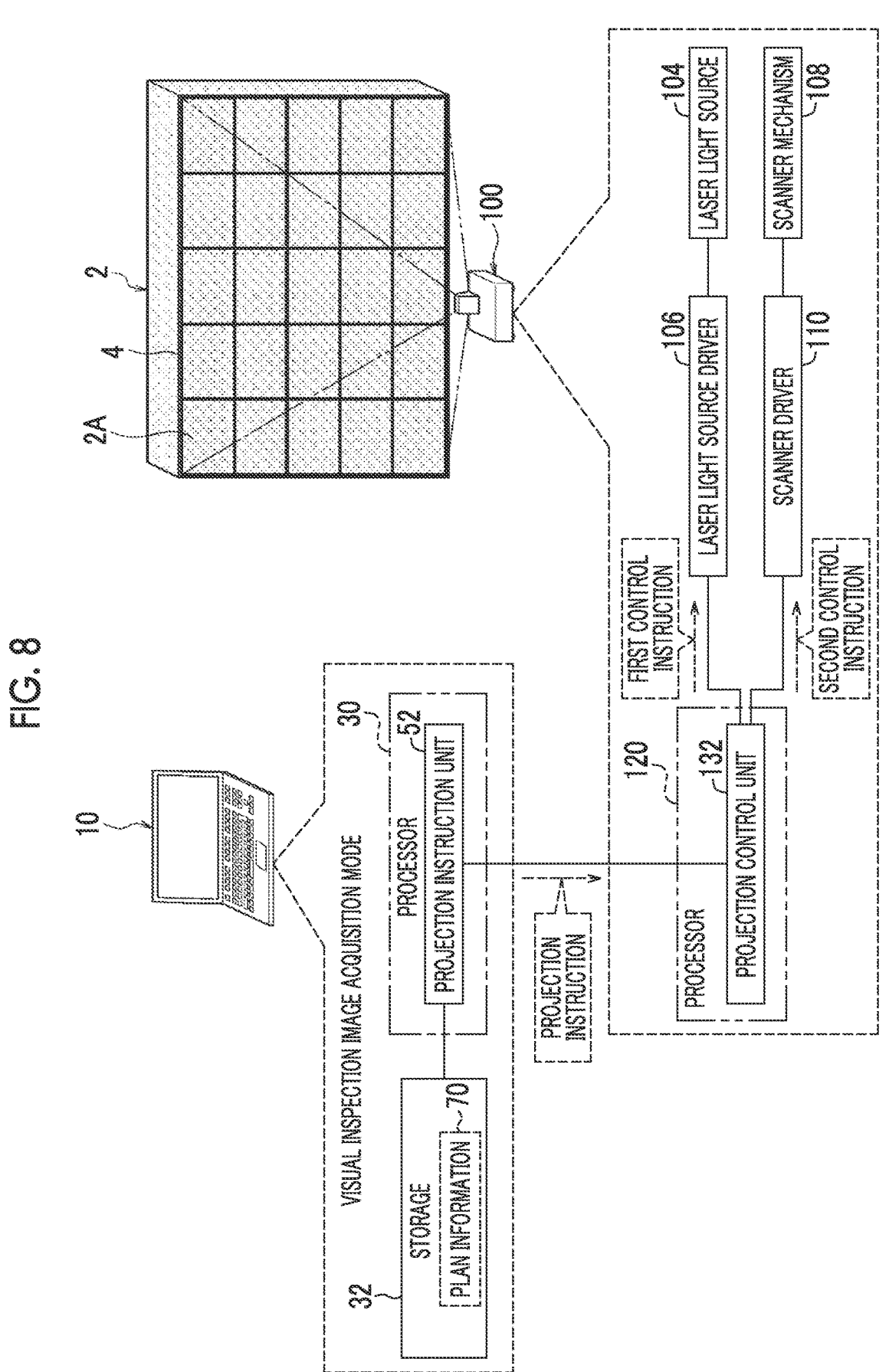
FIG. 8 is a block diagram showing an example of an operation of the imaging system in a case where projection light is projected onto an inspection target according to the embodiment.

As an example shown in FIG. 8, in the imaging support apparatus 10, in a case where the visual inspection image acquisition mode is set, the projection instruction unit 52 outputs a projection instruction to the processor 120 of the projection apparatus 100. The projection instruction is an instruction to project the projection light 4 onto the inspection target 2. The projection instruction includes an instruction related to a projection position and a projection range where the projection light 4 is projected onto the inspection target 2. As an example, plan information 70 is stored in the storage 32 of the imaging support apparatus 10. The plan information 70 is information indicating projection contents of the projection light 4 projected onto the inspection target 2 and a default plan related to the projection position and the projection range where the projection light 4 is projected onto the inspection target 2. The projection instruction unit 52 generates a projection instruction in accordance with the plan information 70 and outputs the projection instruction.

In the projection apparatus 100, in a case where the projection instruction is received, the projection control unit 132 generates a first control instruction and a second control instruction based on the projection instruction. Thereafter, the projection control unit 132 outputs the first control instruction with respect to the laser light source driver 106 and outputs the second control instruction with respect to the scanner driver 110. In a case where the first control instruction is received, the laser light source driver 106 outputs laser light from the laser light source 104 such that the laser light is projected onto the inspection target 2. In a case where the second control instruction is received, the scanner driver 110 drives the scanner mechanism 108 such that the projection light 4 is formed at the projection position and the projection range designated by the projection instruction by the laser light to perform scanning with the laser light.

In the example shown in FIG. 8, the projection light 4 is displayed on the inspection target 2 in a grid shape. The projection light 4 makes compartments of a plurality of imaging target regions 2A with a wall surface of the inspection target 2. That is, the inside of each frame of the grid displayed by the projection light 4 is the imaging target region 2A. The imaging target region 2A is a region to be imaged by the imaging person 6 with the imaging apparatus 200 (see FIG. 1). The plurality of imaging target regions 2A are imaged in a default order. The projection light 4 represents a position of an edge portion of each imaging target region 2A. That is, each frame of the grid displayed by the projection light 4 defines the position of the edge portion of each imaging target region 2A. Further, the projection light 4 represents a range of each imaging target region 2A. That is, each frame of the grid displayed by the projection light 4 defines a range of each imaging target region 2A.

Figure 9:
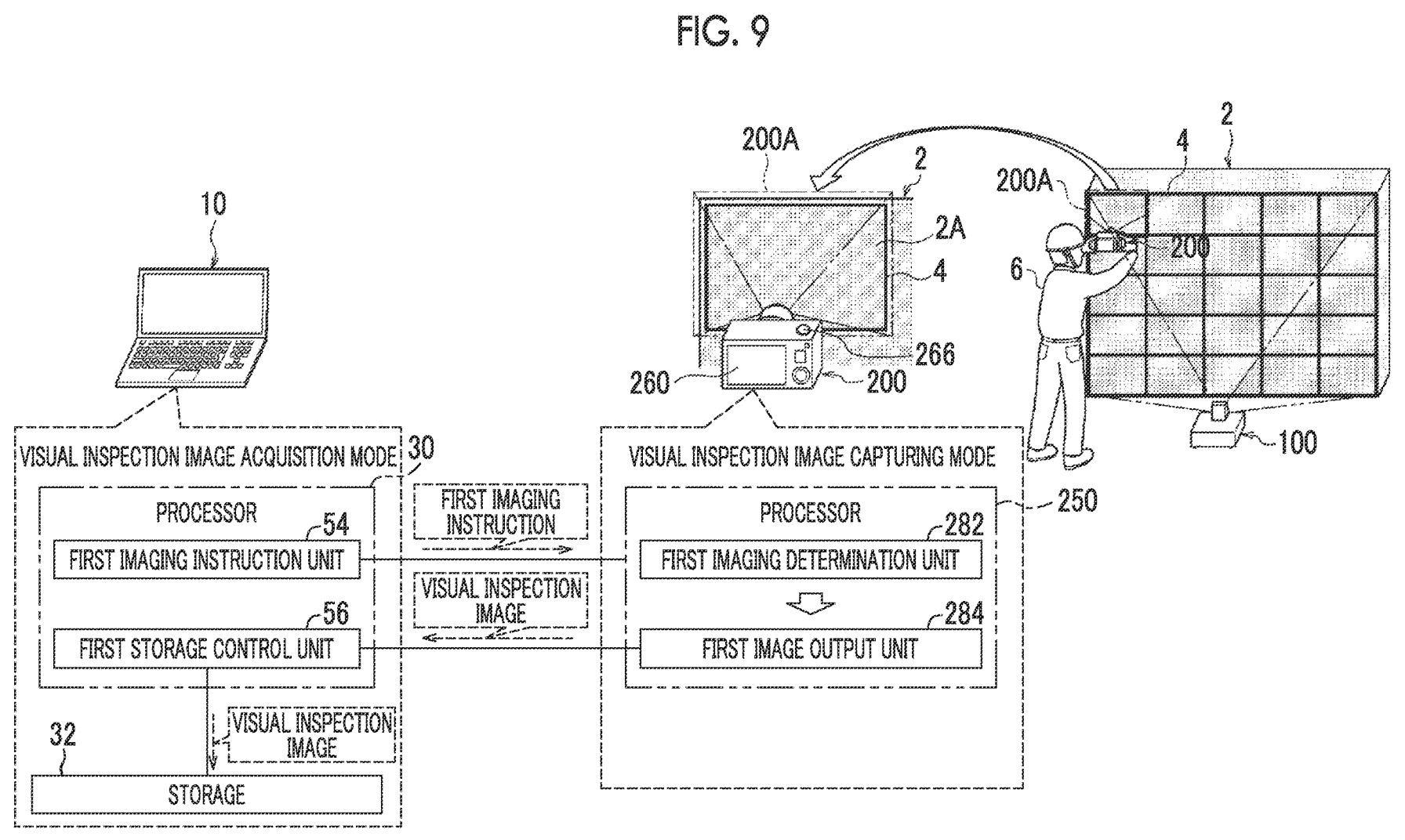

As an example shown in FIG. 9, in the imaging support apparatus 10, after the projection instruction is output from the projection instruction unit 52 (see FIG. 8), the first imaging instruction unit 54 outputs the first imaging instruction to the processor 250 of the imaging apparatus 200. In a case where the first imaging instruction is received, the processor 250 of the imaging apparatus 200 sets the operation mode to the visual inspection image capturing mode. In a case where the processor 250 of the imaging apparatus 200 sets the operation mode to the visual inspection image capturing mode, a message prompting the imaging person 6 to perform imaging may be displayed on the display 260 of the imaging apparatus 200.

The imaging person 6 images the plurality of imaging target regions 2A in the default order with the imaging apparatus 200. FIG. 9 shows an example of a state in which the imaging person 6 images the upper left imaging target region 2A with the imaging apparatus 200 among the plurality of imaging target regions 2A. In a case where imaging is performed on the imaging target region 2A with the imaging apparatus 200, the imaging person 6 adjusts a position of the imaging apparatus 200 with respect to the imaging target region 2A such that the imaging target region 2A is contained within an imaging range 200A of the imaging apparatus 200. In a case where the release button 266 of the imaging apparatus 200 is pressed to the fully pressed position by the imaging person 6, the imaging apparatus 200 images the imaging target region 2A.

In the imaging apparatus 200, the first imaging determination unit 282 determines whether or not imaging is performed by the imaging apparatus 200. As an example, in a case where a fully pressed detection signal is received, which is output from the reception device 262 (see FIG. 4) in response to the release button 266 of the imaging apparatus 200 being pressed to the fully pressed position, the first imaging determination unit 282 determines that the imaging has been performed by the imaging apparatus 200. In a case where the imaging apparatus 200 images the imaging target region 2A, a visual inspection image is obtained as a captured image. Since the projection light 4 is projected onto the inspection target 2 in a case where the visual inspection image is acquired, the visual inspection image includes an image corresponding to the projection light 4 in addition to an image corresponding to the imaging target region 2A. That is, the projection light 4 is reflected as an image in the image corresponding to the imaging target region 2A.

In the imaging apparatus 200, in a case where the first imaging determination unit 282 determines that the imaging is performed by the imaging apparatus 200, the first image output unit 284 outputs the visual inspection image to the processor 30 of the imaging support apparatus 10.

In the imaging support apparatus 10, in a case where the visual inspection image is received, the first storage control unit 56 stores the visual inspection image in the storage 32. For example, the visual inspection image is stored in the storage 32 together with information related to an imaging order. That is, the storage 32 stores the visual inspection image and the information related to an imaging order in a state of being associated with each other.

As described above, in the visual inspection image acquisition processing, the imaging target region 2A is imaged in a state in which the projection of the projection light 4 onto the inspection target 2 is maintained, and as a result, the visual inspection image including the projection light 4 as an image is acquired.

In a case where the first storage control unit 56 stores the visual inspection image in the storage 32, the operation mode of the imaging support apparatus 10 is set to the analysis image acquisition mode by the operation mode setting unit 42.

Hereinafter, analysis image acquisition processing will be described, which is executed by the analysis image acquisition mode processing unit 46 in a case where the operation mode of the imaging support apparatus 10 is set to the analysis image acquisition mode by the operation mode setting unit 42.

Figure 10:
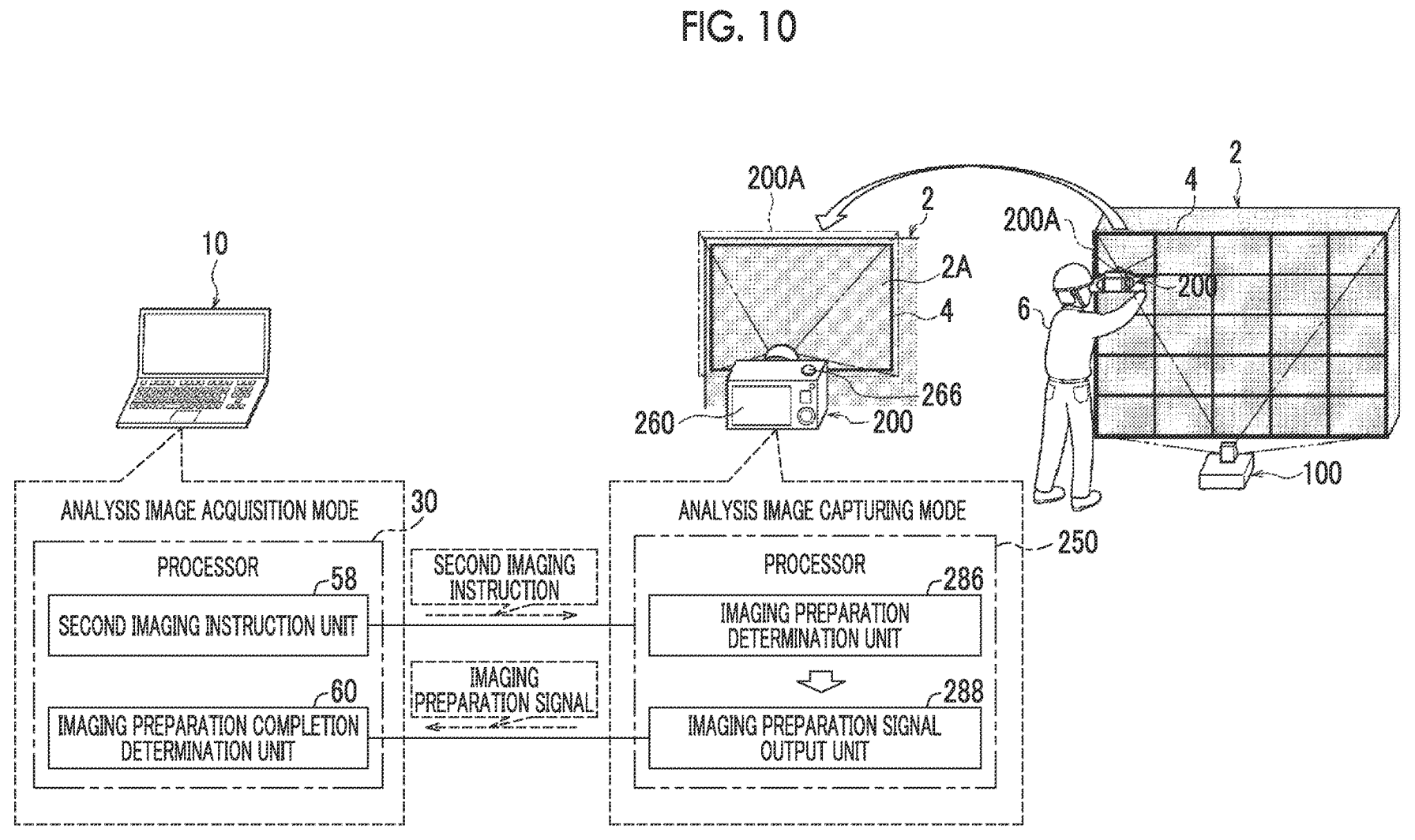

As an example shown in FIG. 10, in the imaging support apparatus 10, in a case where the analysis image acquisition mode is set, the second imaging instruction unit 58 outputs the second imaging instruction to the processor 250 of the imaging apparatus 200. In a case where the second imaging instruction is received, the processor 250 of the imaging apparatus 200 sets the operation mode to the analysis image capturing mode. In a case where the processor 250 of the imaging apparatus 200 sets the operation mode to the analysis image capturing mode, a message prompting the imaging person 6 to perform imaging may be displayed on the display 260 of the imaging apparatus 200.

The imaging person 6 images the same imaging target region 2A as in the case of acquiring the visual inspection image with the imaging apparatus 200. FIG. 10 shows an example of a state in which the imaging person 6 images the upper left imaging target region 2A with the imaging apparatus 200 among the plurality of imaging target regions 2A. In a case where imaging is performed on the imaging target region 2A with the imaging apparatus 200, the imaging person 6 adjusts a position of the imaging apparatus 200 with respect to the imaging target region 2A such that the imaging target region 2A is contained within an imaging range 200A of the imaging apparatus 200. In a case where the release button 266 of the imaging apparatus 200 is pressed to the half pressed position by the imaging person 6, the imaging apparatus 200 enters an imaging preparation state for imaging the imaging target region 2A.

In the imaging apparatus 200, the imaging preparation determination unit 286 determines whether or not the imaging apparatus 200 is in an imaging preparation state. As an example, in a case where a half pressed detection signal is received, which is output from the reception device 262 (see FIG. 4) in response to the release button 266 of the imaging apparatus 200 being pressed to the half pressed position, the imaging preparation determination unit 286 determines that the imaging apparatus 200 is in an imaging preparation state.

In the imaging apparatus 200, in a case where the imaging preparation determination unit 286 determines that the imaging apparatus 200 is in an imaging preparation state, the imaging preparation signal output unit 288 outputs an imaging preparation signal to the processor 30 of the imaging support apparatus 10.

In the imaging support apparatus 10, the imaging preparation completion determination unit 60 determines whether or not the preparation of the imaging for the imaging apparatus 200 is completed. As an example, in a case where the imaging preparation signal is received, the imaging preparation completion determination unit 60 determines that the preparation of the imaging for the imaging apparatus 200 is completed. The reception of the imaging preparation signal by the imaging preparation completion determination unit 60 corresponds to the reception of an imaging preparation instruction provided to the imaging apparatus 200 by the processor 30 of the imaging support apparatus 10.

Figure 11:
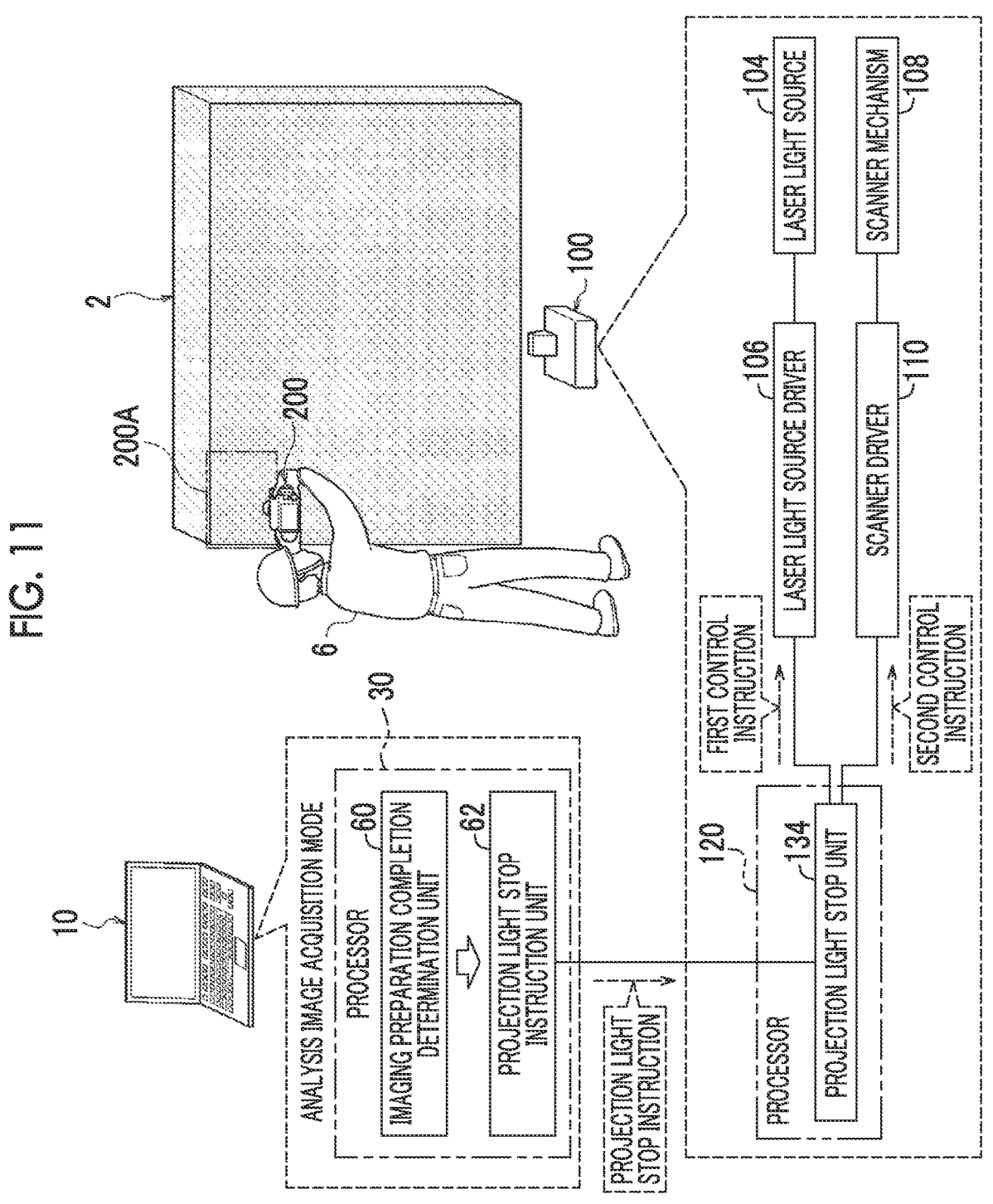
FIG. 11 is a block diagram showing an example of an operation of the imaging system in a case where the projection light projected onto the inspection target according to the embodiment is stopped.

As an example shown in FIG. 11, in the imaging support apparatus 10, in a case where the imaging preparation completion determination unit 60 determines that the preparation of the imaging for the imaging apparatus 200 is completed, the projection light stop instruction unit 62 outputs a projection light stop instruction to the processor 120 of the projection apparatus 100.

In the projection apparatus 100, in a case where the projection light stop instruction is received, the projection light stop unit 134 outputs a first stop instruction to the laser light source driver 106 and outputs a second stop instruction to the scanner driver 110. In a case where the first stop instruction is received, the laser light source driver 106 stops the output of the laser light from the laser light source 104. In a case where the second stop instruction is received, the scanner driver 110 stops the drive of the scanner mechanism 108. Accordingly, the projection light 4 (see FIGS. 8 to 10) projected onto the inspection target 2 disappears.

Figure 12:
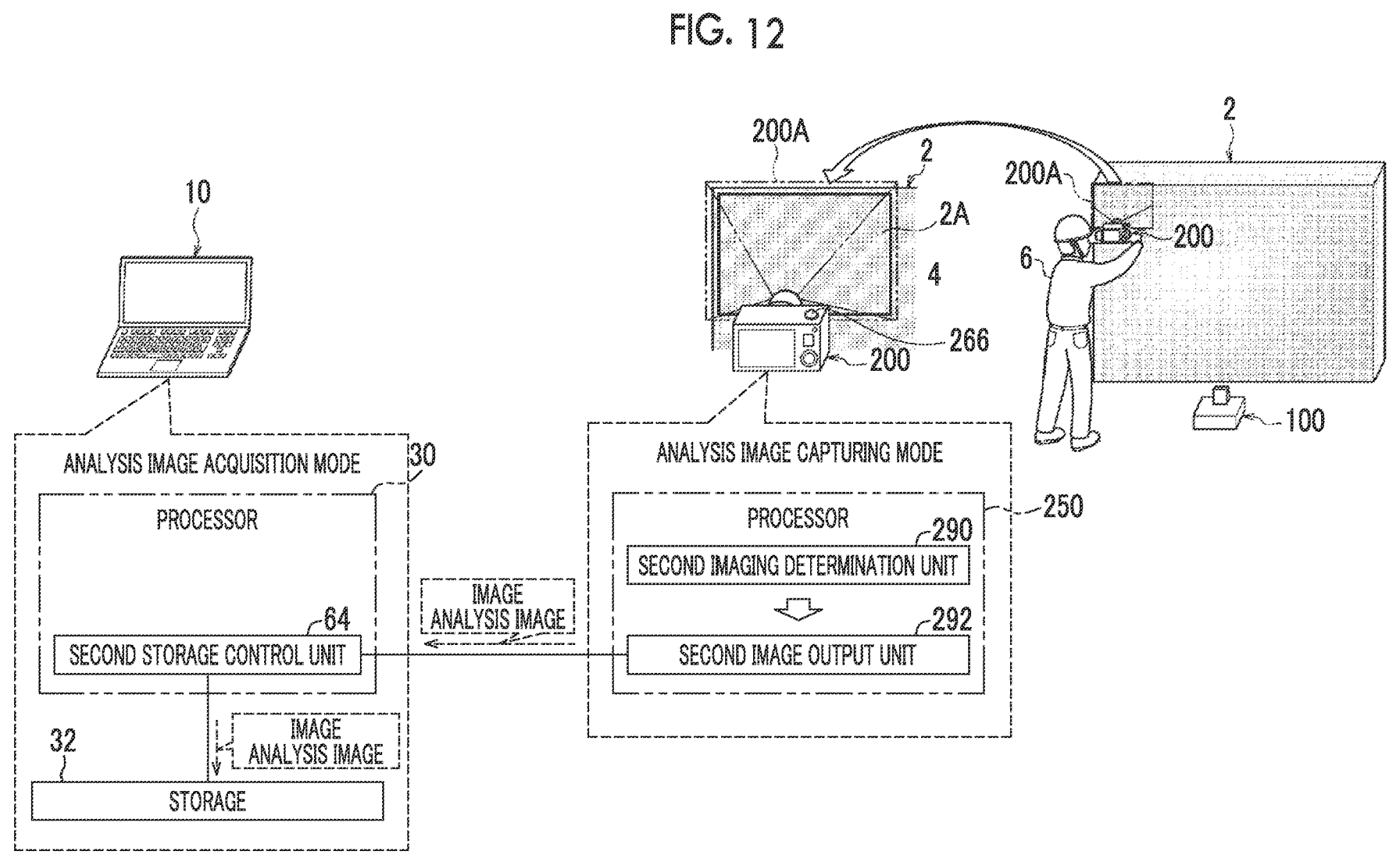

As an example shown in FIG. 12, after confirming the fact that the projection light 4 (see FIGS. 8 to 10) that is projected onto the inspection target 2 has disappeared, the imaging person 6 presses the release button 266 of the imaging apparatus 200 to the fully pressed position. In a case where the release button 266 of the imaging apparatus 200 is pressed to the fully pressed position by the imaging person 6, the imaging target region 2A is imaged by the imaging apparatus 200.

In the imaging apparatus 200, the second imaging determination unit 290 determines whether or not imaging is performed by the imaging apparatus 200. As an example, in a case where a fully pressed detection signal is received, which is output from the reception device 262 (see FIG. 4) in response to the release button 266 of the imaging apparatus 200 being pressed to the fully pressed position, the second imaging determination unit 290 determines that the imaging has been performed by the imaging apparatus 200. In a case where the imaging target region 2A is imaged by the imaging apparatus 200, an analysis image is obtained as a captured image. Since the projection light 4 that is projected onto the inspection target 2 is stopped in a case where the analysis image is acquired, the analysis image includes the image corresponding to the imaging target region 2A but does not include the image corresponding to the projection light 4. That is, the projection light 4 is not reflected as an image in the image corresponding to the imaging target region 2A.

In the imaging apparatus 200, in a case where the second imaging determination unit 290 determines that the imaging is performed by the imaging apparatus 200, the second image output unit 292 outputs the analysis image to the processor 30 of the imaging support apparatus 10.

In the imaging support apparatus 10, in a case where the analysis image is received, the second storage control unit 64 stores the analysis image in the storage 32. For example, the analysis image is stored in the storage 32 together with information related to an imaging order. That is, the storage 32 stores the analysis image and the information related to an imaging order in a state of being associated with each other.

The information related to the imaging order may not be stored in the storage 32 together with the analysis image. Instead, in order to splice a plurality of analysis images without gaps in the image analysis apparatus 300, it is preferable to perform the imaging for each frame by the imaging apparatus 200 after aligning the inclinations and sizes between the analysis images adjacent to each other and overlapping a default amount (for example, substantially 30% of one frame) without misregistration in a splicing direction (for example, vertical and horizontal directions). One of the reasons for the overlap is that, in splicing processing, feature points that coincide between the analysis images adjacent to each other are referred to and spliced together, so that a certain number of feature points are required.

Figure 13:
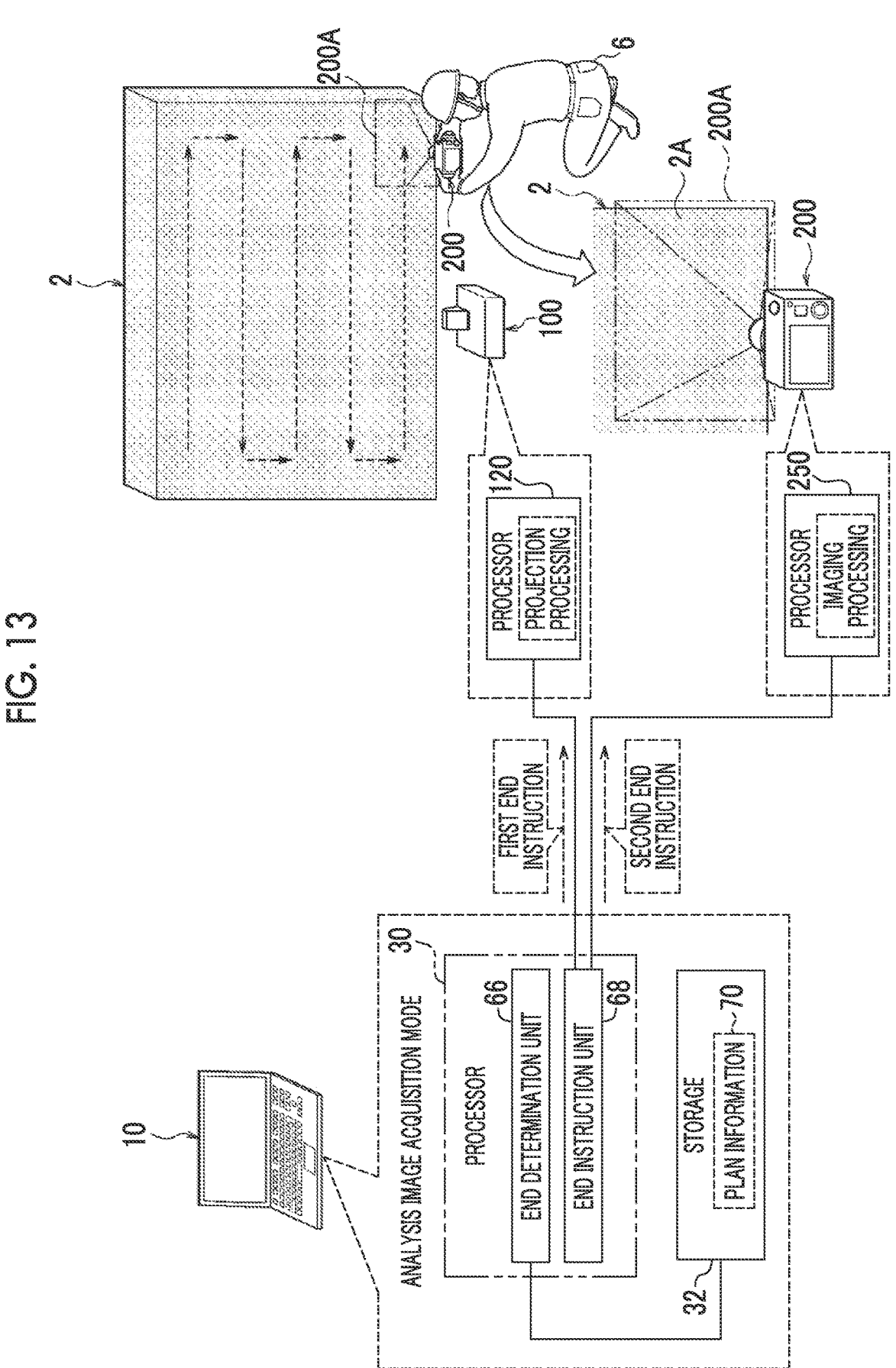
FIG. 13 is a block diagram showing an example of an operation of the imaging system in a case where projection processing and imaging processing according to the embodiment are ended.

As an example shown in FIG. 13, in the imaging support apparatus 10, the end determination unit 66 determines whether or not a condition for ending the imaging support processing is established. For example, the number of the plurality of imaging target regions 2A set for the inspection target 2 is defined in the plan information 70 stored in the storage 32. In a case where the number of analysis images acquired by the imaging apparatus 200 is smaller than the number of the plurality of imaging target regions 2A, the end determination unit 66 determines that the condition for ending the imaging support processing is not established.

In a case where the condition for ending the imaging support processing is not established, the imaging support processing performed by the imaging support apparatus 10 described above is repeatedly executed. By the imaging person 6 imaging the plurality of imaging target regions 2A in the default order with the imaging apparatus 200 along with the repeated execution of the imaging support processing by the imaging support apparatus 10, a plurality of visual inspection images and a plurality of analysis images are stored in the storage 32.

In a case where the number of analysis images acquired by the imaging apparatus 200 reaches the number of the plurality of imaging target regions 2A, the end determination unit 66 determines that the condition for ending the imaging support processing is established. FIG. 13 shows an example of a state in which the imaging person 6 images the plurality of imaging target regions 2A in the default order with the imaging apparatus 200, and the imaging person 6 images the bottom right imaging target region 2A (that is, the last imaging target region 2A) with the imaging apparatus 200 among the plurality of imaging target regions 2A.

In the imaging support apparatus 10, in a case where the end determination unit 66 determines to end the imaging support processing, the end instruction unit 68 outputs a first end instruction to the processor 120 of the projection apparatus 100 and outputs a second end instruction to the processor 250 of the imaging apparatus 200. In a case where the first end instruction is received, the processor 120 of the projection apparatus 100 ends the projection processing, and in a case where the second end instruction is received, the processor 250 of the imaging apparatus 200 ends the imaging processing.

In this way, by executing the imaging support processing, a plurality of visual inspection images and a plurality of analysis images are stored in the storage 32. The plurality of visual inspection images are used for visual inspection, and the plurality of analysis images are provided to the image analysis apparatus 300 as image data for image analysis.

Next, the action of the imaging system 1 will be described with reference to FIGS. 14 to 18.

First, an example of a flow of the imaging support processing performed by the processor 30 of the imaging support apparatus 10 will be described with reference to FIGS. 14 and 15. Here, the description will be made on the premise that the operation mode of the imaging support apparatus 10 is set to the visual inspection image acquisition mode or the analysis image acquisition mode.

Figure 14:
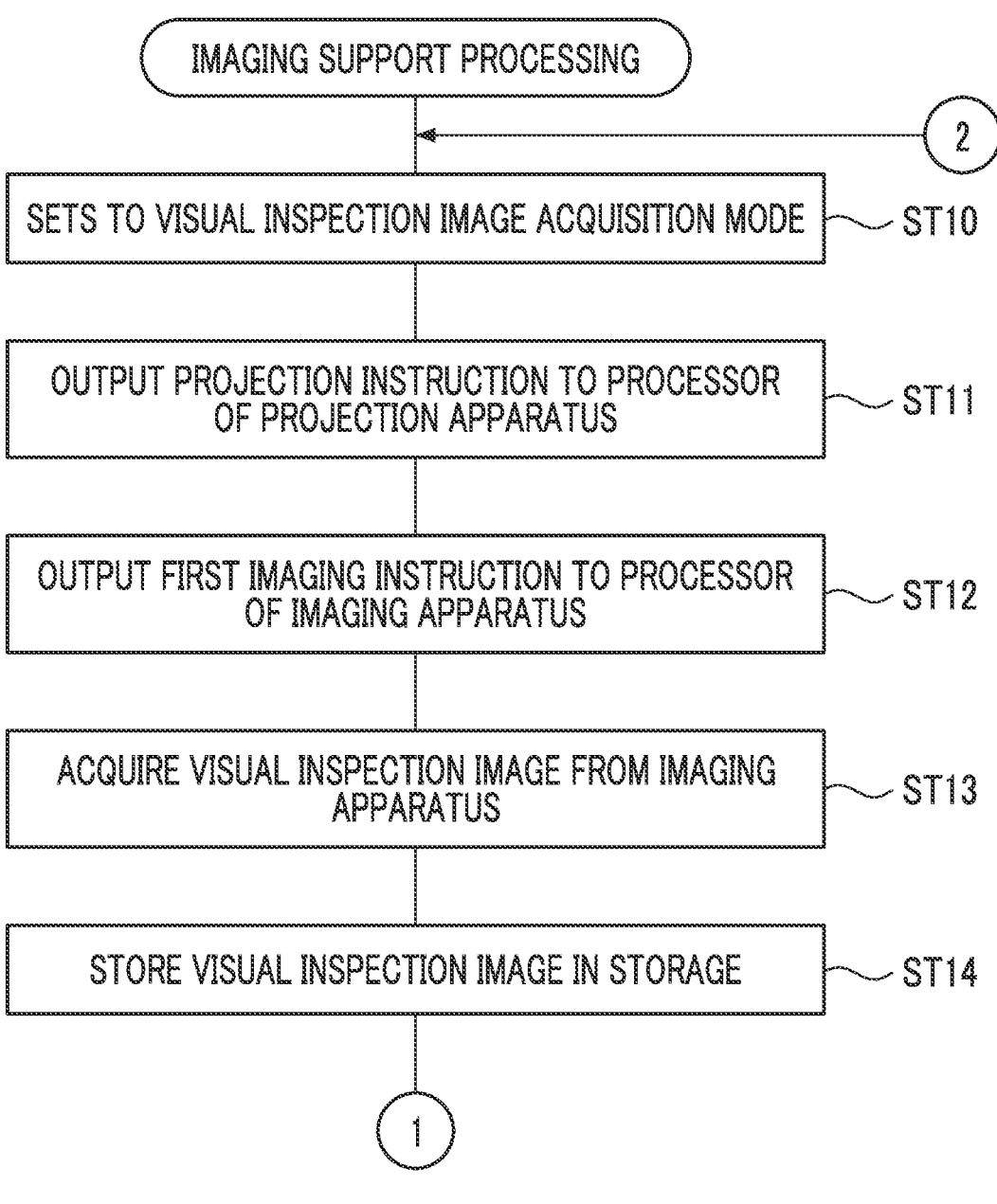
FIG. 14 is a flowchart showing an example of a flow of visual inspection image acquisition processing in imaging support processing executed in the imaging support apparatus according to the embodiment.

In the imaging support processing shown in FIG. 14, first, in step ST10, the operation mode setting unit 42 sets the operation mode to the visual inspection image acquisition mode. After the processing in step ST10 is executed, the imaging support processing shifts to step ST11.

In step ST11, the projection instruction unit 52 causes the projection apparatus 100 to project the projection light 4 onto the inspection target 2 by outputting the projection instruction to the processor 120 of the projection apparatus 100. After the processing in step ST11 is executed, the imaging support processing shifts to step ST12.

In step ST12, the first imaging instruction unit 54 outputs the first imaging instruction to the processor 250 of the imaging apparatus 200. Accordingly, the operation mode of the imaging apparatus 200 is switched to the visual inspection image capturing mode. After the processing in step ST12 is executed, the imaging support processing shifts to step ST13.

Figure 17:
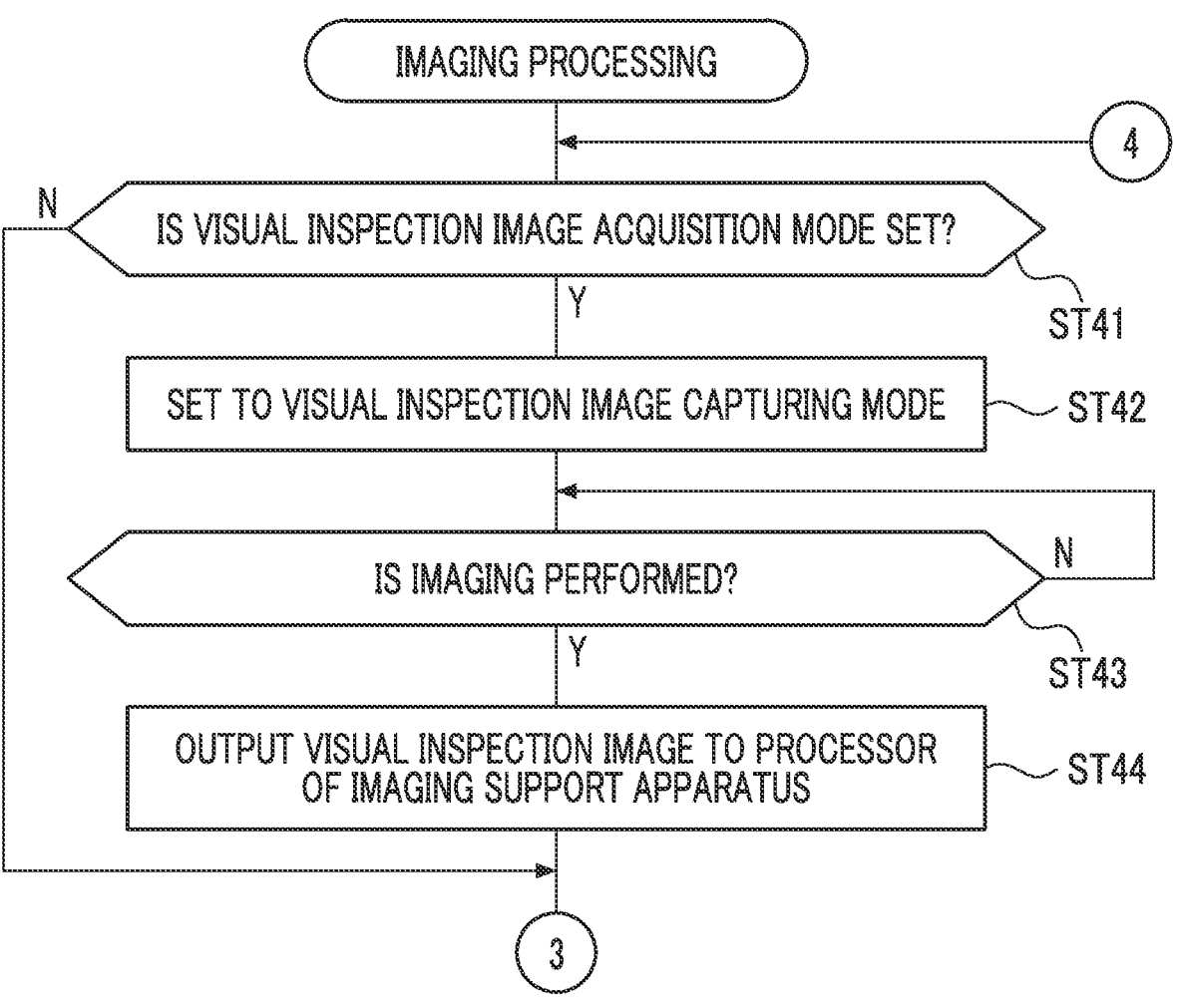
FIG. 17 is a flowchart showing an example of a flow of visual inspection image capturing processing in the imaging processing executed in the imaging apparatus according to the embodiment.

In step ST13, the first storage control unit 56 acquires the visual inspection image output from the imaging apparatus 200 by executing the processing in step ST44 shown in FIG. 17. After the processing in step ST13 is executed, the imaging support processing shifts to step ST14.

In step ST14, the first storage control unit 56 stores the visual inspection image acquired in step ST13 in the storage 32. After the processing in step ST13 is executed, the imaging support processing shifts to step ST15 shown in FIG. 15.

Figure 15:
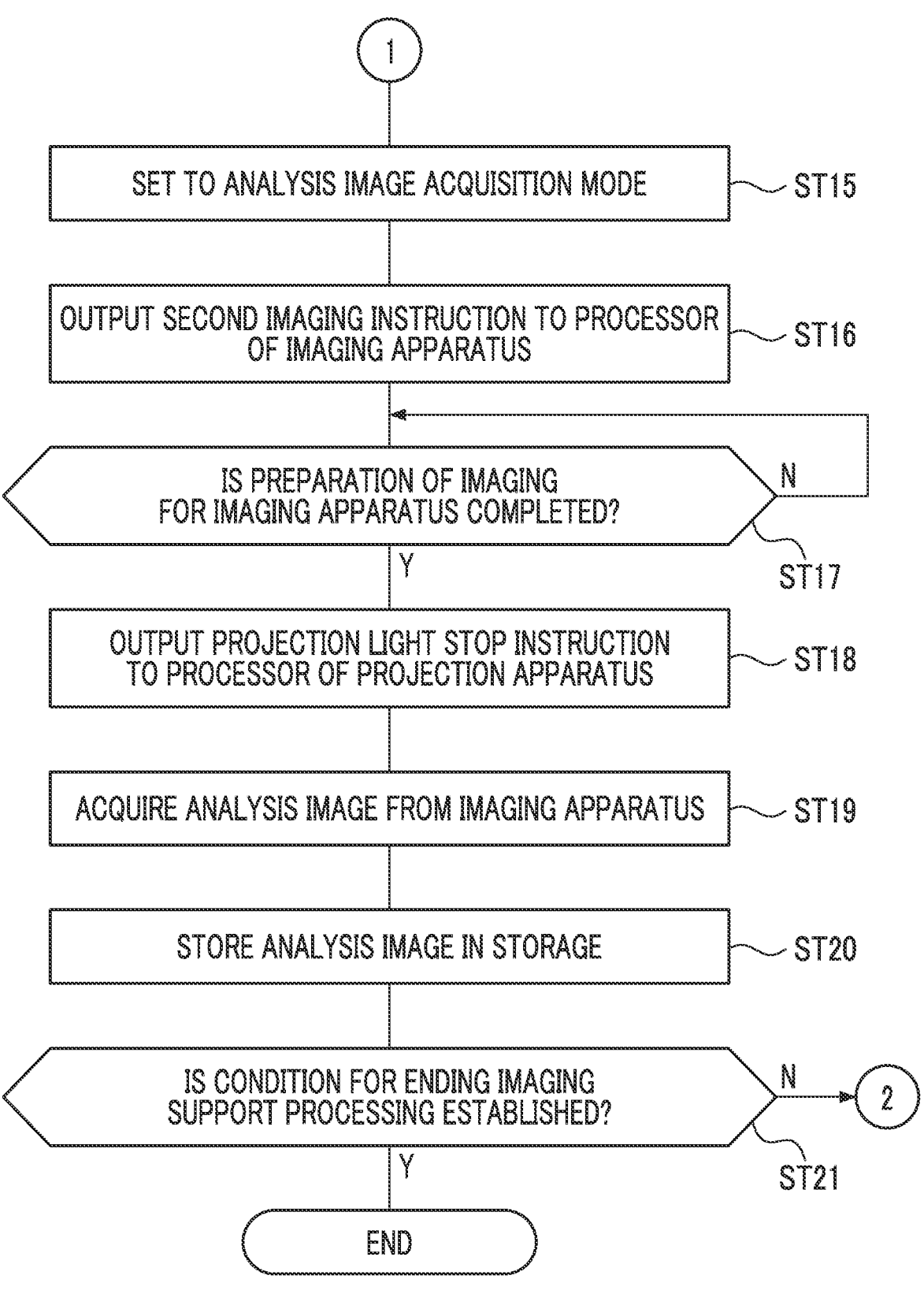
FIG. 15 is a flowchart showing an example of a flow of analysis image acquisition processing in the imaging support processing executed in the imaging support apparatus according to the embodiment.

In step ST15 shown in FIG. 15, the operation mode setting unit 42 sets the operation mode to the analysis image acquisition mode. After the processing in step ST15 is executed, the imaging support processing shifts to step ST16.

In step ST16, the second imaging instruction unit 58 outputs the second imaging instruction to the processor 250 of the imaging apparatus 200. Accordingly, the operation mode of the imaging apparatus 200 is switched to the analysis image capturing mode. After the processing in step ST16 is executed, the imaging support processing shifts to step ST17.

In step ST17, the imaging preparation completion determination unit 60 determines whether or not the preparation of the imaging for the imaging apparatus 200 is completed. In step ST17, in a case where the preparation of the imaging for the imaging apparatus 200 is not completed (that is, in a case where the imaging preparation completion determination unit 60 has not received the imaging preparation signal that is output from the imaging apparatus 200 by executing the processing in step ST47 included in the imaging processing shown in FIG. 18), the determination is set as negative, and the determination of step ST17 is performed again. In step ST17, in a case where the preparation of the imaging for the imaging apparatus 200 is completed (that is, in a case where the imaging preparation completion determination unit 60 has received the imaging preparation signal that is output from the imaging apparatus 200 by executing the processing in step ST47 included in the imaging processing shown in FIG. 18), the determination is set as positive, and the imaging support processing shifts to step ST18.

In step ST18, the projection light stop instruction unit 62 causes the projection apparatus 100 to stop the projection light 4 that is projected onto the inspection target 2 by outputting the projection light stop instruction to the processor 120 of the projection apparatus 100. After the processing in step ST18 is executed, the imaging support processing shifts to step ST19.

Figure 18:
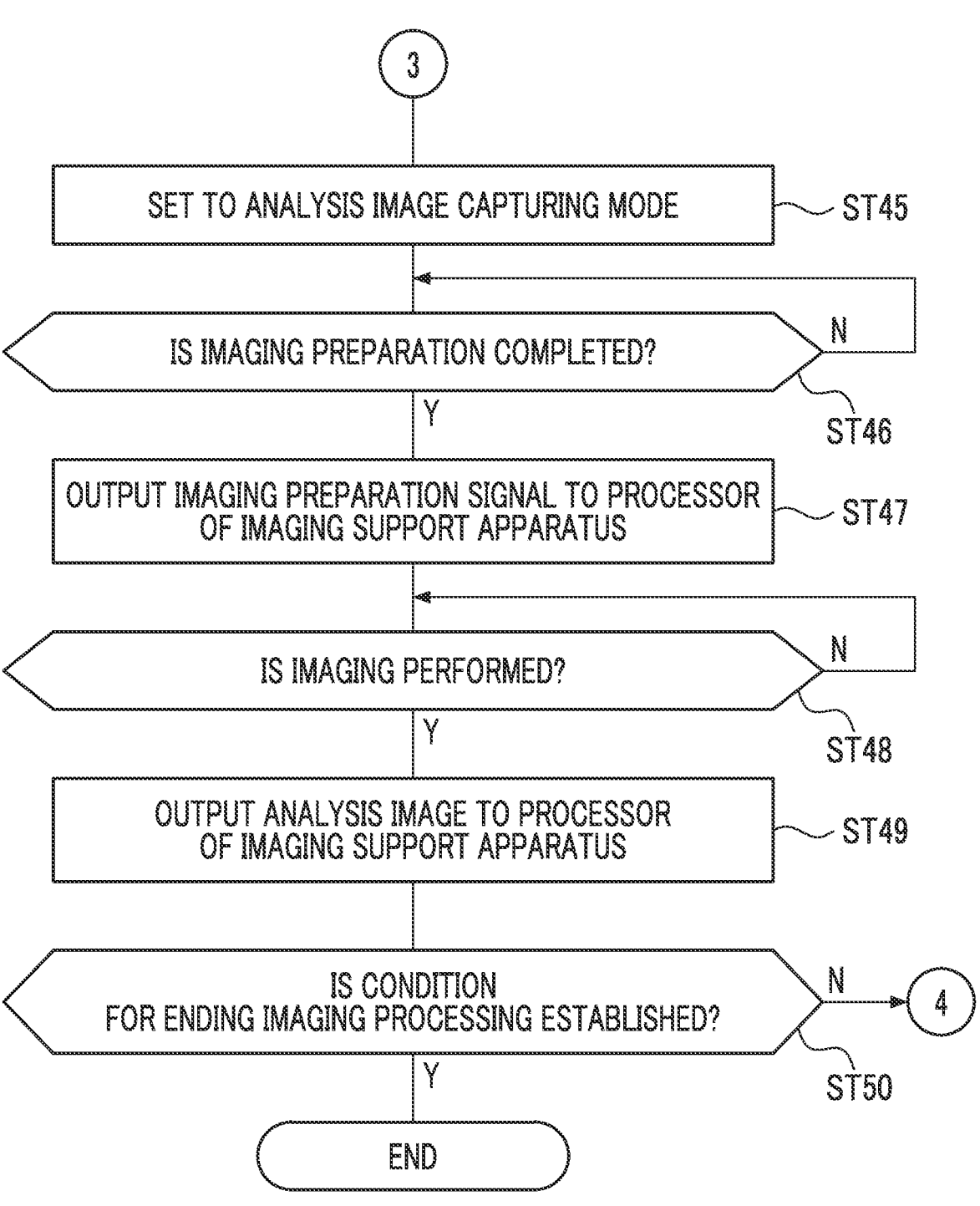
FIG. 18 is a flowchart showing an example of a flow of analysis image capturing processing in the imaging processing executed in the imaging apparatus according to the embodiment.

In step ST19, the second storage control unit 64 acquires the analysis image output from the imaging apparatus 200 by executing the processing in step ST49 shown in FIG. 18. After the processing in step ST19 is executed, the imaging support processing shifts to step ST20.

In step ST20, the second storage control unit 64 stores the analysis image acquired in step ST19 in the storage 32. After the processing in step ST20 is executed, the imaging support processing shifts to step ST21.

In step ST21, the end determination unit 66 determines whether or not the condition for ending the imaging support processing (hereinafter, referred to as an "imaging support processing end condition") is established. An example of the imaging support processing end condition includes a condition in which the number of frames of the analysis image acquired from the imaging apparatus 200 in step ST19 reaches the number of the plurality of imaging target regions 2A defined by the plan information 70. In step ST21, in a case where the imaging support processing end condition is not established, the determination is set as negative, and the imaging support processing shifts to step ST10 shown in FIG. 14. In step ST21, in a case where the imaging support processing end condition is established, the determination is set as positive, and the imaging support processing is ended.

In a case where the determination in step ST21 is set as positive, the end instruction unit 68 causes the projection apparatus 100 to end the projection processing by outputting the first end instruction to the processor 120 of the projection apparatus 100. Further, the end instruction unit 68 causes the imaging apparatus 200 to end the imaging processing by outputting the second end instruction to the processor 250 of the imaging apparatus 200.

An imaging support method performed by the imaging support apparatus 10 described above is an example of an "imaging support method" according to the present disclosed technology.

Figure 16:
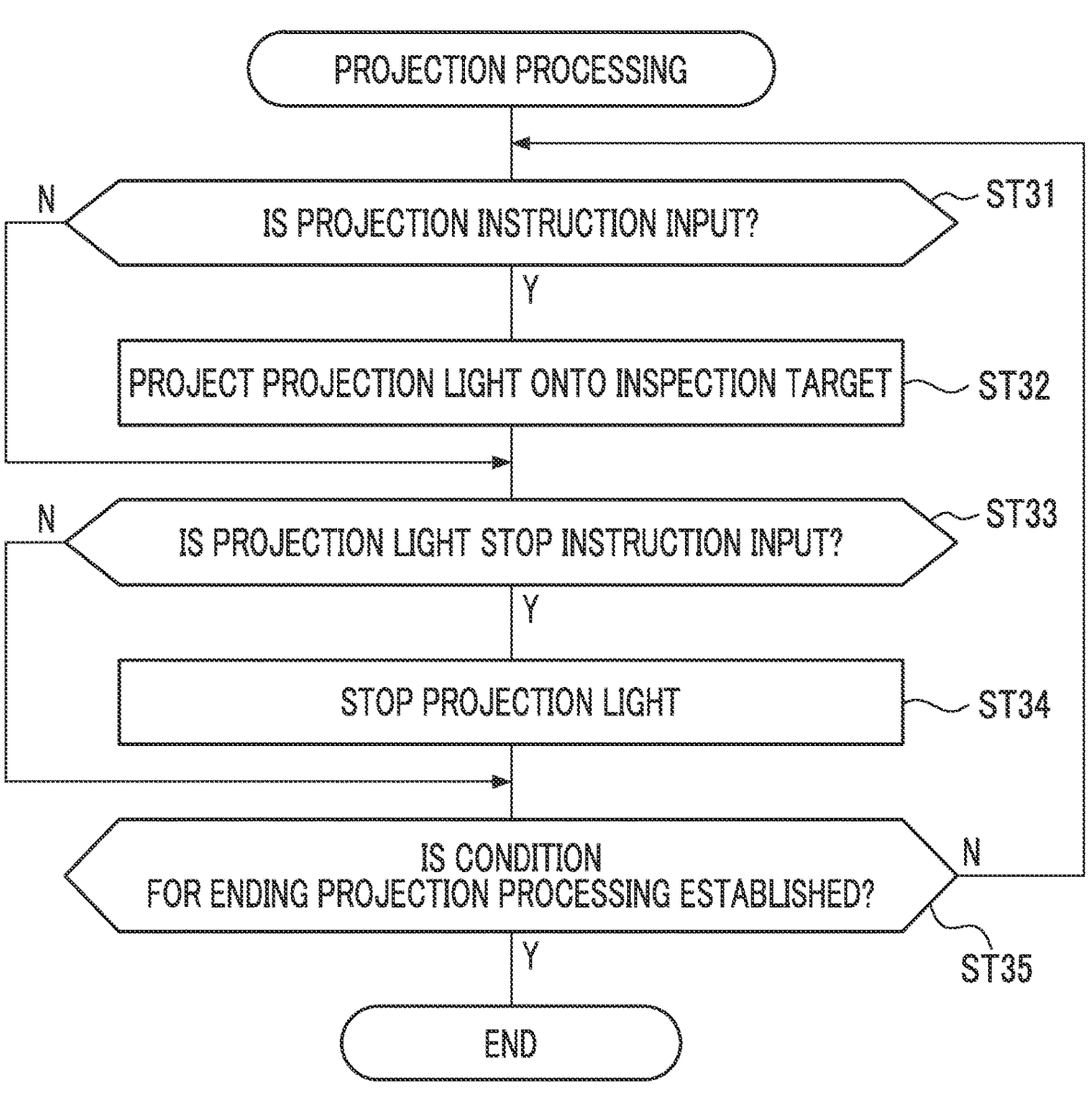
FIG. 16 is a flowchart showing an example of a flow of the projection processing executed in the projection apparatus according to the embodiment.

Next, an example of a flow of the projection processing performed by the processor 120 in the projection apparatus 100 will be described with reference to FIG. 16.

In step S31, the projection control unit 132 determines whether or not the projection instruction, which is output from the imaging support apparatus 10 by executing the processing in step ST11 included in the imaging support processing shown in FIG. 14, is input. In step ST31, in a case where the projection instruction is not input, the determination is set as negative, and the projection processing shifts to step ST33. In step ST31, in a case where the projection instruction is input, the determination is set as positive, and the projection processing shifts to step ST32.

In step ST32, the projection control unit 132 causes the projection apparatus 100 to project the projection light 4 onto the inspection target 2. After the processing in step ST32 is executed, the projection processing shifts to step ST33.

In step ST33, the projection light stop unit 134 determines whether or not the projection light stop instruction, which is output from the imaging support apparatus 10 by executing the processing in step ST18 included in the imaging support processing shown in FIG. 15, is input. In step ST33, in a case where the projection light stop instruction is not input, the determination is set as negative, and the projection processing shifts to step ST35. In step ST33, in a case where the projection light stop instruction is input, the determination is set as positive, and the projection processing shifts to step ST34.

In step ST34, the projection light stop unit 134 causes the projection apparatus 100 to stop the projection light 4 that is projected onto the inspection target 2. After the processing in step ST34 is executed, the projection processing shifts to step ST35.

In step ST35, the processor 120 determines whether or not a condition for ending the projection processing (hereinafter, referred to as a "projection processing end condition") is established. An example of the projection processing end condition includes a condition in which the processor 120 receives the first end instruction from the imaging support apparatus 10. In step ST34, in a case where the projection processing end condition is not established, determination is set as negative, and the projection processing shifts to step ST31. In step ST34, in a case where the projection processing end condition is established, the determination is set as positive, and the projection processing is ended.

Next, an example of a flow of the imaging processing performed by the processor 250 in the imaging apparatus 200 will be described with reference to FIG. 17. Here, the description will be made on the premise that the operation mode of the imaging support apparatus 10 is set to the visual inspection image acquisition mode or the analysis image acquisition mode.

In step ST41, the operation mode setting unit 272 determines whether or not the operation mode of the imaging support apparatus 10 is the visual inspection image acquisition mode. In step ST41, in a case where the operation mode of the imaging support apparatus 10 is not the visual inspection image acquisition mode (that is, in a case where the operation mode of the imaging support apparatus 10 is the analysis image acquisition mode), the determination is set as negative, and the imaging processing shifts to step ST45 shown in FIG. 18. In step ST41, in a case where the operation mode of the imaging support apparatus 10 is the visual inspection image acquisition mode, the determination is set as positive, and the imaging processing shifts to step ST42.

In step ST42, the operation mode setting unit 272 sets the operation mode of the imaging apparatus 200 to the visual inspection image capturing mode. After the processing in step ST42 is executed, the imaging processing shifts to step ST43.

In step ST43, the first imaging determination unit 282 determines whether or not the imaging is performed by the imaging apparatus 200. Here, for example, the first imaging determination unit 282 determines that the imaging is performed by the imaging apparatus 200 on the condition in which the release button 266 of the imaging apparatus 200 is pressed to the fully pressed position. In step ST43, in a case where the imaging is not performed by the imaging apparatus 200, the determination is set as negative, and the determination in step ST43 is performed again. In step ST43, in a case where the imaging is performed by the imaging apparatus 200, the determination is set as positive, and the imaging processing shifts to step ST44.

In step ST44, the first image output unit 284 outputs the visual inspection image, which is obtained by imaging the imaging target region 2A by the imaging apparatus 200, to the processor 30 of the imaging support apparatus 10. After the processing in step ST44 is executed, the imaging processing shifts to step ST45 shown in FIG. 18.

In step ST45, the operation mode setting unit 272 sets the operation mode of the imaging apparatus 200 to the analysis image capturing mode. After the processing in step ST45 is executed, the imaging processing shifts to step ST46.

In step ST46, the imaging preparation determination unit 286 determines whether or not the imaging apparatus 200 is in an imaging preparation state. Here, for example, the imaging preparation determination unit 286 determines that the imaging apparatus 200 is in an imaging preparation state on the condition in which the release button 266 of the imaging apparatus 200 is pressed to the half pressed position. In step ST46, in a case where the imaging apparatus 200 is not in an imaging preparation state, the determination is set as negative, and the determination in step ST46 is performed again. In step ST46, in a case where the imaging apparatus 200 is in an imaging preparation state, the determination is set as positive, and the imaging processing shifts to step ST47.

In step ST47, the imaging preparation signal output unit 288 outputs the imaging preparation signal to the processor 30 of the imaging support apparatus 10. After the processing in step ST47 is executed, the imaging processing shifts to step ST48.

In step ST48, the second imaging determination unit 290 determines whether or not the imaging is performed by the imaging apparatus 200. Here, for example, the second imaging determination unit 290 determines that the imaging is performed by the imaging apparatus 200 on the condition in which the release button 266 of the imaging apparatus 200 is pressed to the fully pressed position. In step ST48, in a case where the imaging is not performed by the imaging apparatus 200, the determination is set as negative, and the determination in step ST48 is performed again. In step ST48, in a case where the imaging is performed by the imaging apparatus 200, the determination is set as positive, and the imaging processing shifts to step ST49.

In step ST49, the second image output unit 292 outputs the analysis image, which is obtained by imaging the imaging target region 2A by the imaging apparatus 200, to the processor 30 of the imaging support apparatus 10. After the processing in step ST49 is executed, the imaging processing shifts to step ST50.

In step ST50, the processor 250 determines whether or not a condition for ending the imaging processing (hereinafter, referred to as an "imaging processing end condition") is established. An example of the imaging processing end condition includes a condition in which the processor 250 receives the second end instruction from the imaging support apparatus 10. In step ST50, in a case where the imaging processing end condition is not established, the determination is set as negative, and the imaging processing shifts to step ST41 shown in FIG. 17. In step ST50, in a case where the imaging processing end condition is established, the determination is set as positive, and the imaging processing is ended.

As described above, in the analysis image acquisition processing, in a case where the imaging target region 2A is imaged by the imaging apparatus 200, the processor 30 controls the projection apparatus 100 to transition from a state in which the projection light 4 is projected onto the inspection target 2 by the projection apparatus 100 to a state in which the projection light 4 is stopped. Therefore, for example, it is possible to suppress the influence of the projection light 4 on the analysis image as compared with a case where the imaging target region 2A is imaged by the imaging apparatus 200 in a state in which the projection light 4 is projected onto the inspection target 2.

Further, a case where the imaging target region 2A is imaged by the imaging apparatus 200 is a case where the processor 30 receives the imaging preparation instruction provided to the imaging apparatus 200. Therefore, the projection light 4 can be stopped in association with the reception of the imaging preparation instruction by the processor 30.

Further, the imaging preparation instruction is an instruction based on a fact that the release button 266 of the imaging apparatus 200 is half-pressed. Therefore, it is possible to stop the projection light 4 in association with the fact that the release button 266 is half-pressed by the imaging person 6.

Further, in the analysis image acquisition processing, the processor 30 performs control of stopping the projection light 4. Therefore, for example, it is possible to suppress the influence of the projection light 4 on the analysis image in a case where control of suppressing the projection light 4 is performed compared to the case where the projection light 4 is projected onto the inspection target 2.

Further, the processor 30 controls the projection apparatus 100 to project the projection light 4 onto the inspection target 2. Accordingly, an operation, which is performed by the imaging person 6 to cause the projection apparatus 100 to project the projection light 4, can be omitted.

Further, the projection light 4 includes projection light representing a position of an edge portion of the imaging target region 2A. Therefore, by using the projection light 4, it is possible to inform the imaging person 6 of the position of the imaging target region 2A.

Further, the projection light 4 includes projection light representing a range of the imaging target region 2A. Therefore, by using the projection light 4, it is possible to inform the imaging person 6 of the range of the imaging target region 2A.

Further, the projection light 4 includes projection light displayed in a grid shape. Therefore, by using the projection light 4, it is possible to inform the imaging person 6 of the position and the range of the imaging target region 2A.

Further, the processor 30 performs control of projecting the projection light 4 onto the inspection target 2 in accordance with a plan defined in the plan information 70. Therefore, it is possible for the imaging person 6 to perform the imaging in accordance with the default plan.

Further, the plan defined in the plan information 70 includes the projection position and the projection range in which the projection light 4 is projected onto the inspection target 2. Therefore, the imaging person 6 can image the imaging target region 2A based on the projection light 4 projected in accordance with the default plan.

Further, the processor 30 controls the projection apparatus 100 to maintain projection of the projection light 4 in the visual inspection image acquisition processing in a case where the imaging target region 2A is imaged by the imaging apparatus 200, and controls the projection apparatus 100 to stop the projection light 4 in the analysis image acquisition processing in a case where the imaging target region 2A is imaged by the imaging apparatus 200. Therefore, in the visual inspection image acquisition processing, the visual inspection image that includes an image corresponding to the projection light 4 can be acquired, and in the analysis image acquisition processing, the analysis image that does not include an image corresponding to the projection light 4 can be acquired.

In the above embodiment, in the imaging support apparatus 10, the processor 30 outputs the projection light stop instruction to the processor 120 of the projection apparatus 100 by operating as the projection light stop instruction unit 62. However, the processor 30 may output a projection light suppression instruction to the processor 120 of the projection apparatus 100 by operating as a projection light suppression instruction unit and may cause the projection apparatus 100 to suppress the projection light 4 that is projected onto the inspection target 2. In this case, the projection light 4, which is projected onto the inspection target 2 based on the projection light suppression instruction, may have a reduced amount of light or a changed color compared to the projection light 4, which is projected onto the inspection target 2 based on the projection instruction. According to the present modification example as well, in the analysis image acquisition processing, for example, it is possible to suppress the influence of the projection light 4 on the analysis image as compared with a case where the imaging target region 2A is imaged by the imaging apparatus 200 in a state in which the projection light 4 is projected onto the inspection target 2.

Figure 19:
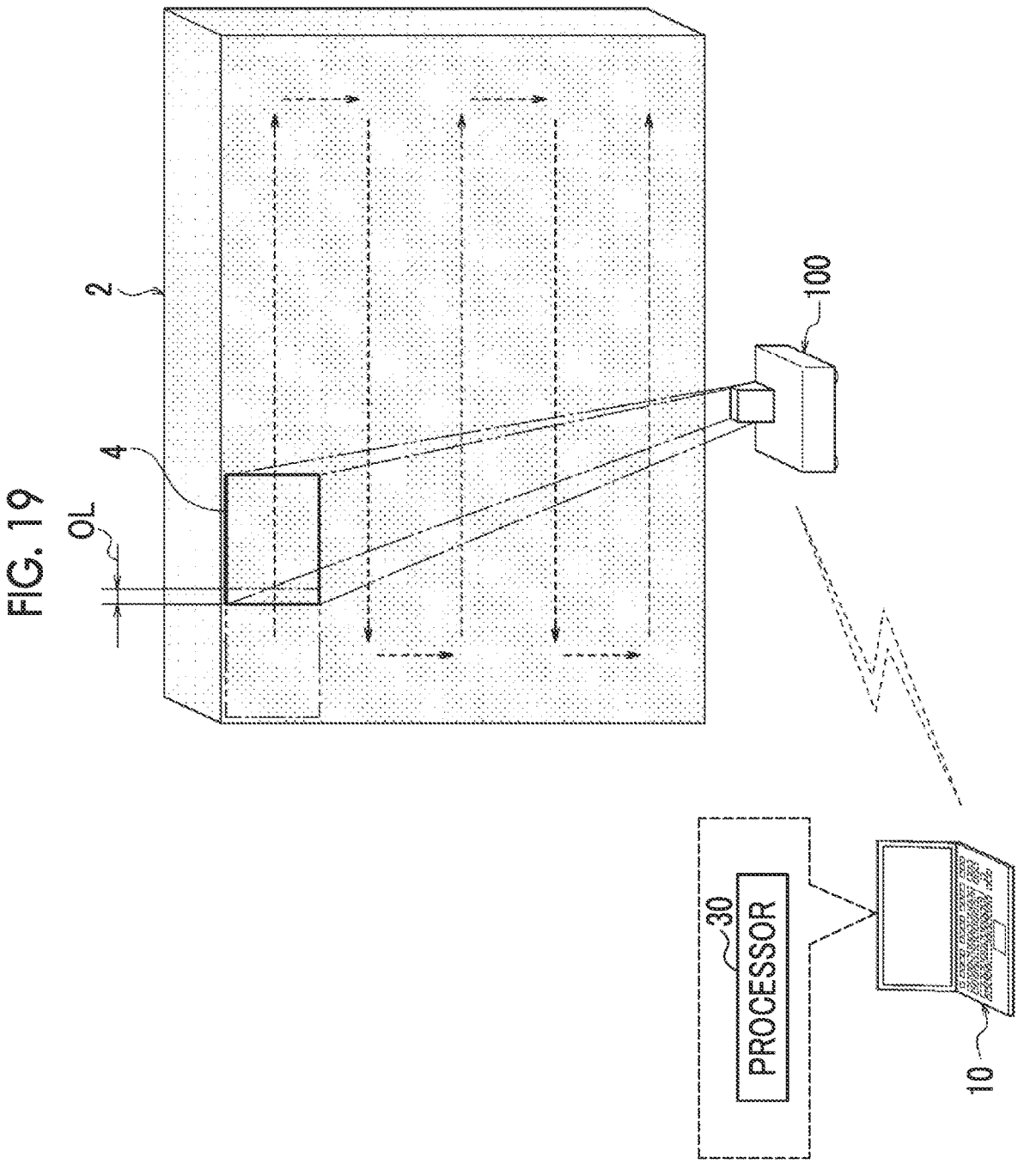
FIG. 19 is a perspective view of the inspection target and the imaging support apparatus showing a first modification example related to projection light projected onto the inspection target according to the embodiment.

Further, in the above embodiment, although the projection light 4 is displayed on the inspection target 2 in a grid shape, as an example shown in FIG. 19, the projection light 4 may be displayed on the inspection target 2 in a rectangular shape. In the example shown in FIG. 19, the projection light 4 defines one imaging target region 2A. That is, the inside of the rectangular-shaped frame displayed by the projection light 4 is the imaging target region 2A. The projection light 4 represents a position of an edge portion of the imaging target region 2A. That is, the rectangular-shaped frame displayed by the projection light 4 defines the position of the edge portion of the imaging target region 2A. Further, the projection light 4 represents a range of the imaging target region 2A. That is, the rectangular-shaped frame displayed by the projection light 4 defines the range of the imaging target region 2A. According to the present modification example, by using the projection light 4 displayed in a rectangular shape, it is possible to inform the imaging person 6 of the position and the range of the imaging target region 2A.

Further, in the example shown in FIG. 19, the processor 30 may control the projection apparatus 100 (see FIG. 8) to move the projection light 4 along the inspection target 2. In the example shown in FIG. 19, the projection light 4 is moved from the upper left end to the lower right end of the inspection target 2 while meandering in the horizontal direction. According to the present modification example, by using the moving projection light 4, it is possible to inform the imaging person 6 of the imaging target region 2A to be imaged. In the present modification example, a portion of a first imaging target region 2A corresponding to the projection light 4 before movement and a portion of a second imaging target region 2A corresponding to the projection light 4 after movement may overlap. A dimension OL represents an overlap amount between the projection light 4 before and after movement. By performing the overlap in this way, in the processing of splicing the plurality of analysis images without gaps in the image analysis apparatus 300, coincidence feature points between adjacent analysis images are referred to and the plurality of analysis images are spliced.

Figure 20:
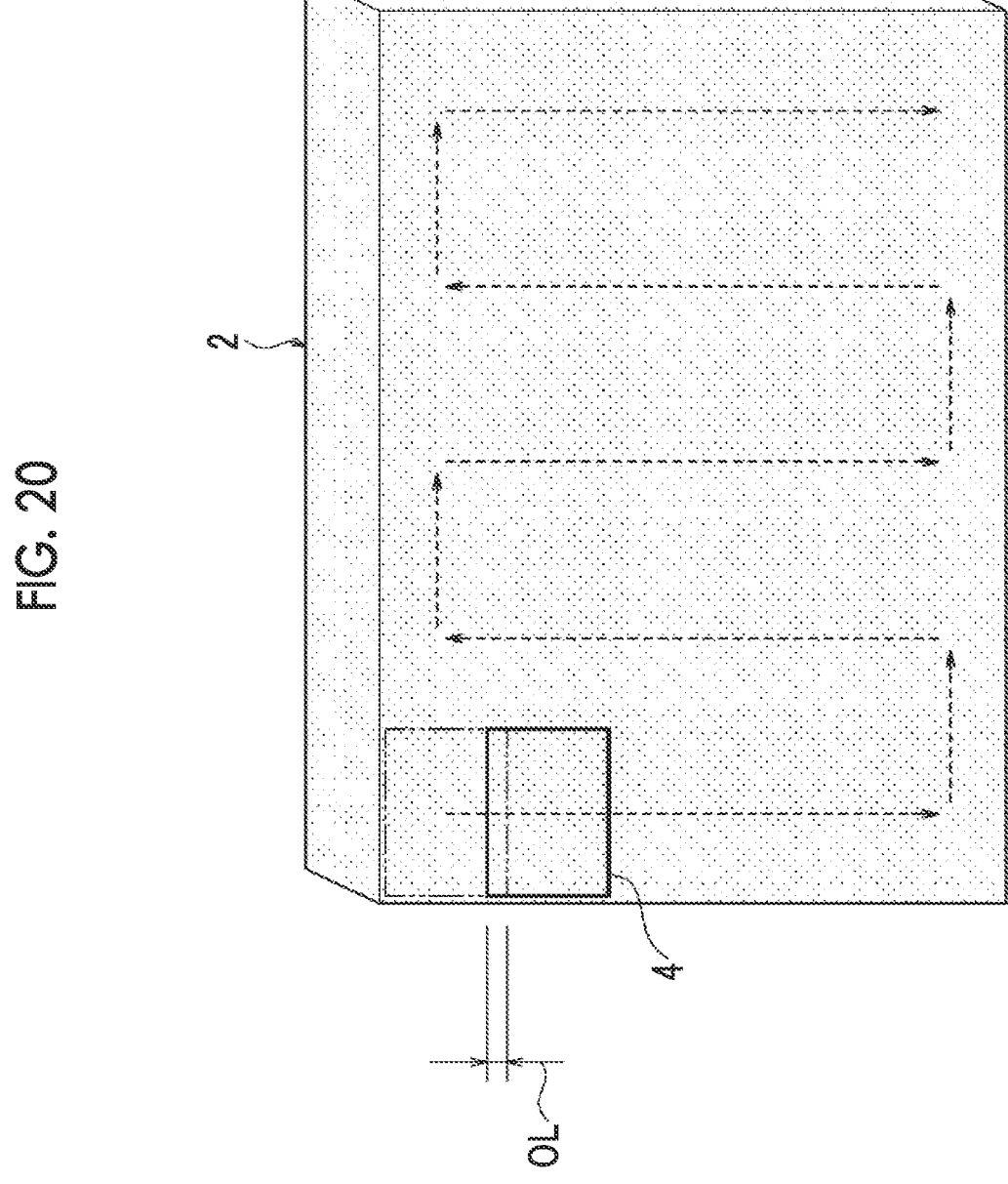
FIG. 20 is a perspective view of the inspection target showing a second modification example related to projection light projected onto the inspection target according to the embodiment.

Further, in the example shown in FIG. 19, although the projection light 4 is moved from the upper left end to the lower right end of the inspection target 2 while meandering in the horizontal direction, as an example shown in FIG. 20, the projection light 4 may be moved from the upper left end to the lower right end of the inspection target 2 while meandering in the vertical direction.

Figure 21:
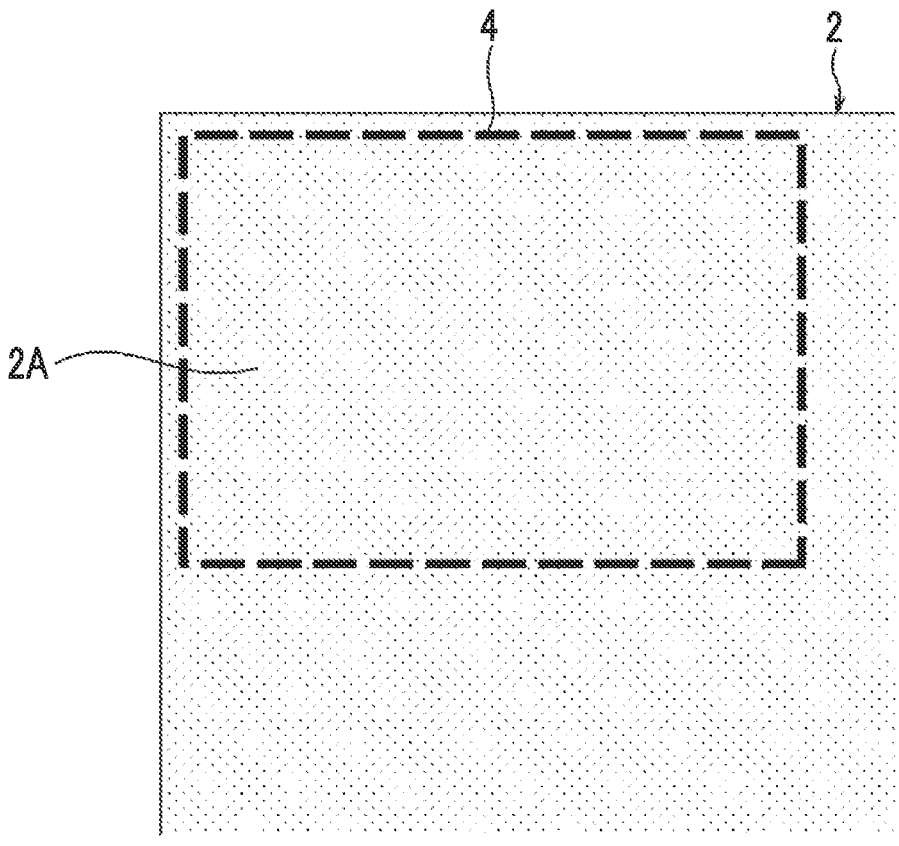
FIG. 21 is an enlarged main part front view of the inspection target showing a third modification example related to projection light projected onto the inspection target according to the embodiment.

Further, in the examples shown in FIGS. 19 and 20, although the projection light 4 is displayed by a frame-shaped solid line, as an example shown in FIG. 21, the projection light 4 may be displayed by a frame-shaped broken line. Further, although not particularly illustrated, the projection light 4 may be displayed by a frame-shaped one-dot chain line or may be displayed by a frame-shaped two-dot chain line. Further, the projection light 4 may be displayed by a type of line other than a solid line, a broken line, a one-dot chain line, and a two-dot chain line. According to the present modification example as well, by using the projection light 4, it is possible to inform the imaging person 6 of the position and the range of the imaging target region 2A.

Figure 22:
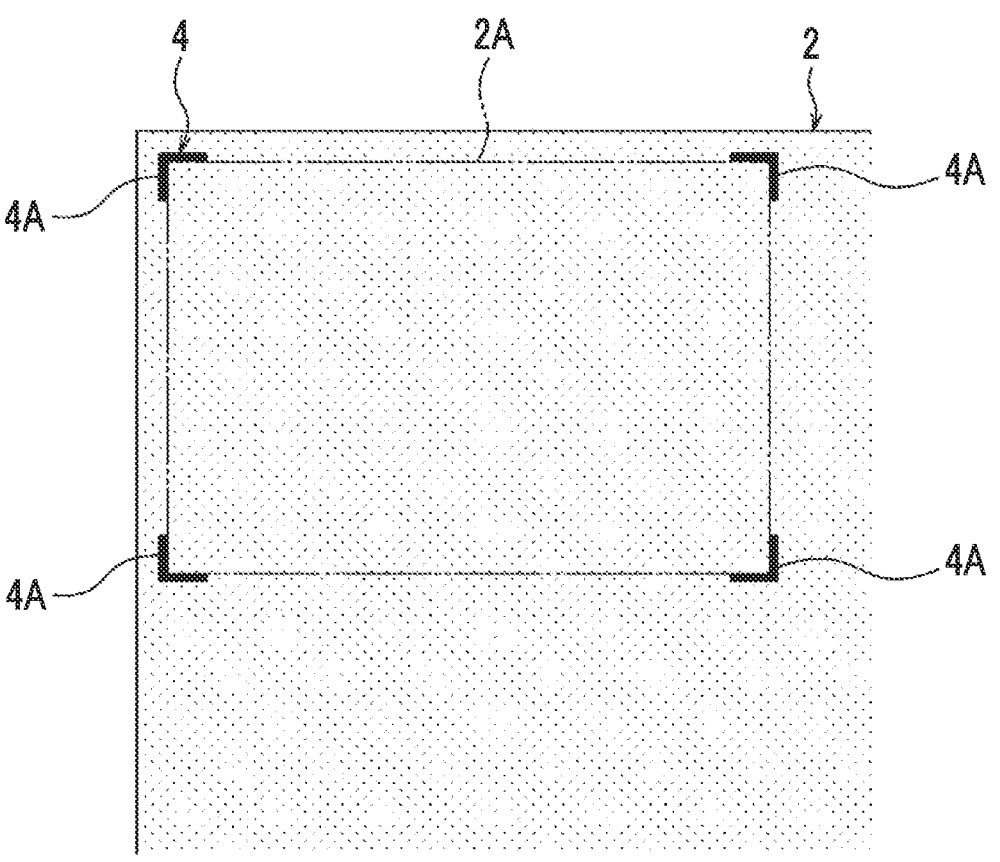
FIG. 22 is an enlarged main part front view of the inspection target showing a fourth modification example related to projection light projected onto the inspection target according to the embodiment.

Further, in the examples shown in FIGS. 19 and 20, although the projection light 4 is displayed in a frame shape surrounding the imaging target region 2A, as an example shown in FIG. 22, the projection light 4 may display four corner marks 4A positioned at respective corner portions of the imaging target region 2A. In the example shown in FIG. 22, the projection light 4 defines one imaging target region 2A. That is, the inside of the four corner marks 4A is the imaging target region 2A. The projection light 4 represents a position of an edge portion of the imaging target region 2A. That is, the four corner marks 4A define positions of the respective corner portions of the imaging target region 2A as an example of the edge portion of the imaging target region 2A. Further, the projection light 4 represents a range of the imaging target region 2A. That is, the four corner marks 4A define the range of the imaging target region 2A. According to the present modification example as well, by using the projection light 4, it is possible to inform the imaging person 6 of the position and the range of the imaging target region 2A.

Figure 23:
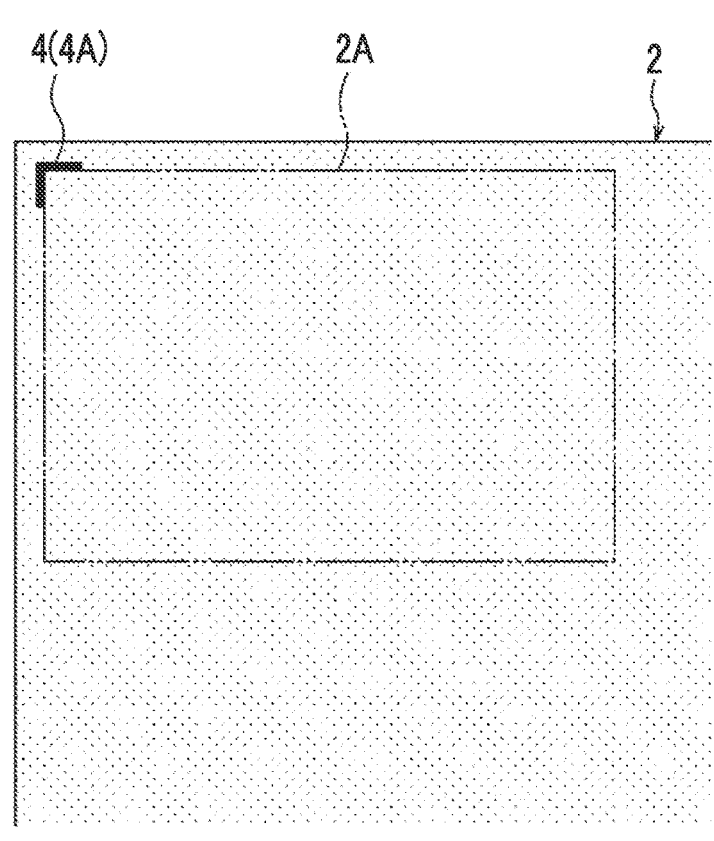
FIG. 23 is an enlarged main part front view of the inspection target showing a fifth modification example related to projection light projected onto the inspection target according to the embodiment.

Further, in the example shown in FIG. 22, although the projection light 4 displays the four corner marks 4A that are positioned at the respective corner portions of the imaging target region 2A, as an example shown in FIG. 23, the projection light 4 may display one corner mark 4A that is positioned at one corner portion of the imaging target region 2A. In the example shown in FIG. 23, the projection light 4 defines one imaging target region 2A. Further, the projection light 4 represents a position of an edge portion of the imaging target region 2A. That is, the corner mark 4A defines a position of one corner portion of the imaging target region 2A as an example of the edge portion of the imaging target region 2A. Further, although not particularly illustrated, the projection light 4 may display two corner marks 4A positioned at two corner portions of the imaging target region 2A or may display three corner marks 4A positioned at three corner portions of the imaging target region 2A. According to the present modification example, by using the projection light 4, it is possible to inform the imaging person 6 of the position of the imaging target region 2A.

Figure 24:
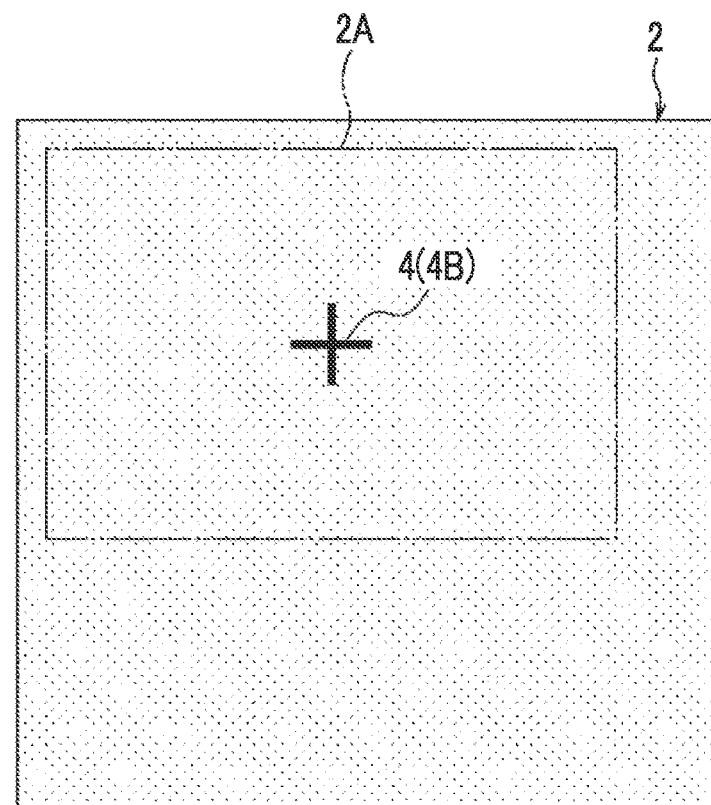
FIG. 24 is an enlarged main part front view of the inspection target showing a sixth modification example related to projection light projected onto the inspection target according to the embodiment.

Further, in the examples shown in FIGS. 22 and 23, although the projection light 4 displays the four corner marks 4A that are positioned at the respective corner portions of the imaging target region 2A, as an example shown in FIG. 24, the projection light 4 may display one cross mark 4B that is positioned at the center of the imaging target region 2A. In the example shown in FIG. 24, the projection light 4 defines one imaging target region 2A. Further, the projection light 4 represents a position of the center of the imaging target region 2A. That is, the cross mark 4B defines a position of the center of the imaging target region 2A. Further, although not particularly illustrated, the projection light 4 representing the position of the center of the imaging target region 2A may display a mark having a shape other than a cross shape. According to the present modification example, by using the projection light 4, it is possible to inform the imaging person 6 of the position of the imaging target region 2A.

Figure 25:
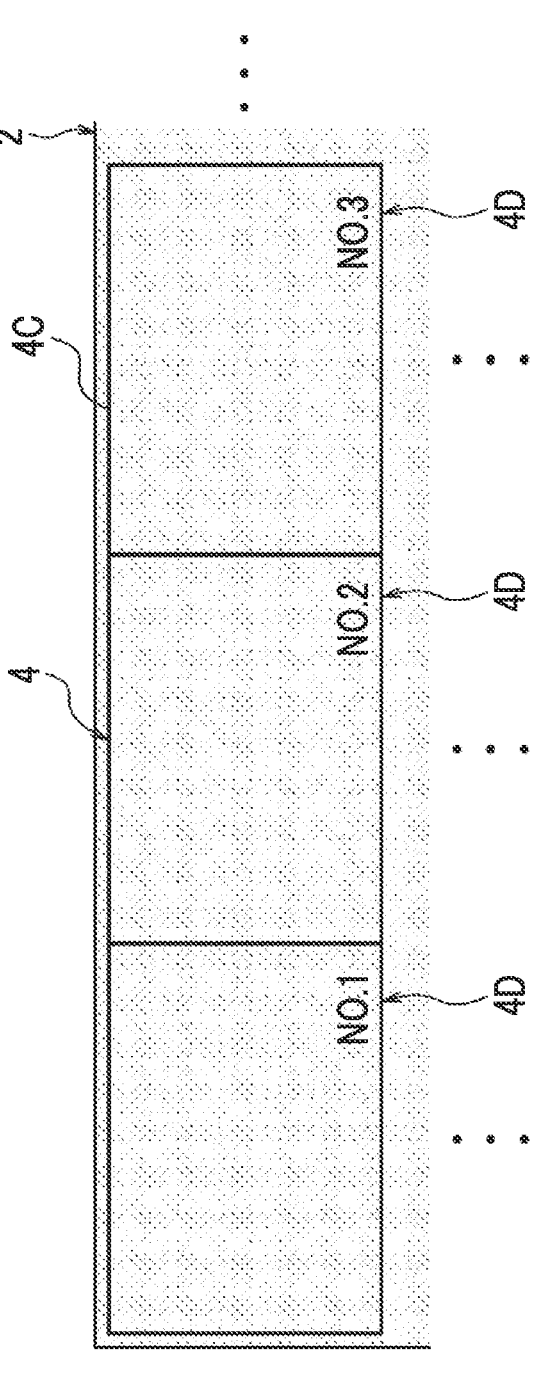
FIG. 25 is an enlarged main part front view of the inspection target showing a seventh modification example related to projection light projected onto the inspection target according to the embodiment.
Figure 26:
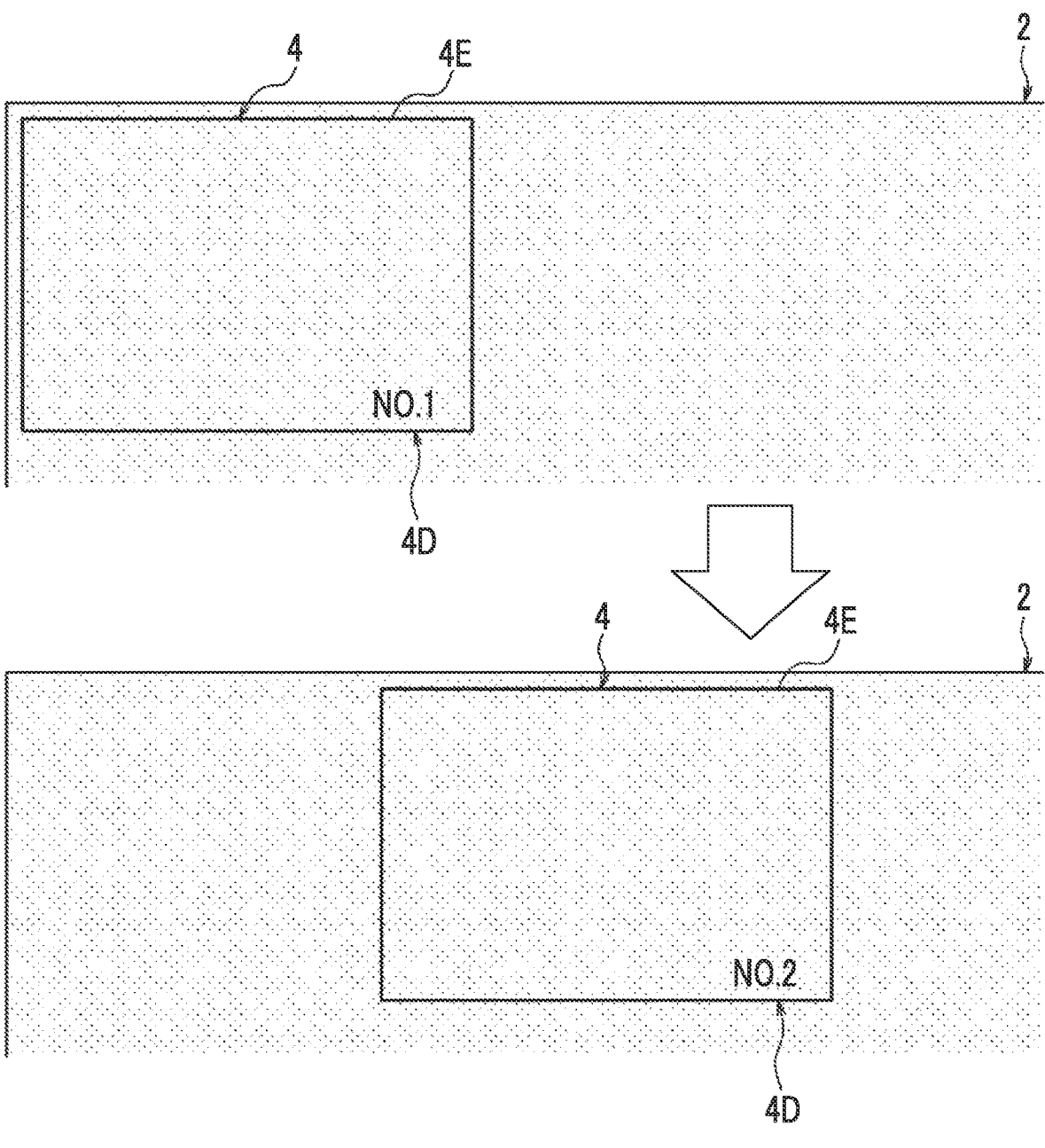
FIG. 26 is an enlarged main part front view of the inspection target showing an eighth modification example related to projection light projected onto the inspection target according to the embodiment.

Further, as an example shown in FIG. 25, the projection light 4 may include projection light 4D representing an imaging order in addition to projection light 4C displayed in a grid shape. Further, as an example shown in FIG. 26, the projection light 4 may include the projection light 4D representing an imaging order in addition to projection light 4E displayed in a rectangular shape. In the examples shown in FIGS. 25 and 26, the projection light 4D includes numbers defining the imaging order. The plan defined in the plan information 70 (see FIG. 8) includes a projection order. The projection light 4D is displayed based on the projection order defined in the plan information 70 (see FIG. 8). According to the present modification example, it is possible to inform the imaging person 6 of the imaging order.

Figure 27:
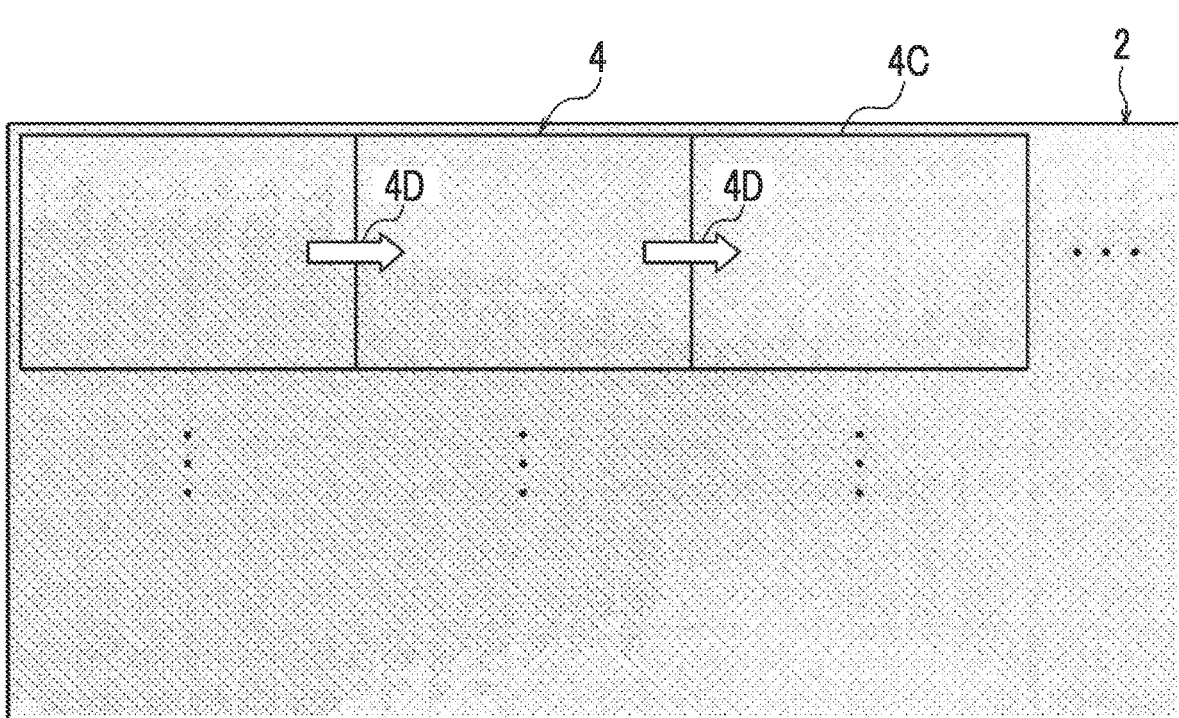
FIG. 27 is an enlarged main part front view of the inspection target showing a ninth modification example related to projection light projected onto the inspection target according to the embodiment.

Further, as an example shown in FIG. 27, the projection light 4D may be an arrow defining the imaging order. Further, although not particularly illustrated, the projection light 4D may represent information including an alphabet and/or a symbol defining the imaging order. The projection light 4D is an example of "projection light representing an imaging order" according to the present disclosed technology. According to the present modification example as well, it is possible to inform the imaging person 6 of the imaging order.

Figure 28:
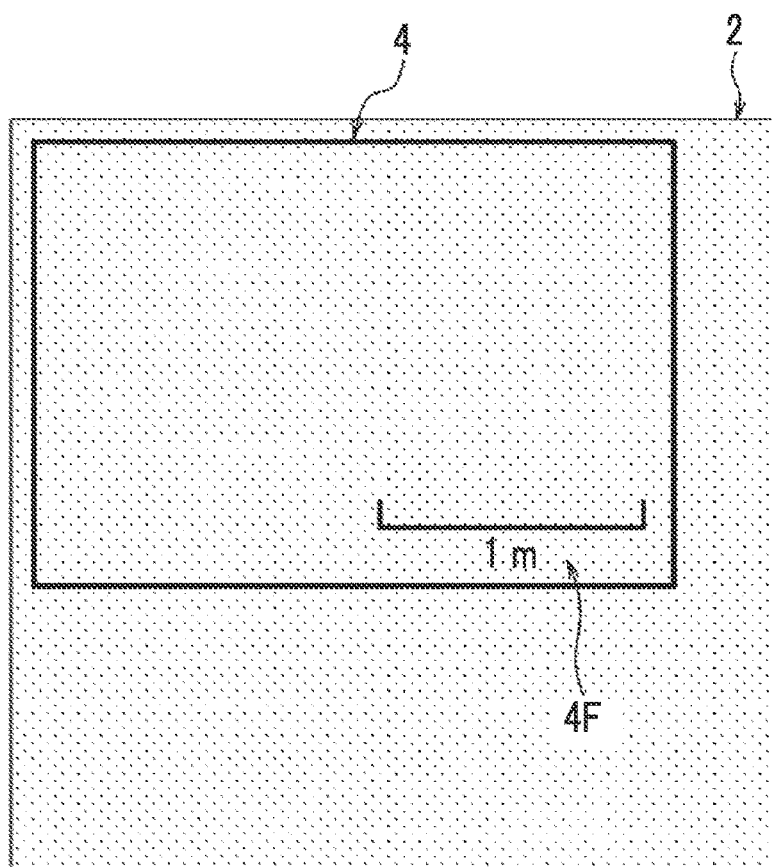
FIG. 28 is an enlarged main part front view of the inspection target showing a tenth modification example related to projection light projected onto the inspection target according to the embodiment.

Further, as an example shown in FIG. 28, the projection light 4 may include projection light 4F representing a dimension. In the example shown in FIG. 28, although the projection light 4F represents the length of 1 meter, the projection light 4F may represent the length other than 1 meter. Further, the unit of the length represented by the projection light 4F may be a unit other than meters. The projection light 4F is an example of "projection light representing a dimension" according to the present disclosed technology. According to the present modification example, it is possible to provide information representing a dimension to the imaging person 6.

Figure 29:
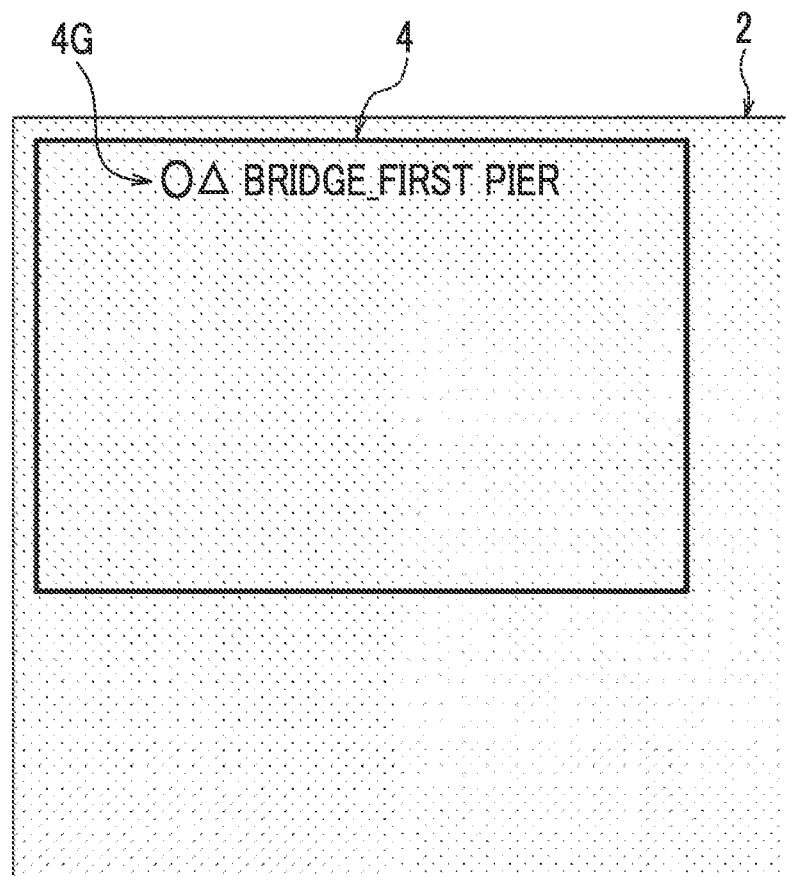
FIG. 29 is an enlarged main part front view of the inspection target showing an eleventh modification example related to projection light projected onto the inspection target according to the embodiment.

Further, as an example shown in FIG. 29, the projection light 4 may include projection light 4G representing information related to the inspection target 2. In the example shown in FIG. 29, the projection light 4G represents information for identifying a subject, such as the name of a bridge having the pier as the inspection target 2 and the pier number. Further, the projection light 4G includes a height, a length, and/or a thickness representing the size of the subject. In a case where a part of the subject is circular, the projection light 4G includes a diameter and/or a radius of the circular portion. In a case where a part of the subject is a linear line, an angle of the linear line portion with respect to the horizontal direction is included. The projection light 4G may represent any information as long as the information is related to the inspection target 2. The projection light 4G is an example of "projection light representing information related to a subject" according to the present disclosed technology. According to the present modification example, it is possible to provide the information related to the inspection target 2 to the imaging person 6.

Figure 30:
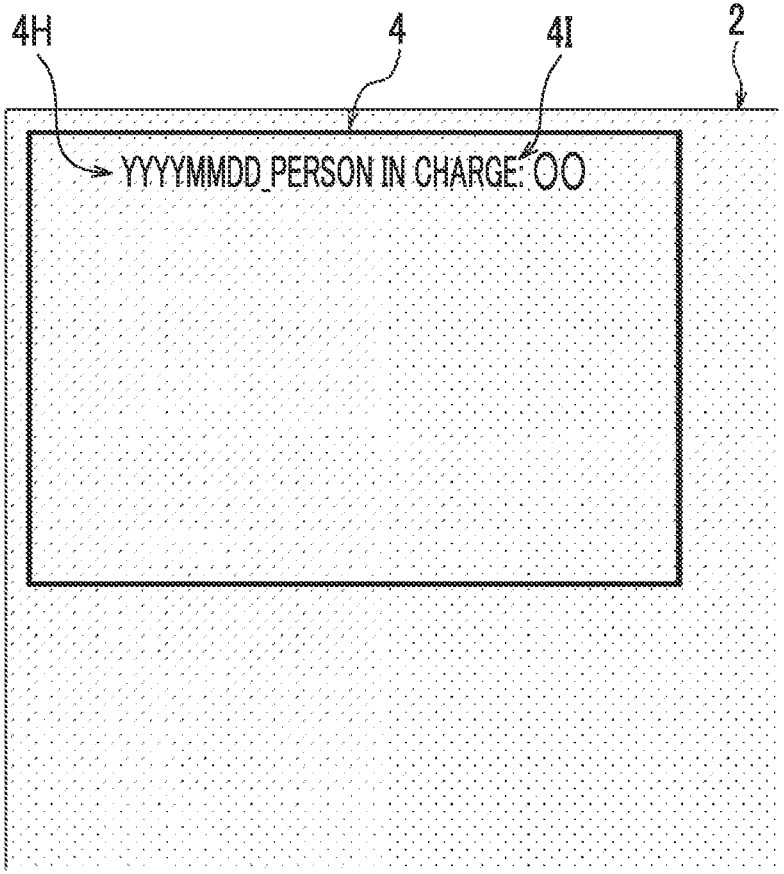
FIG. 30 is an enlarged main part front view of the inspection target showing a twelfth modification example related to projection light projected onto the inspection target according to the embodiment.

Further, as an example shown in FIG. 30, the projection light 4 may include projection light 4H representing a date and/or projection light 4I related to a name of a person in charge. Further, the projection light 4 may represent other information in addition to the projection light 4H and/or the projection light 4I. According to the present modification example, by using the projection light 4H, it is possible to inform the imaging person 6 of the work day. Further, by using the projection light 4I, it is possible to inform the imaging person 6 of a name of a person in charge who should work.

Figure 31:
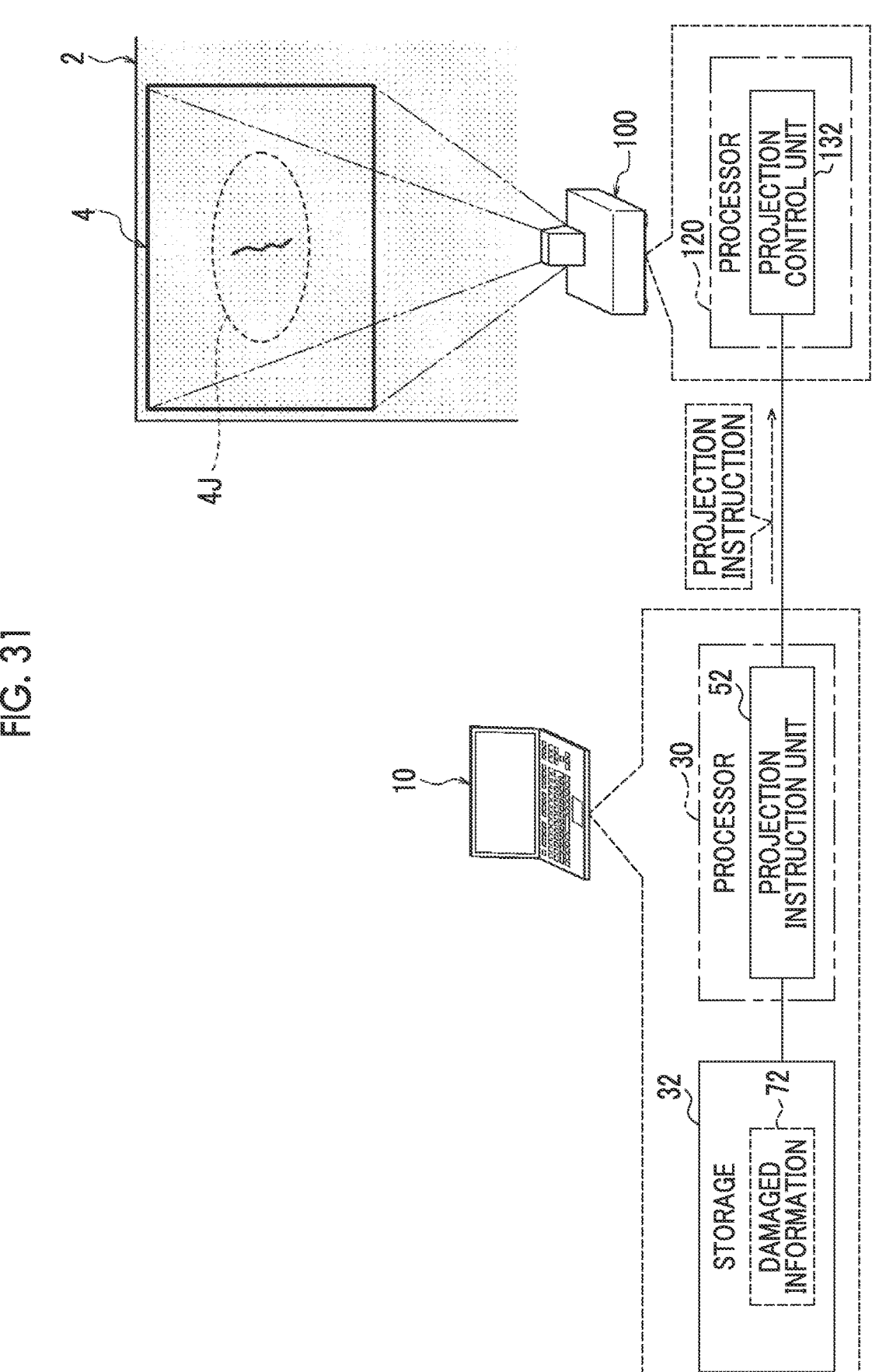
FIG. 31 is a block diagram of the imaging system showing a thirteenth modification example related to projection light projected onto the inspection target according to the embodiment.

Further, as an example shown in FIG. 31, in the imaging support apparatus 10, the projection instruction unit 52 may include information related to a damaged location of the inspection target 2 in the projection instruction, based on damage information 72 stored in the storage 32. In the projection apparatus 100, the projection control unit 132 may include projection light 4J representing the damaged location of the inspection target 2 in the projection light 4 in accordance with the projection instruction. The projection light 4J is an example of "projection light representing a damaged location of a subject" according to the present disclosed technology. According to the present modification example, it is possible to inform the imaging person 6 of the damaged location of the inspection target 2.

Figure 32:
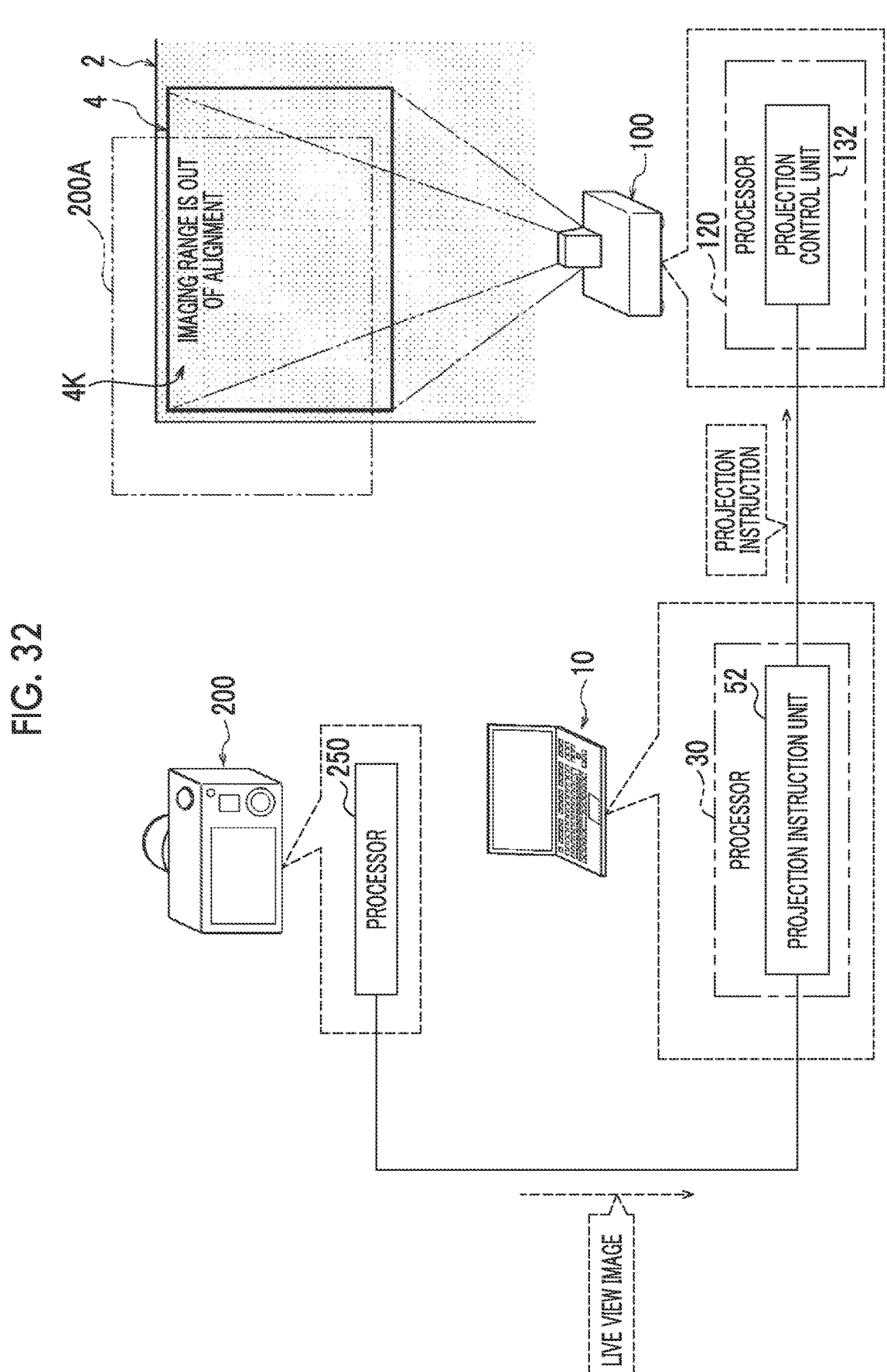
FIG. 32 is a block diagram of the imaging system showing a fourteenth modification example related to projection light projected onto the inspection target according to the embodiment.

Further, as an example shown in FIG. 32, in the imaging support apparatus 10, the projection instruction unit 52 may calculate a relative misregistration amount between the imaging range 200A and the imaging target region 2A based on a live view image input from the processor 250 of the imaging apparatus 200. In a case where the misregistration amount exceeds the default amount, the projection instruction unit 52 may output the projection instruction for including projection light 4K, which is for informing the imaging person 6 of the fact that there is misregistration in the imaging range, in the projection light 4 projected onto inspection target 2. The relative misregistration amount between the imaging range 200A and the imaging target region 2A is an example of a "relative relationship between an imaging range imaged by an imaging apparatus and an imaging target region" according to the present disclosed technology, and the projection instruction for including the projection light 4K in the projection light 4 is an example of "relative information representing a relative relationship" according to the present disclosed technology. According to the present modification example, it is possible to inform the imaging person 6 of the relative misregistration between the imaging range 200A and the imaging target region 2A.

Figure 33:
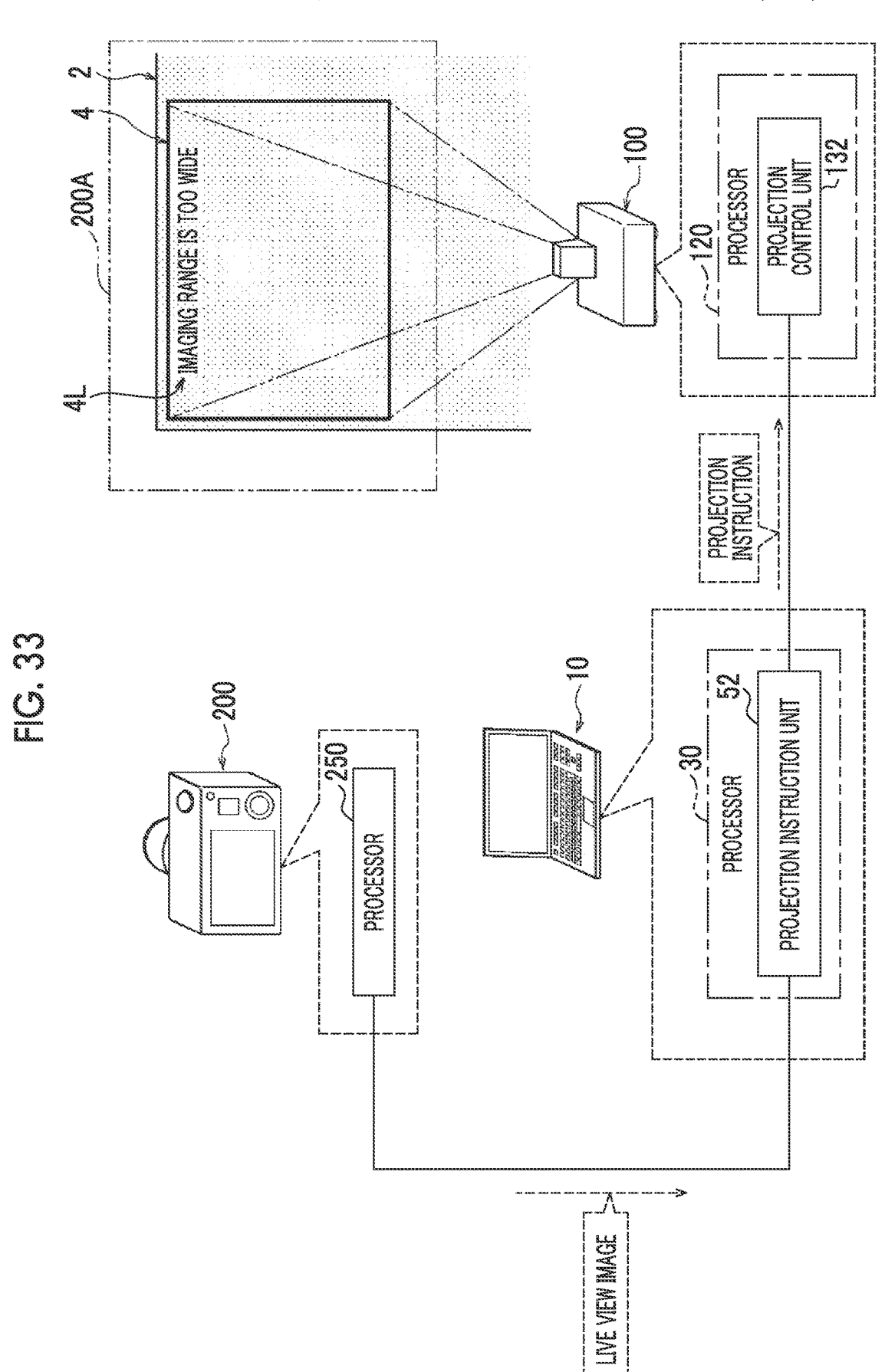
FIG. 33 is a block diagram of the imaging system showing a fifteenth modification example related to projection light projected onto the inspection target according to the embodiment.
Figure 34:
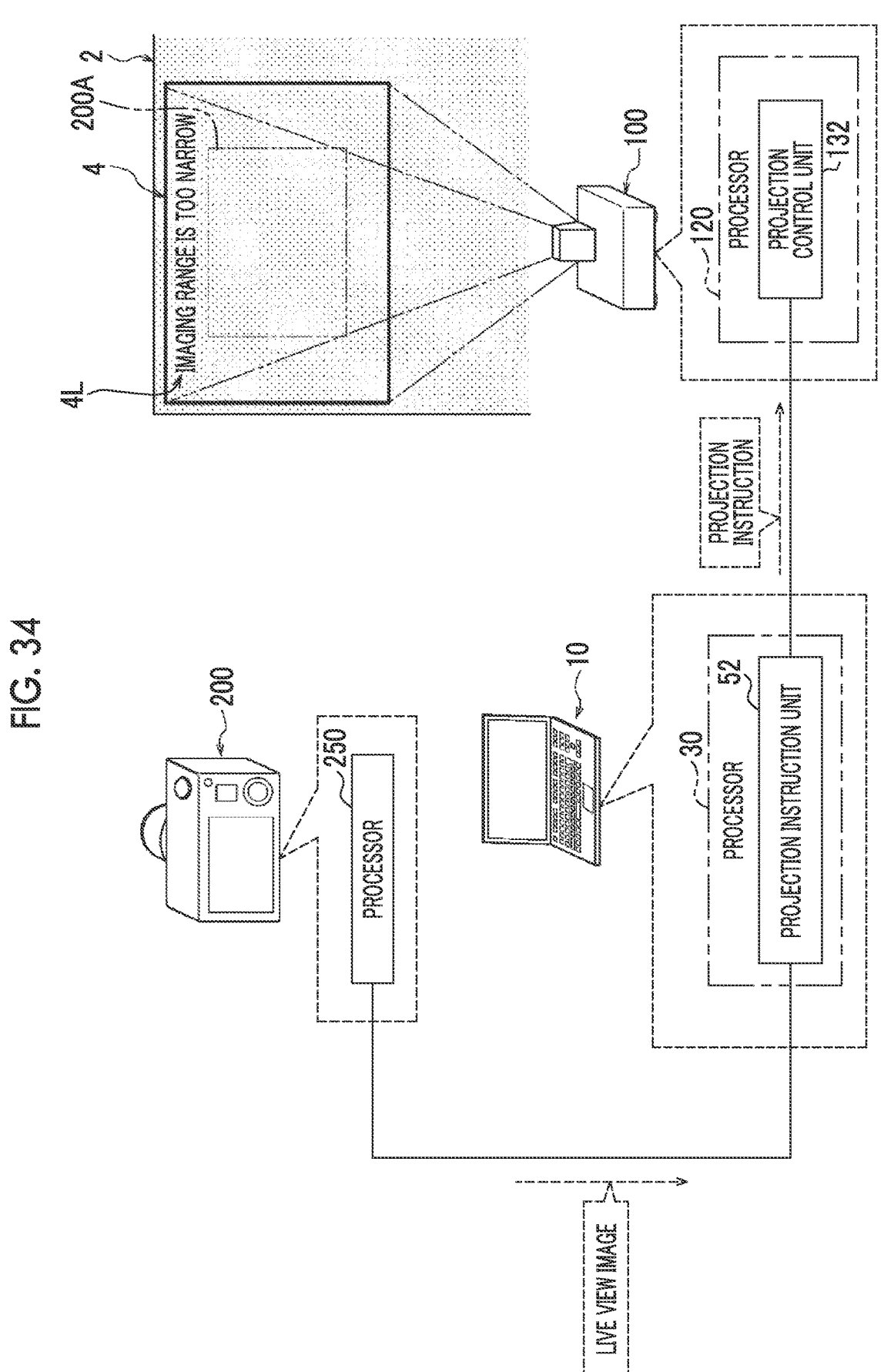
FIG. 34 is a block diagram of the imaging system showing a sixteenth modification example related to projection light projected onto the inspection target according to the embodiment.

Further, as an examples shown in FIGS. 33 and 34, in the imaging support apparatus 10, the projection instruction unit 52 may calculate a relative size difference between the imaging range 200A and the imaging target region 2A based on the live view image input from the processor 250 of the imaging apparatus 200. In a case where the size difference exceeds a default value, the projection instruction unit 52 may output the projection instruction for including projection light 4L, which is for informing the imaging person 6 of the fact that the imaging range is too wide or the imaging range is too narrow, in the projection light 4 projected onto inspection target 2. The relative size difference between the imaging range 200A and the imaging target region 2A is an example of a "relative relationship between an imaging range imaged by an imaging apparatus and an imaging target region" according to the present disclosed technology, and the projection instruction for including the projection light 4L in the projection light 4 is an example of "relative information representing a relative relationship" according to the present disclosed technology. According to the present modification example, it is possible to inform the imaging person 6 of the relative size difference between the imaging range 200A and the imaging target region 2A.

Figure 35:
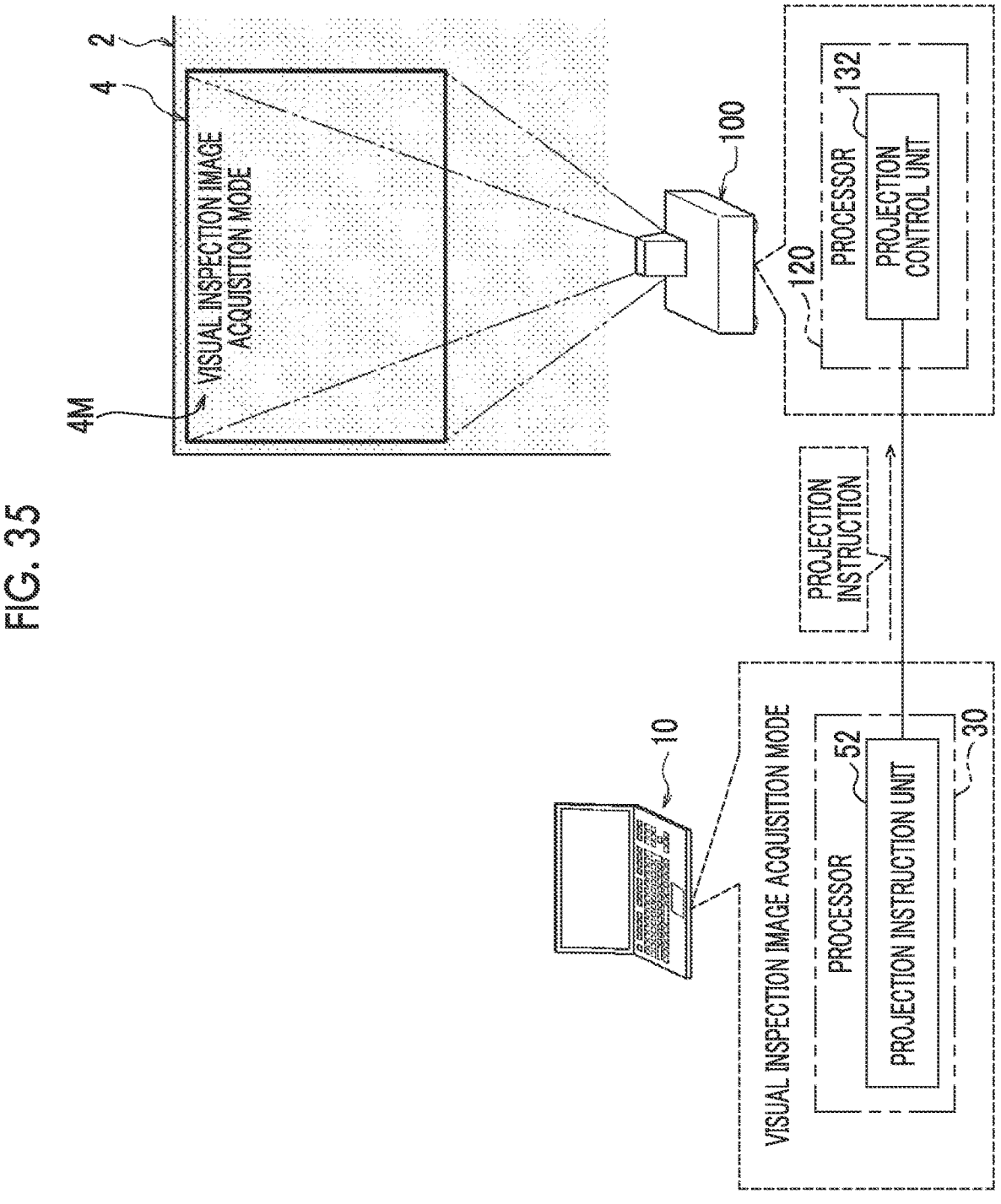
FIG. 35 is a block diagram of the imaging system showing a seventeenth modification example related to projection light projected onto the inspection target according to the embodiment.
Figure 36:
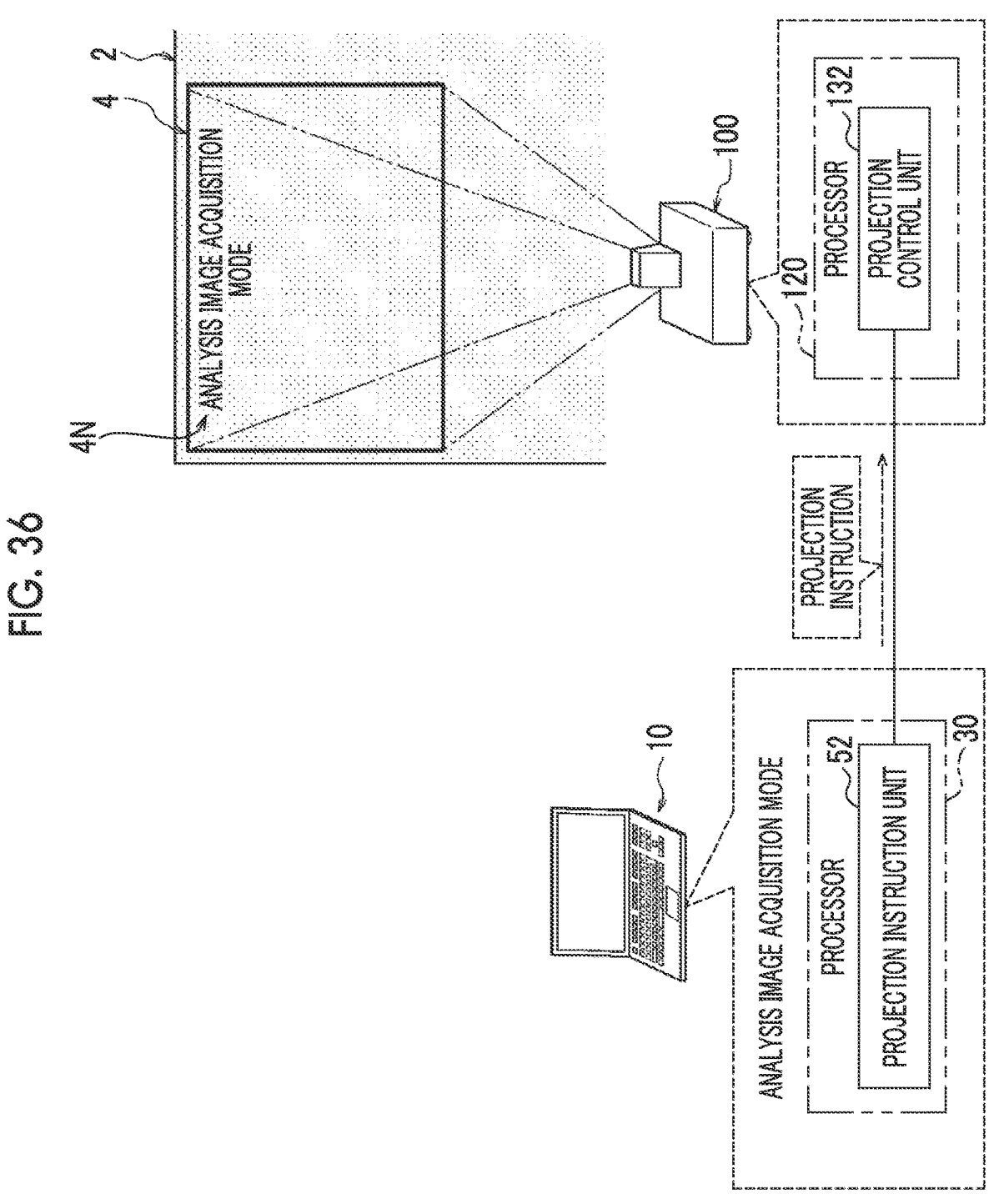
FIG. 36 is a block diagram of the imaging system showing an eighteenth modification example related to projection light projected onto the inspection target according to the embodiment.

Further, as an example shown in FIG. 35, in a case where the operation mode of the imaging support apparatus 10 is the visual inspection image acquisition mode, the projection instruction unit 52 may output the projection instruction for including projection light 4M, which represents that the operation mode is the visual inspection image acquisition mode, in the projection light 4 projected onto the inspection target 2. Similarly, as an example shown in FIG. 36, in a case where the operation mode of the imaging support apparatus 10 is the analysis image acquisition mode, the projection instruction unit 52 may output the projection instruction for including projection light 4N, which represents that the operation mode is the analysis image acquisition mode, in the projection light 4 projected onto the inspection target 2. According to the present modification example, it is possible to inform the imaging person 6 whether the current operation mode is the visual inspection image acquisition mode or the analysis image acquisition mode.

Figure 37:
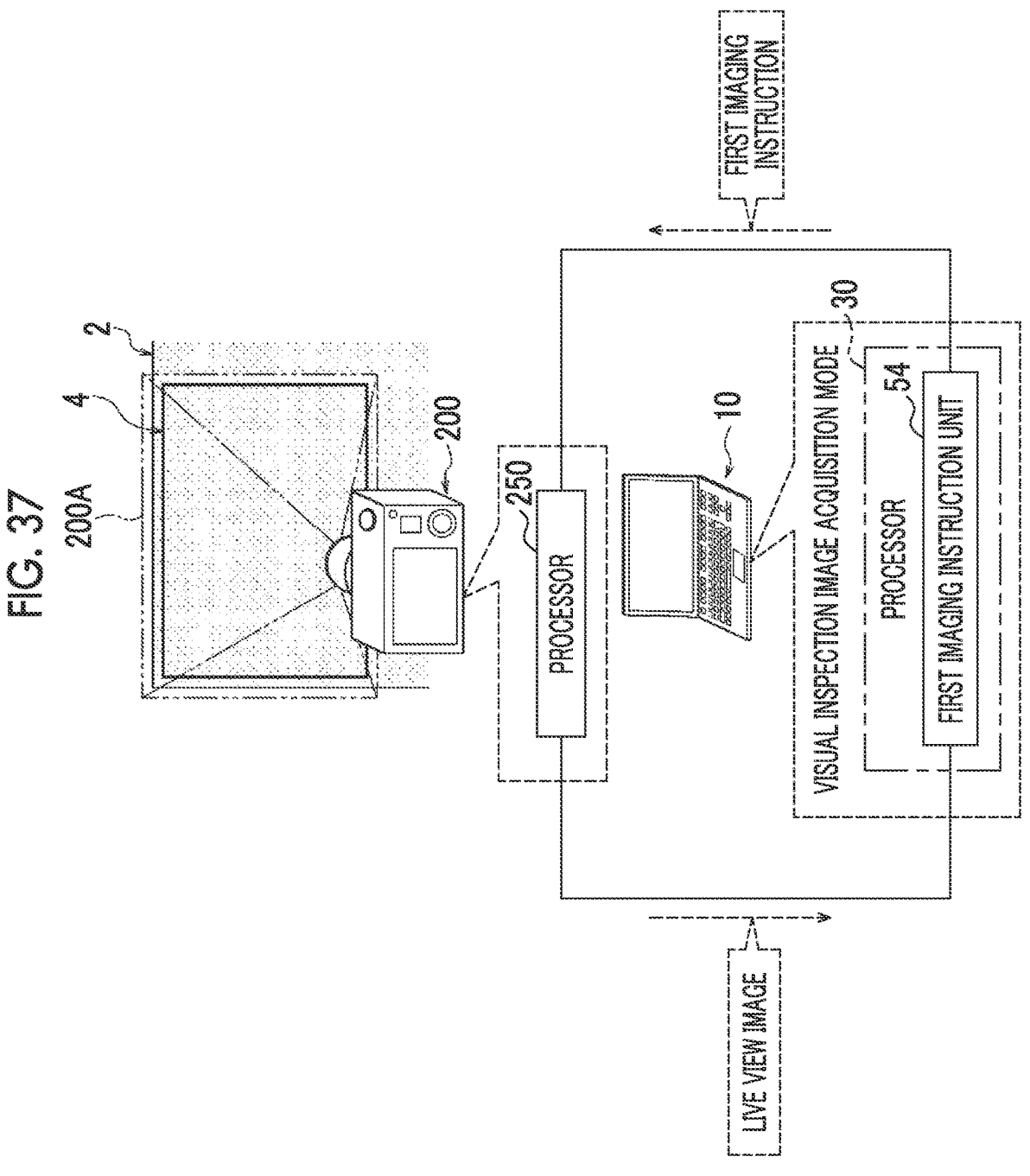
FIG. 37 is a block diagram of the imaging system showing a nineteenth modification example related to an operation of imaging of the imaging system according to the embodiment.

Further, as an example shown in FIG. 37, in a case where the operation mode of the imaging support apparatus 10 is the visual inspection image acquisition mode, the first imaging instruction unit 54 may determine whether or not a default imaging condition is established, based on the live view image input from the processor 250 of the imaging apparatus 200. In a case where it is determined that the default imaging condition is established, the first imaging instruction unit 54 may output the first imaging instruction for imaging the inspection target 2 to the processor 250 of the imaging apparatus 200. Examples of the default imaging condition include a condition in which the imaging target region 2A is in focus, the relative misregistration amount between the imaging range 200A and the imaging target region 2A is equal to or less than the default amount, and the relative size difference between the imaging range 200A and the imaging target region 2A is equal to or less than the default value. The output of the first imaging instruction for imaging the inspection target 2 to the processor 250 of the imaging apparatus 200 is an example of "controlling an imaging apparatus to image a subject" according to the present disclosed technology. According to the present modification example, in the visual inspection image acquisition processing, it is possible to cause the imaging apparatus 200 to image in response to the establishment of the default imaging condition.

Figure 38:
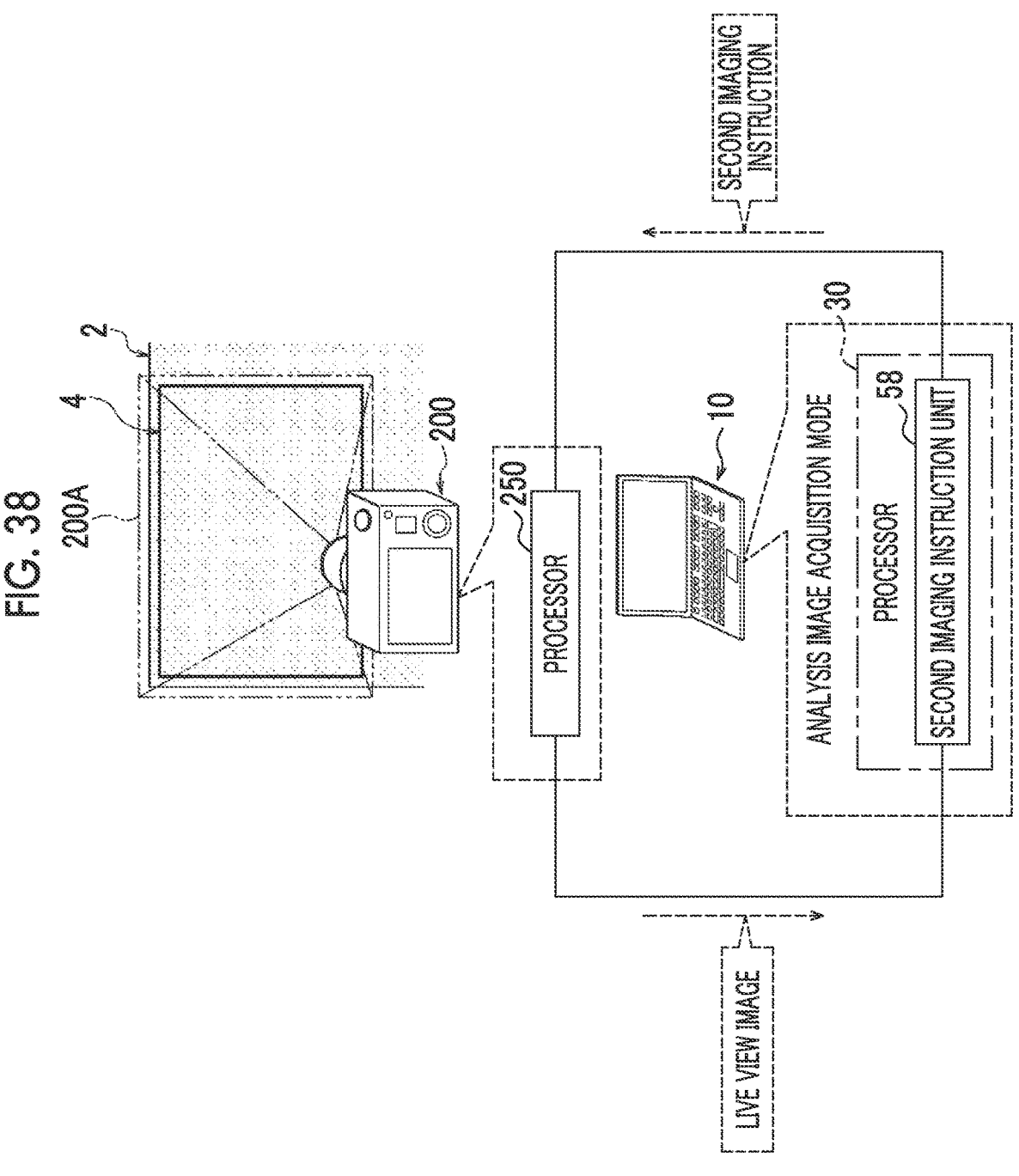
FIG. 38 is a block diagram of the imaging system showing a twentieth modification example related to an operation of imaging of the imaging system according to the embodiment.

Similarly, as an example shown in FIG. 38, in a case where the operation mode of the imaging support apparatus 10 is the analysis image acquisition mode, the second imaging instruction unit 58 may determine whether or not the default imaging condition is established, based on the live view image input from the processor 250 of the imaging apparatus 200. In a case where it is determined that the default imaging condition is established, the second imaging instruction unit 58 may output the second imaging instruction for imaging the inspection target 2 to the processor 250 of the imaging apparatus 200. Examples of the default imaging condition include a condition in which the imaging target region 2A is in focus, the relative misregistration amount between the imaging range 200A and the imaging target region 2A is equal to or less than the default amount, and the relative size difference between the imaging range 200A and the imaging target region 2A is equal to or less than the default value. The output of the second imaging instruction for imaging the inspection target 2 to the processor 250 of the imaging apparatus 200 is an example of "controlling an imaging apparatus to image a subject" according to the present disclosed technology. According to the present modification example, in the visual inspection image acquisition processing, it is possible to cause the imaging apparatus 200 to image in response to the establishment of the default imaging condition.

Further, in the above embodiment, although the inspection target 2 is exemplified as the subject, this is only an example, and an object other than the inspection target 2 may be used. That is, the imaging system 1 may be used for a purpose other than the use of the inspection.

Further, in the above embodiment, in the imaging support processing, although the visual inspection image acquisition processing and the analysis image acquisition processing are alternately executed, the visual inspection image acquisition processing and the analysis image acquisition processing may not be alternately executed. For example, the visual inspection image acquisition processing may be omitted, the visual inspection image acquisition processing may not be executed after the visual inspection image acquisition processing is executed at the beginning of the imaging support processing, or the visual inspection image acquisition processing may be executed once for a plurality of times of execution of the analysis image acquisition processing.

Further, in the above embodiment, although the projection apparatus 100 projects the projection light 4 onto the inspection target 2 based on the projection instruction output by the projection instruction unit 52, the projection apparatus 100 may project the projection light 4 onto the inspection target 2 based on the projection instruction provided to the projection apparatus 100 by the imaging person 6.

Further, in the above embodiment, although the projection light 4 that is projected onto the inspection target 2 is stopped as the release button 266 is pressed to the half pressed position, the imaging apparatus 200 may perform the imaging after the projection light 4 that is projected onto the inspection target 2 is stopped in a case where the release button 266 is pressed to the fully pressed position. In this case, the processor 30 of the imaging support apparatus 10 receives the imaging instruction signal, which is output from the imaging apparatus 200 in response to the release button 266 being pressed to the fully pressed position, and then the imaging instruction provided to the imaging apparatus 200 is received.

Figure 39:
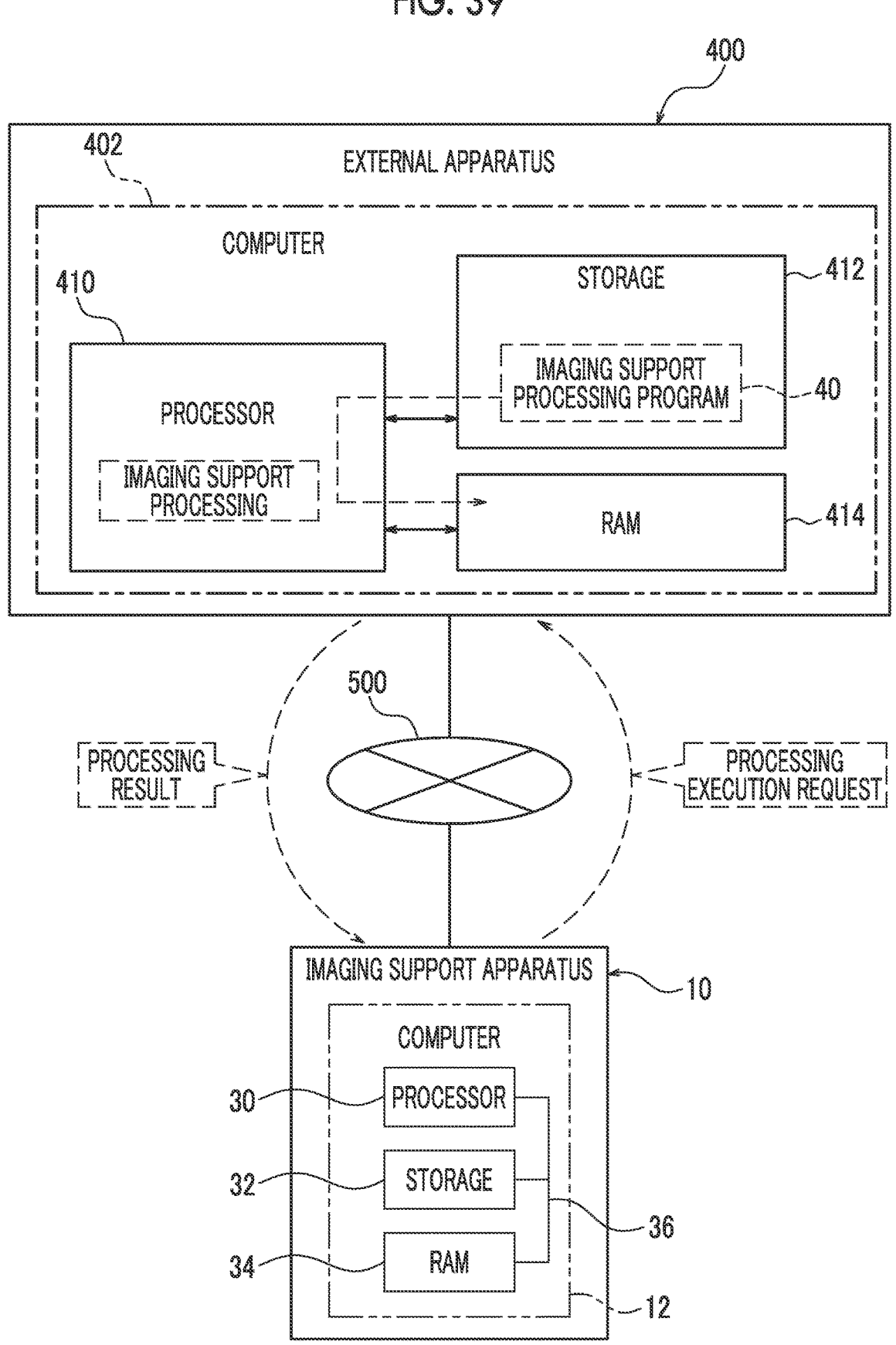
FIG. 39 is a block diagram of the imaging support apparatus and an external apparatus showing a twenty-first modification example related to the imaging support apparatus according to the embodiment.

Further, in the above embodiment, although an example of the embodiment in which the imaging support processing is executed by the computer 12 in the imaging support apparatus 10 has been described, the present disclosed technology is not limited to this. For example, as shown in FIG. 39, the imaging support processing may be executed by a computer 402 in an external apparatus 400 that is connected to the imaging support apparatus 10 in a communicable manner via a network 500 such as LAN or WAN. In the example shown in FIG. 39, the computer 402 includes a processor 410, a storage 412, and a RAM 414. The imaging support processing program 40 is stored in the storage 412.

The imaging support apparatus 10 requests the external apparatus 400 to execute the imaging support processing via the network 500. Accordingly, the processor 410 of the external apparatus 400 reads out the imaging support processing program 40 from the storage 412 and executes the imaging support processing program 40 on the RAM 414. The processor 410 performs the imaging support processing according to the imaging support processing program 40 executed on the RAM 414. Thereafter, the processor 410 provides a processing result obtained by executing the imaging support processing to the imaging support apparatus 10 via the network 500.

Further, the imaging support apparatus 10 and the external apparatus 400 may execute the imaging support processing in a distributed manner, or a plurality of apparatuses including the imaging support apparatus 10 and the external apparatus 400 may execute the imaging support processing in a distributed manner. In the example shown in FIG. 39, the imaging support apparatus 10 and the external apparatus 400 are examples of an "imaging support apparatus" according to the present disclosed technology.

Further, the imaging support apparatus 10, the projection apparatus 100, and the imaging apparatus 200 may execute the imaging support processing in a distributed manner. In this case, the imaging support apparatus 10, the projection apparatus 100, and the imaging apparatus 200 are examples of an "imaging support apparatus" according to the present disclosed technology.

Figure 40:
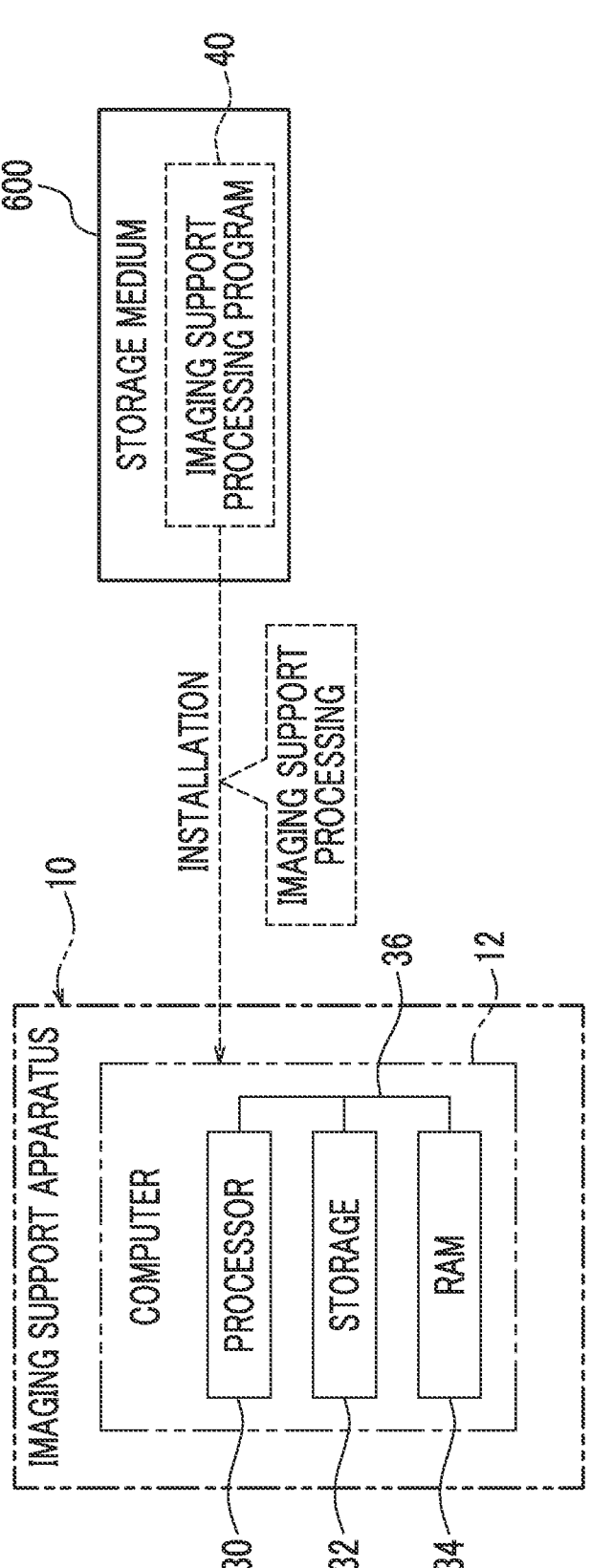
FIG. 40 is a block diagram of the imaging support apparatus and a storage medium showing a twenty-second modification example related to the imaging support apparatus according to the embodiment.

Further, in the above embodiment, although an example of the embodiment in which the imaging support processing program 40 is stored in the storage 32 has been described, the present disclosed technology is not limited to this. For example, as shown in FIG. 40, the imaging support processing program 40 may be stored in a storage medium 600. The storage medium 600 is a non-temporary storage medium. An example of the storage medium 600 includes any portable storage medium such as an SSD or a USB memory.

The imaging support processing program 40 that is stored in the storage medium 600 is installed in the computer 12. The processor 30 executes the imaging support processing according to the imaging support processing program 40.

Further, the imaging support processing program 40 may be stored in a storage of another computer, a server device, or the like connected to the computer 12 via a communication network (not shown), and the imaging support processing program 40 may be downloaded in response to a request from the imaging support apparatus 10 and may be installed on the computer 12.

It is not required to store the entire imaging support processing program 40 in the storage of another computer or server device connected to the computer 12, and a part of the imaging support processing program 40 may be stored.

Further, in the example shown in FIG. 40, although an embodiment example in which the computer 12 is built in the imaging support apparatus 10 has been described, the present disclosed technology is not limited to this, and for example, the computer 12 may be provided outside the imaging support apparatus 10.

Further, in the example shown in FIG. 40, the processor 30 may be a single CPU or may be a plurality of CPUs. Further, the GPU may be applied instead of the CPU.

Further, in the above embodiment, although the computer 12 is exemplified, the present disclosed technology is not limited to this, and a device including an ASIC, FPGA, and/or PLD may be applied instead of the computer 12. Further, instead of the computer 12, a combination of a hardware configuration and a software configuration may be used.

As a hardware resource for executing the imaging support processing described in the above embodiment, the following various processors can be used. Examples of the processor include software, that is, a CPU, which is a general-purpose processor that functions as a hardware resource for executing the imaging support processing by executing a program. Further, examples of the processor include a dedicated electric circuit, which is a processor having a circuit configuration specially designed for executing specific processing such as FPGA, PLD, or ASIC. A memory is built-in or connected to any processor, and each processor executes the imaging support processing by using the memory.

The hardware resource for executing the imaging support processing may be configured with one of these various types of processors or may be configured with a combination (for example, a combination of a plurality of FPGAs or a combination of a CPU and an FPGA) of two or more processors of the same type or different types. Further, the hardware resource for executing the imaging support processing may be one processor.

As an example of configuring with one processor, first, one processor is configured with a combination of one or more CPUs and software, and there is an embodiment in which this processor functions as a hardware resource for executing the imaging support processing. Secondly, as typified by SoC, there is an embodiment in which a processor that implements the functions of the entire system including a plurality of hardware resources for executing the imaging support processing with one IC chip is used. As described above, the imaging support processing is implemented by using one or more of the above-mentioned various types of processors as a hardware resource.

Further, as the hardware-like structure of these various types of processors, more specifically, an electric circuit in which circuit elements such as semiconductor elements are combined can be used. Further, the above-mentioned imaging support processing is only an example. Therefore, it goes without saying that unnecessary steps may be deleted, new steps may be added, or the processing order may be changed within a range that does not deviate from the purpose.

Further, among the above embodiment and a plurality of modification examples, examples that can be combined may be appropriately combined and carried out.

The contents described above and the contents shown in the illustration are detailed explanations of the parts related to the present disclosed technology and are only an example of the present disclosed technology. For example, the description related to the configuration, function, action, and effect described above is an example related to the configuration, function, action, and effect of a portion according to the present disclosed technology. Therefore, it goes without saying that unnecessary parts may be deleted, new elements may be added, or replacements may be made to the contents described above and the contents shown in the illustration, within the range that does not deviate from the purpose of the present disclosed technology. Further, in order to avoid complications and facilitate understanding of the parts of the present disclosed technology, in the contents described above and the contents shown in the illustration, the descriptions related to the common technical knowledge or the like that do not require special explanation in order to enable the implementation of the present disclosed technology are omitted.

In the present specification, "A and/or B" is synonymous with "at least one of A or B". That is, "A and/or B" means that it may be only A, it may be only B, or it may be a combination of A and B. Further, in the present specification, in a case where three or more matters are connected and expressed by "and/or", the same concept as "A and/or B" is applied.

All documents, patent applications, and technical standards described in the present specification are incorporated in the present specification by reference to the same extent in a case where it is specifically and individually described that the individual documents, the patent applications, and the technical standards are incorporated by reference.

Further, the following Supplementary Note will be disclosed with respect to the above embodiments.

SUPPLEMENTARY NOTE 1

A program causing a computer to execute a process including: determining, in a state in which projection light, which represents at least a position of an imaging target region in a subject, is projected onto the subject by the projection apparatus, whether or not the imaging target region is imaged by an imaging apparatus; and controlling the projection apparatus to transition to a state in which the projection light is suppressed in a case where the determining is set as positive.

What is claimed is:

1. An imaging support apparatus comprising:
a processor; and
a memory connected to or built into the processor,
wherein the processor is configured to:
  control, in a state in which projection light, which represents at least a position of an imaging target region in a subject, is projected onto the subject by a projection apparatus, and in a case where an analysis image for analyzing the imaging target region is obtained by imaging the imaging target region by an imaging apparatus, the projection apparatus to transition to a state in which the projection light is suppressed; and
  control the projection apparatus to maintain the projection light in a case where a visual inspection image for visually inspecting the imaging target region is obtained by imaging the imaging target region by the imaging apparatus.

2. An imaging system comprising:
the imaging support apparatus according to claim 1;
the projection apparatus; and
the imaging apparatus.

3. The imaging support apparatus according to claim 1, wherein the state in which the projection light is suppressed is a state in which the projection light is stopped.

4. The imaging support apparatus according to claim 1, wherein the processor is configured to control the projection apparatus to project the projection light onto the subject.

5. The imaging support apparatus according to claim 1, wherein the projection light includes projection light representing a position of an edge portion of the imaging target region.

6. The imaging support apparatus according to claim 1, wherein the projection light includes projection light representing a position of a center of the imaging target region.

7. The imaging support apparatus according to claim 1, wherein the projection light includes projection light representing a range of the imaging target region.

8. The imaging support apparatus according to claim 1, wherein the projection light includes projection light displayed in a grid shape.

9. The imaging support apparatus according to claim 1, wherein the projection light includes projection light displayed in a rectangular shape.

10. The imaging support apparatus according to claim 1, wherein the projection light includes projection light representing an imaging order.

11. The imaging support apparatus according to claim 1, wherein the processor is configured to control the projection apparatus to move the projection light along the subject.

12. The imaging support apparatus according to claim 11, wherein a portion of a first imaging target region, as the imaging target region, corresponding to the projection light before movement and a portion of a second imaging target region, as the imaging target region, corresponding to the projection light after the movement overlap with each other.

13. The imaging support apparatus according to claim 1, wherein the projection light includes projection light representing a dimension.

14. The imaging support apparatus according to claim 1, wherein the projection light includes projection light representing information related to the subject.

15. The imaging support apparatus according to claim 1, wherein the processor is configured to perform control of projecting the projection light onto the subject in accordance with a default plan.

16. The imaging support apparatus according to claim 15, wherein the plan includes at least one of a projection position, a projection range, or a projection order for projecting the projection light onto the subject.

17. The imaging support apparatus according to claim 1, wherein the projection light includes projection light representing a damaged location of the subject.

18. The imaging support apparatus according to claim 1, wherein the processor is configured to output relative information representing a relative relationship between an imaging range that is imaged by the imaging apparatus and the imaging target region.

19. The imaging support apparatus according to claim 1, wherein the processor is configured to control the imaging apparatus to image the subject in a case where a default imaging condition is established.

20. The imaging support apparatus according to claim 1, wherein the processor is configured to further control the projection apparatus to maintain the projection light in a case where the imaging target region is imaged by the imaging apparatus.

21. An imaging support method comprising:
control, in a state in which projection light, which represents at least a position of an imaging target region in a subject, is projected onto the subject by a projection apparatus, and in a case where an analysis image for analyzing the imaging target region is obtained by imaging the imaging target region by an imaging apparatus, the projection apparatus to transition to a state in which the projection light is suppressed; and
control the projection apparatus to maintain the projection light in a case where a visual inspection image for visually inspecting the imaging target region is obtained by imaging the imaging target region by the imaging apparatus.

22. A non-transitory computer-readable storage medium storing a program causing a computer to execute a process comprising:
control, in a state in which projection light, which represents at least a position of an imaging target region in a subject, is projected onto the subject by a projection apparatus, and in a case where an analysis image for analyzing the imaging target region is obtained by imaging the imaging target region by an imaging apparatus, the projection apparatus to transition to a state in which the projection light is suppressed; and
control the projection apparatus to maintain the projection light in a case where a visual inspection image for visually inspecting the imaging target region is obtained by imaging the imaging target region by the imaging apparatus.

* * * * *